US011235890B1

(12) United States Patent
Dahlstrom et al.

(10) Patent No.: US 11,235,890 B1
(45) Date of Patent: Feb. 1, 2022

(54) UNMANNED AERIAL VEHICLE HAVING AN ELEVATED SURFACE SENSOR

(71) Applicant: WORKING DRONES, INC., Jacksonville, FL (US)

(72) Inventors: Robert Lewis Dahlstrom, Jacksonville, FL (US); Jeffrey C. McCutcheon, Jacksonville, FL (US); Tariq Rashid, Jacksonville, FL (US)

(73) Assignee: WORKING DRONES, INC., Jacksonville, FL (US)

( * ) Notice: Subject to any disclaimer, the term of this patent is extended or adjusted under 35 U.S.C. 154(b) by 855 days.

(21) Appl. No.: 15/793,948

(22) Filed: Oct. 25, 2017

Related U.S. Application Data

(60) Provisional application No. 62/412,392, filed on Oct. 25, 2016.

(51) Int. Cl.
*B64D 47/08* (2006.01)
*B05C 11/10* (2006.01)
*B64C 39/02* (2006.01)

(52) U.S. Cl.
CPC .......... *B64D 47/08* (2013.01); *B05C 11/1005* (2013.01); *B64C 39/022* (2013.01); *B64C 39/024* (2013.01); *B64C 2201/123* (2013.01); *B64C 2201/126* (2013.01); *B64C 2201/148* (2013.01)

(58) Field of Classification Search
USPC ...... 118/323, 321, 696, 712; 701/3; 700/123
See application file for complete search history.

(56) References Cited

U.S. PATENT DOCUMENTS

| 10,011,352 B1* | 7/2018 | Dahlstrom | B64C 39/024 |
| 2016/0082460 A1* | 3/2016 | McMaster | B05B 12/122 |
| | | | 701/2 |
| 2018/0244386 A1* | 8/2018 | Phan | B64C 27/12 |
| 2018/0257774 A1* | 9/2018 | Volpi | B25J 15/00 |

* cited by examiner

Primary Examiner — Yewebdar T Tadesse
(74) Attorney, Agent, or Firm — Terry M. Sanks, Esquire; Beusse Sanks PLLC

(57) ABSTRACT

A system including an unmanned aerial vehicle (UAV) or aerial robotic system (ARS) to perform at least one task to an object during flight of the UAV in a movement mode configured for maneuvering near a surface of the object. A task sensor configured to sense at least one parameter of the surface. An adjustable sensor arm attachable to the UAV and supporting the task sensor to facilitate the task performed to the surface of the object by the UAV during flight of the UAV. The sensor arm being resilient to impact forces caused by direct contact of the sensor or sensor arm with the surface to bend, spring or swivel relative to a contour of the surface.

17 Claims, 42 Drawing Sheets

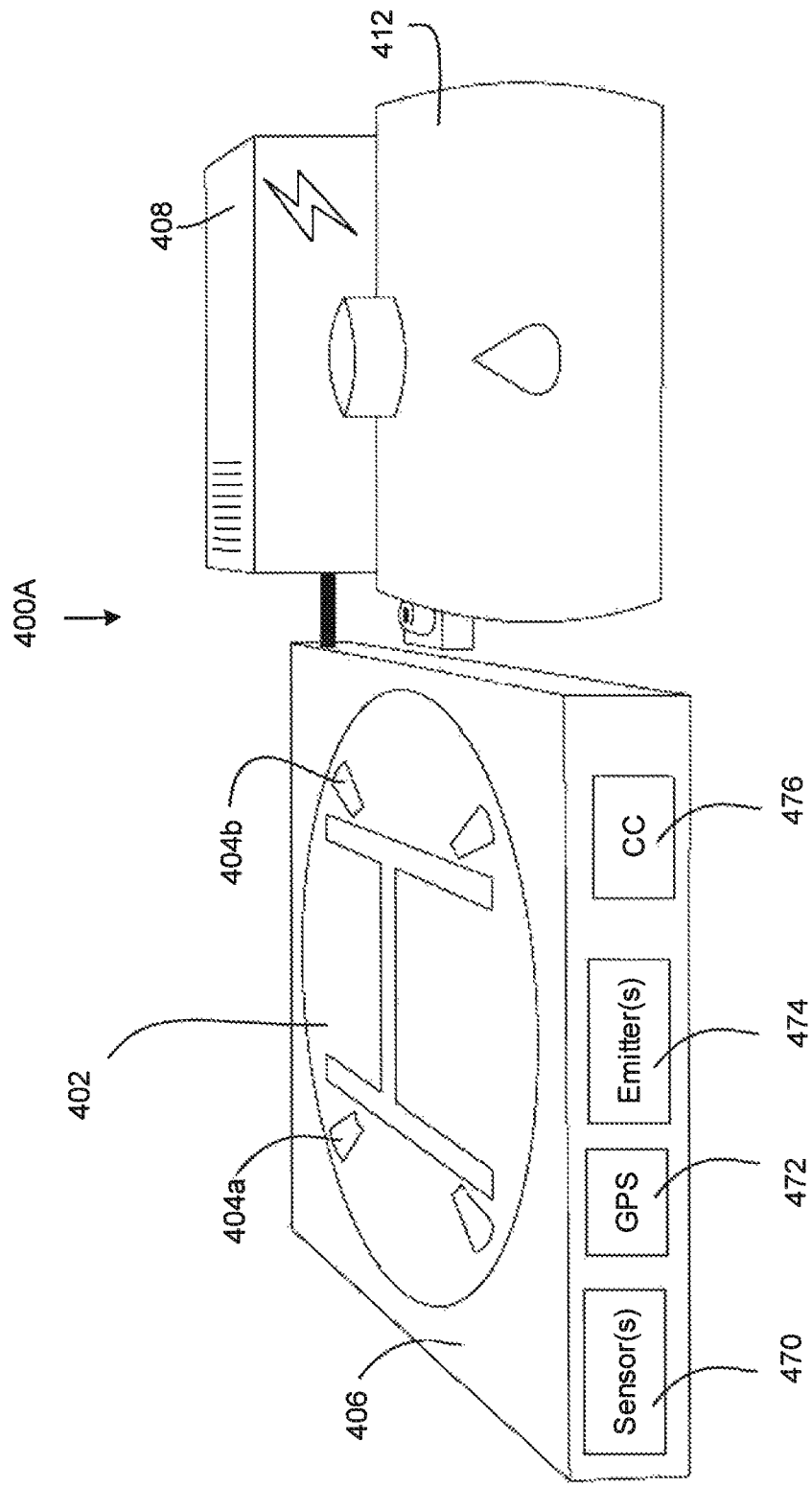

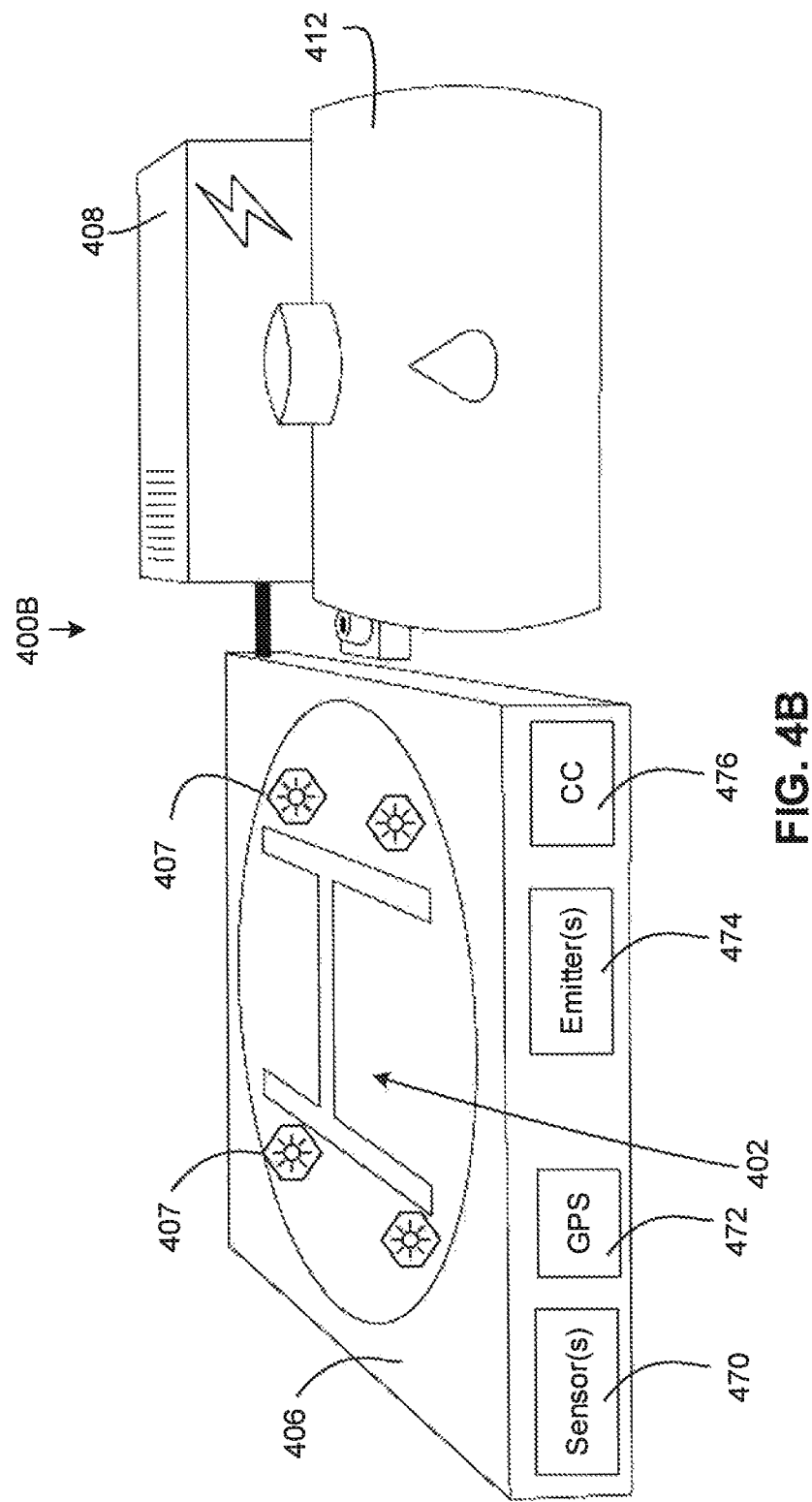

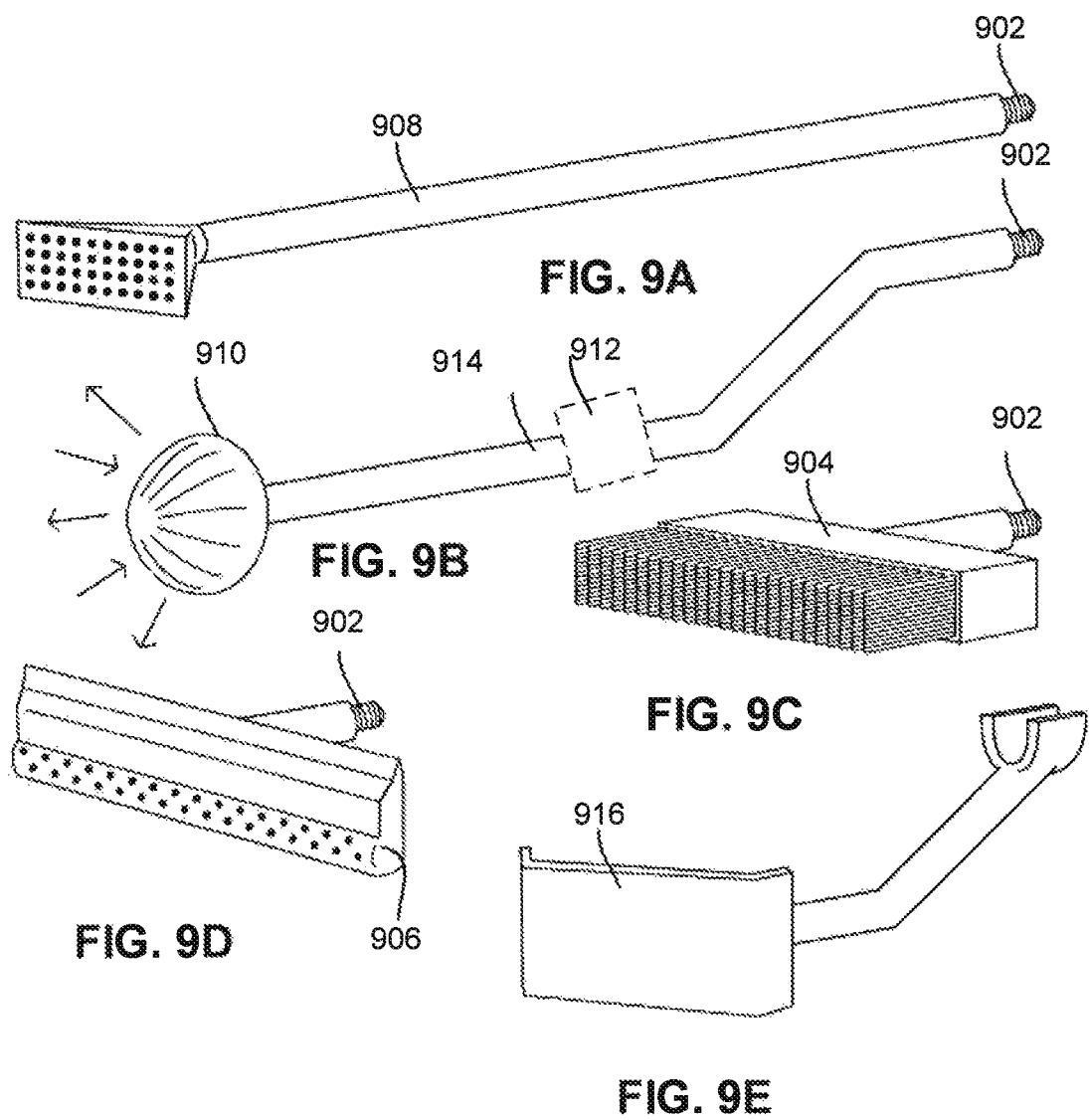

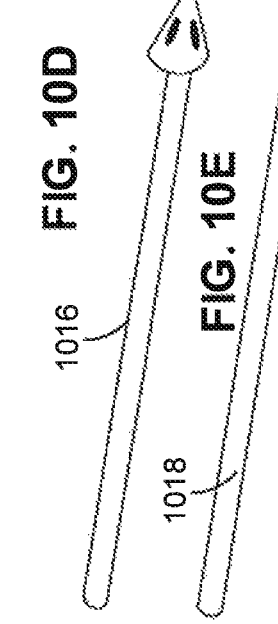
FIG. 10A
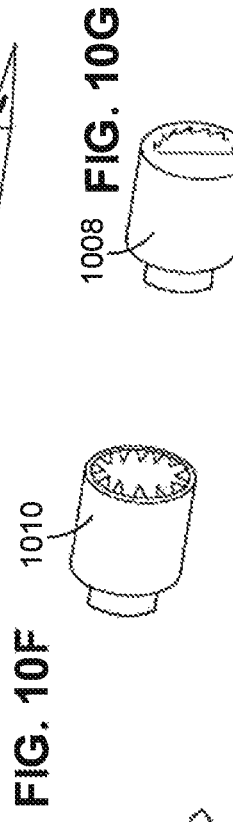
FIG. 10B
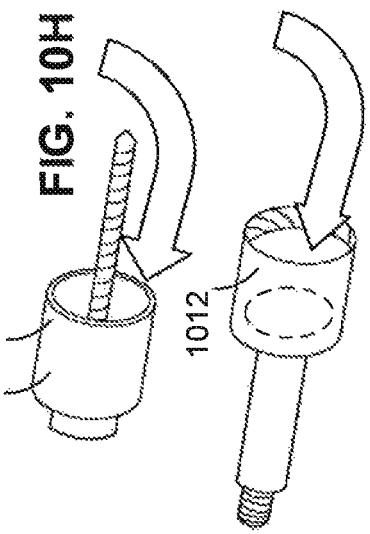
FIG. 10C
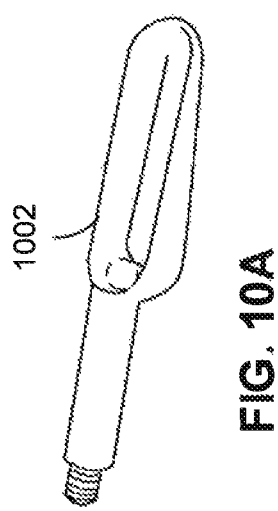
FIG. 10D
FIG. 10E
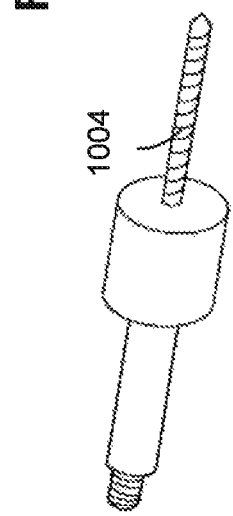
FIG. 10F
FIG. 10G
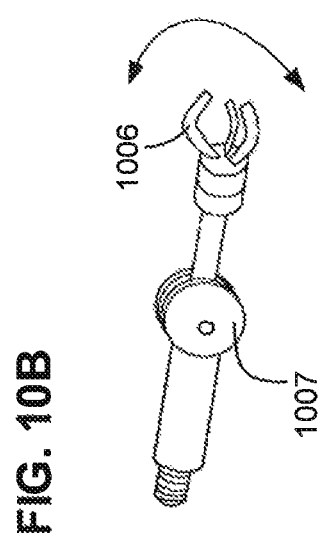
FIG. 10H
FIG. 10I

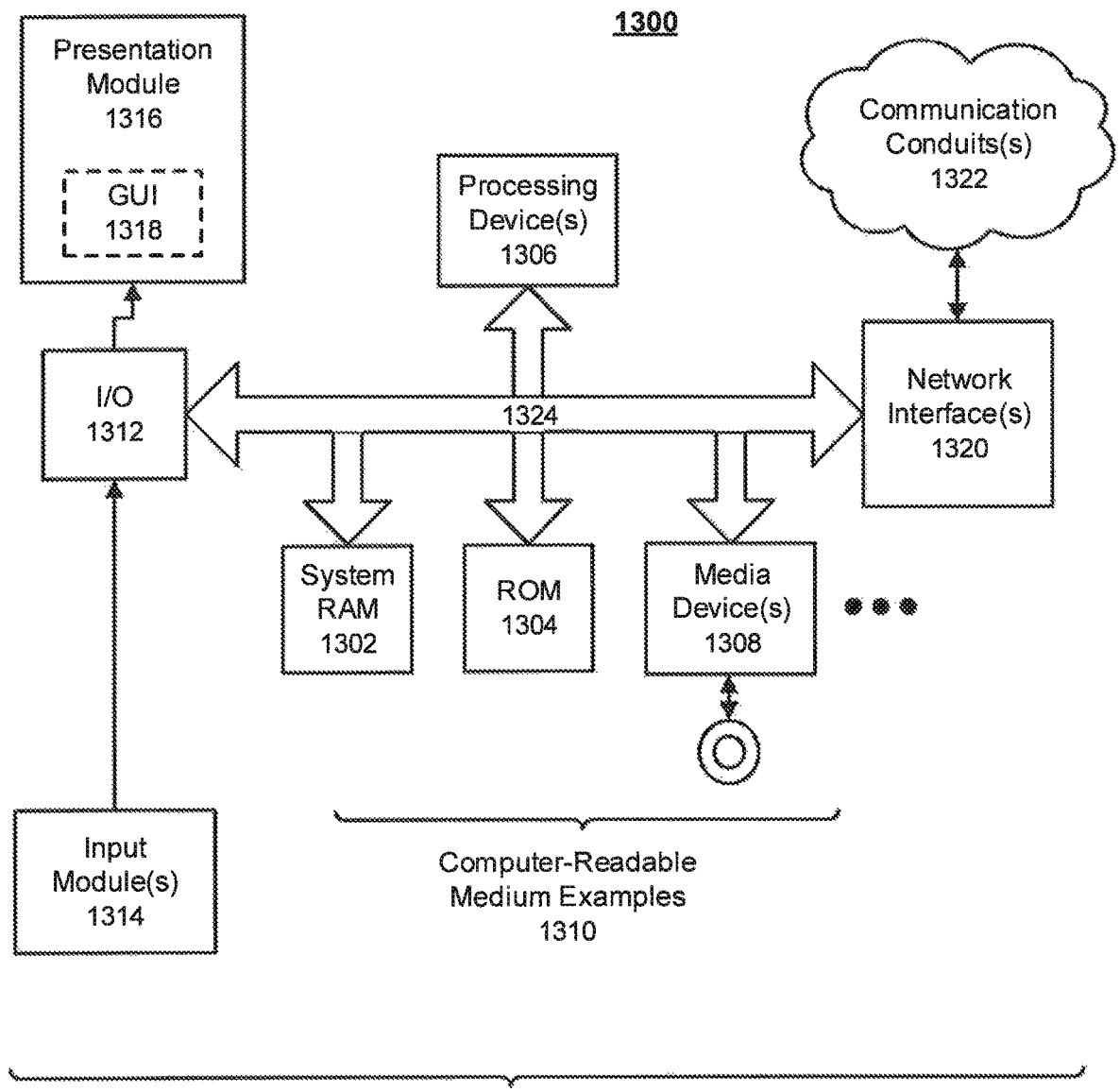
FIG. 13

FIG. 22
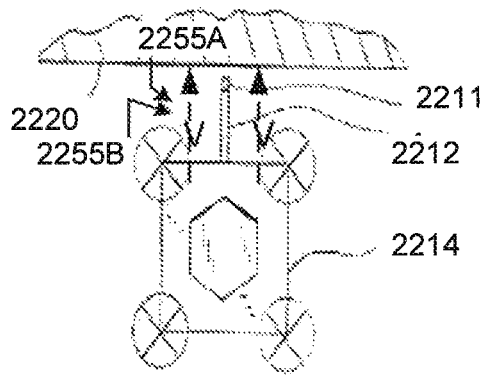
FIG. 23
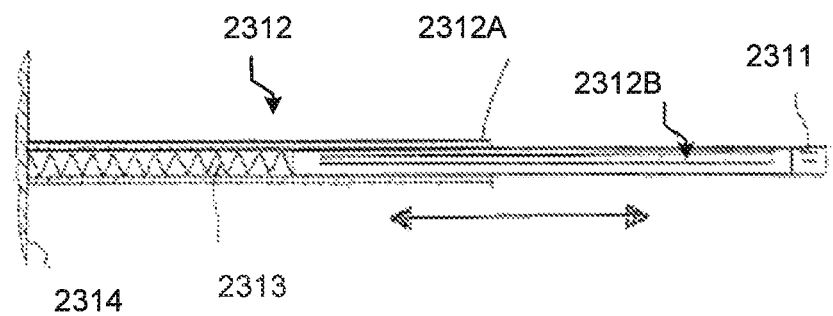
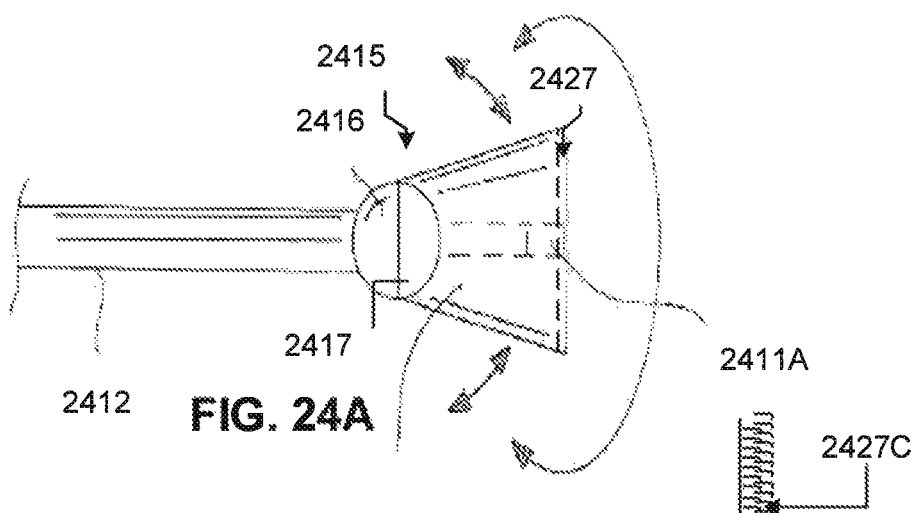
FIG. 24A
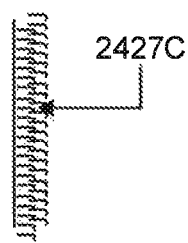
FIG. 24C

UNMANNED AERIAL VEHICLE HAVING AN ELEVATED SURFACE SENSOR

CROSS REFERENCE TO RELATED APPLICATION

This application claims the benefit of U.S. Provisional Application No. 62/412,392, titled "UNMANNED AERIAL VEHICLE HAVING AN ELEVATED SURFACE SENSOR," filed Oct. 25, 2016, having the same inventors and incorporated herein by reference in its entirety.

FIELD OF THE DISCLOSURE

The present disclosure generally relates to systems with unmanned robotic devices and more particularly to an unmanned aerial vehicle having an elevate surface sensor system.

BACKGROUND

The statements in this section merely provide background information related to the present disclosure and may not constitute prior art.

The invention relates in general to unmanned aerial vehicles, often referred to as UAV's or UAVs, which may be free flying or tethered. More particularly, the invention relates to such UAV's utilized for sensing, measuring or testing, and even more particularly to such UAV's utilized for contact or close proximity sensing, measuring or testing, wherein a sensor or other testing device is positioned in contact with or in close proximity to a location on a surface not easily reachable from ground level.

There are many circumstances in which it is necessary to perform a testing operation on one or more locations on an elevated surface or other raised object surface that is not easily or conveniently reached from ground level. Often, tests must be made at a plurality of different locations. It is often necessary or desirable to test the quality, condition, degradation or damage of industrial and commercial coatings, such as for example the dry film thickness or coverage percentage of paint on a surface such as the hull of a ship or the side of a building, or to determine whether and to what extent corrosion may have occurred, or to test surface temperatures. The examples above are not meant to be limiting.

In current practice such testing requires workers to be positioned at sometimes extreme heights by using ladders, powered hoists, bucket trucks, scaffolding, climbing rigging, etc., all of which expose the workers to dangerous conditions and are extremely time consuming.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

An aspect of the embodiments includes a system including an unmanned aerial vehicle (UAV) to perform at least one task to an object during flight of the UAV in a movement mode configured for maneuvering near a surface of the object. A task sensor configured to sense at least one parameter of the surface. An adjustable sensor arm attachable to the UAV and supporting the task sensor to facilitate the task performed to the surface of the object by the UAV during flight of the UAV. The sensor arm being resilient to impact forces caused by direct contact of the sensor or sensor arm with the surface to bend, spring or swivel relative to a contour of the surface.

Another aspect of the embodiments includes a method comprising: performing at least one task, by an unmanned aerial vehicle (UAV), to an object during flight of the UAV in a movement mode configured for maneuvering near a surface of the object; sensing, by a task sensor, at least one parameter of the surface; and resiliently adjusting, an adjustable sensor arm attachable to the UAV and supporting the task sensor, to facilitate the task performed to the surface of the object by the UAV during flight of the UAV. The sensor arm is resilient to impact forces caused by direct contact of the sensor or sensor arm with the surface to bend, spring or swivel relative to a contour of the surface.

Another aspect of the embodiments includes a smart cone/sensor combination which can be affixed to a surface and left to remain on the surface for a period of time.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

FIG. 4A is a perspective view of a landing pad using markings and being configured to provide power, material, and data connections to an aerial vehicle, according to an aspect of the present disclosure.

FIG. 4B is a perspective view of a landing pad using beacons and being configured to provide power, material, and data connections to an aerial vehicle, according to an aspect of the present disclosure.

FIGS. 9A-9E are views of a variety of tools (modular add-ons) usable with an aerial vehicle, according to aspects of the present disclosure.

FIGS. 10A-10I are views of a variety of tools (modular add-ons) usable with an aerial vehicle, according to aspects of the present disclosure.

FIG. 13 is a block diagram of a computing system useful for implementing aspects of the present disclosure.

FIG. 22 is a representative illustration of a top view of an aerial vehicle having a sensor mounted onto sensor arm, the sensor positioned near an elevated surface, according to an aspect of the present disclosure.

FIG. 23 is a representative illustration, partially in cross-section, showing a spring-biased, shock absorbing, telescoping sensor arm, according to an aspect of the present disclosure.

FIG. 24A is a representative illustration showing a sensor arm having the sensor disposed within a self-orienting collar attached to the sensor arm by a swivel mechanism, according to an aspect of the present disclosure.

FIG. 24C is a representative illustration showing a microstripper rim for the cone, according to an aspect of the present disclosure.

DETAILED DESCRIPTION

The present disclosure is directed to apparatus, systems, and methods that facilitate the ability of a user to monitor and control the amount of depletable materials and other materials (including materials collected or transferred by the drone as well as those sent to the drone) and/or power supplies present in a robotic device such as without limitation an aerial vehicle. This may be accomplished by attaching the robotic device to a mobile base station containing one or more containers of depletable and/or other materials and/or power supplies via a umbilical cabling and tethering (UCAT) apparatus designed to transport materials and power supplies from the mobile base station containers to the robotic device, either at the command of the user or via an automated or semi-automated process. This may reduce or eliminate the need for the robotic device to physically return to the mobile base station or other location in order to replenish its depletable or other materials and/or power supplies, thus allowing more time to be dedicated to task performance. Likewise, the UCAT apparatus may transport materials away from the robotic device that are used or collected by the device. This may make it unnecessary for the robotic device to stop what it is doing and travel to a different location to deposit the unwanted materials and/or await human interaction to complete the deposit process. In addition, the UCAT apparatus may transport materials from location to location either directly through the robotic device or through the robotic device to the mobile base station. Further the UCAT operations system may be capable of both deploying material from the mobile base station "up" the UCAT apparatus and "down" the UCAT apparatus to the mobile base station or other air or ground based location simultaneously.

The term "robotic device" and/or the plural form of this term are used throughout herein to refer to any machine comprising electrical and/or mechanical components that is capable of performing a task via manual instructions, autonomously, or semi-autonomously; such as, by way of example and not limitation, a drone, an unmanned aerial vehicle (UAV), robot, UAS's (including "small UAS's"), and the like. An unmanned aerial vehicle or robotic device may be an unmanned self-propelled (USP) vehicle.

Figure 1A:
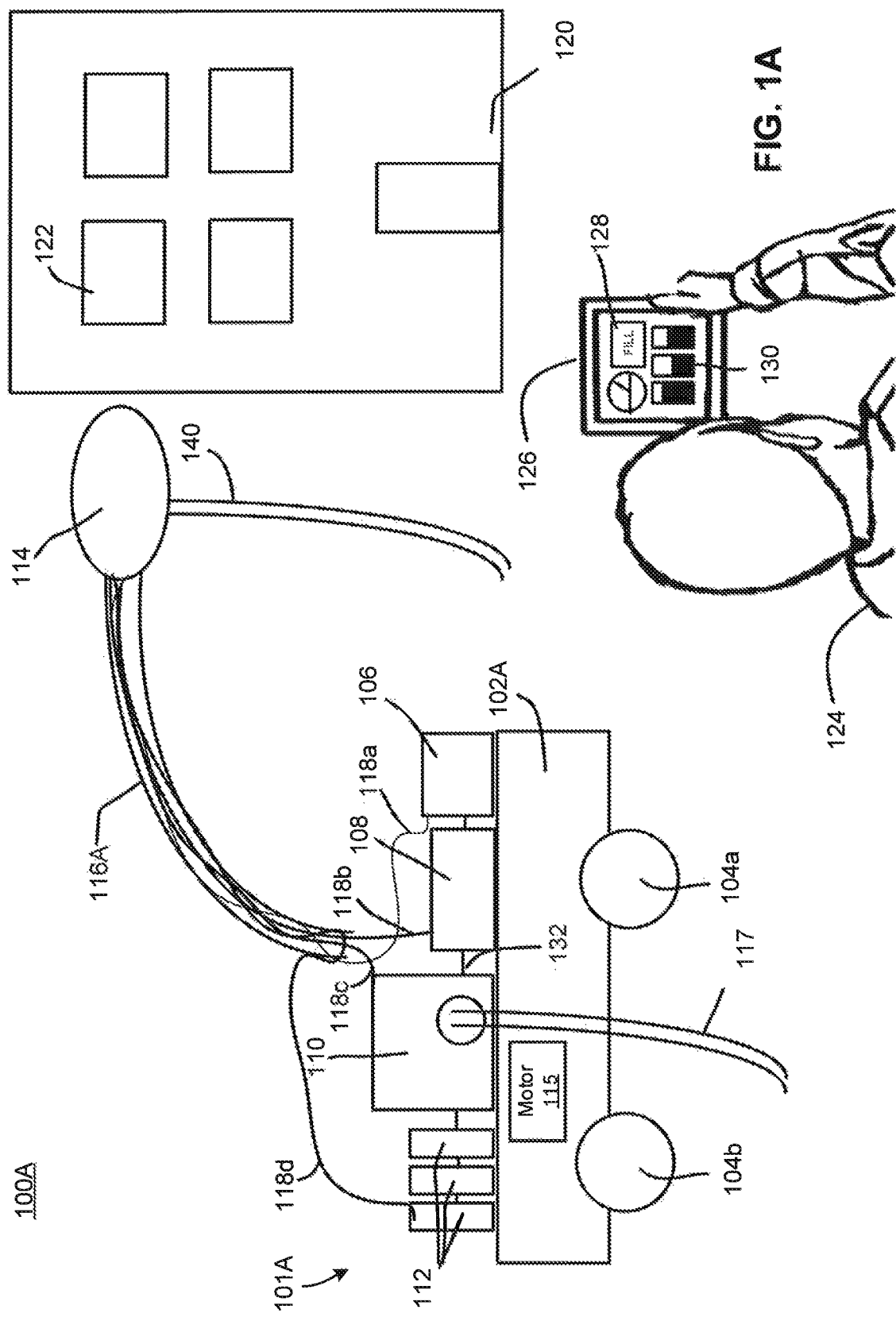
FIG. 1A is a block diagram of an umbilical cabling and tethering (UCAT) operations system, according to an aspect of the present disclosure.

FIG. 1A is a block diagram of an umbilical cabling and tethering (UCAT) operations system 100A. The UCAT operations system 100A may allow a user 124 manage, monitor, and control the amount of depletable and other materials (including materials collected or transferred by the robotic device 114 as well as those sent to or from the robotic device 114) and/or power supplies present within a robotic device 114 (i.e., drone, UAV, robot, or USP vehicle) attached to a mobile base station 101A via an umbilical cabling and tethering (UCAT) apparatus 116A, as well as the levels within other components of system 100A, according to an aspect of the present disclosure, is shown. The mobile base station 101A may include a discharge or inlet tube 117. Tube 117 may serve as an overflow or may receive a fluid medium through tube 117.

Within system 100A, user 124 may use a computing device 126 to monitor the depletable material(s) and/or power supply levels currently present within the various components of system 100A, including a depletable material(s) reservoir 110, supplemental device(s) 112, and UCAT apparatus 116A; and/or to control the operations of robotic device 114 (i.e., drone, UAV, robot, or USP vehicle) and the other components of system 100A. Robotic device 114 and UCAT apparatus 116A may be incorporated with any computational components necessary as recognized by those skilled in the relevant art(s), including processors and controllers, to give it the ability to perform some or all of its tasks autonomously, determine when and how such tasks should be done, and/or communicate with user 124. Multiple indicators 130 may be displayed by computing device 126 indicating such levels, operational state, or supplemental data. The indicators 130 may be digital representations of meters, gauges, and similar structures to show or display the levels of interest as determined by sensors within robotic device 114, mobile base station 101A, UCAT apparatus 116A, material(s) reservoir 110, and supplemental device(s) 112 and information from the mobile base station 101A such as location, speed, direction, etc. In other instances the indicators may be verbal, flashing lights, hand or other body motions by the operator or some combination thereof (including digital display, sound, lights, and/or motion).

Computing device 126 may comprise a tablet; smartphone; mobile computer; microphone; a motion control device such as that provided by Leap Motion, Inc. of San Francisco, Calif.; or any other similar mobile or non-mobile device as recognized by those skilled in the relevant art(s). Additionally, computing device 126 may contain wired or wireless connectivity as well as data storage, communication, and similar computing modules as recognized by those skilled in the relevant art(s) that allow it to communicate and interact with all of the computational components of system 100A and networks such as the Internet. When user 124 desires to increase the levels of materials and/or power supplies present within robotic device 114, user 124 may press a button 128 on computing device 126 to initiate a refill/replenishment process and/or adjust the rate at which continuously supplied materials/power supplies are transferred from mobile base station 10A to robotic device 114. In alternative aspects, button 128 functions to initiate a continuous supply of materials and/or power supplies to robotic device 114. In some aspects, the sensors onboard robotic device 114 may detect when material and/or power supply levels get below a certain threshold and at such point system 100A may initiate the refill/replenishment process, adjust the material/power supply continuous transfer rate automatically, and/or notify user 124 about the occurrence of the low material and/or power supply levels. Such a notification may be in the form of a text or email message sent to computing device 126, the illumination of one or more light-emitting devices within system 100A, an audio sound, or any similar form as may become apparent to those skilled in the relevant art(s) after reading the description herein.

In some aspects, computing device 126 is not used with system 100A. In such aspects, user 124 may send commands and any other types of communication to system 100A verbally. In order to accomplish this, system 100A may be equipped with one or more microphones (i.e., microphone 1257 of FIGS. 12A and 12B) that are standalone devices and/or are integrated with any other component of system(s) 100A, UCAT apparatus 116A or robotic device 114. The microphone(s) may be communicatively coupled to one or more computational devices associated with system(s) 100A, the UCAT apparatus 116A or robotic device 114, including computational hardware 108, via wired or wireless connectivity.

Figure 12A:
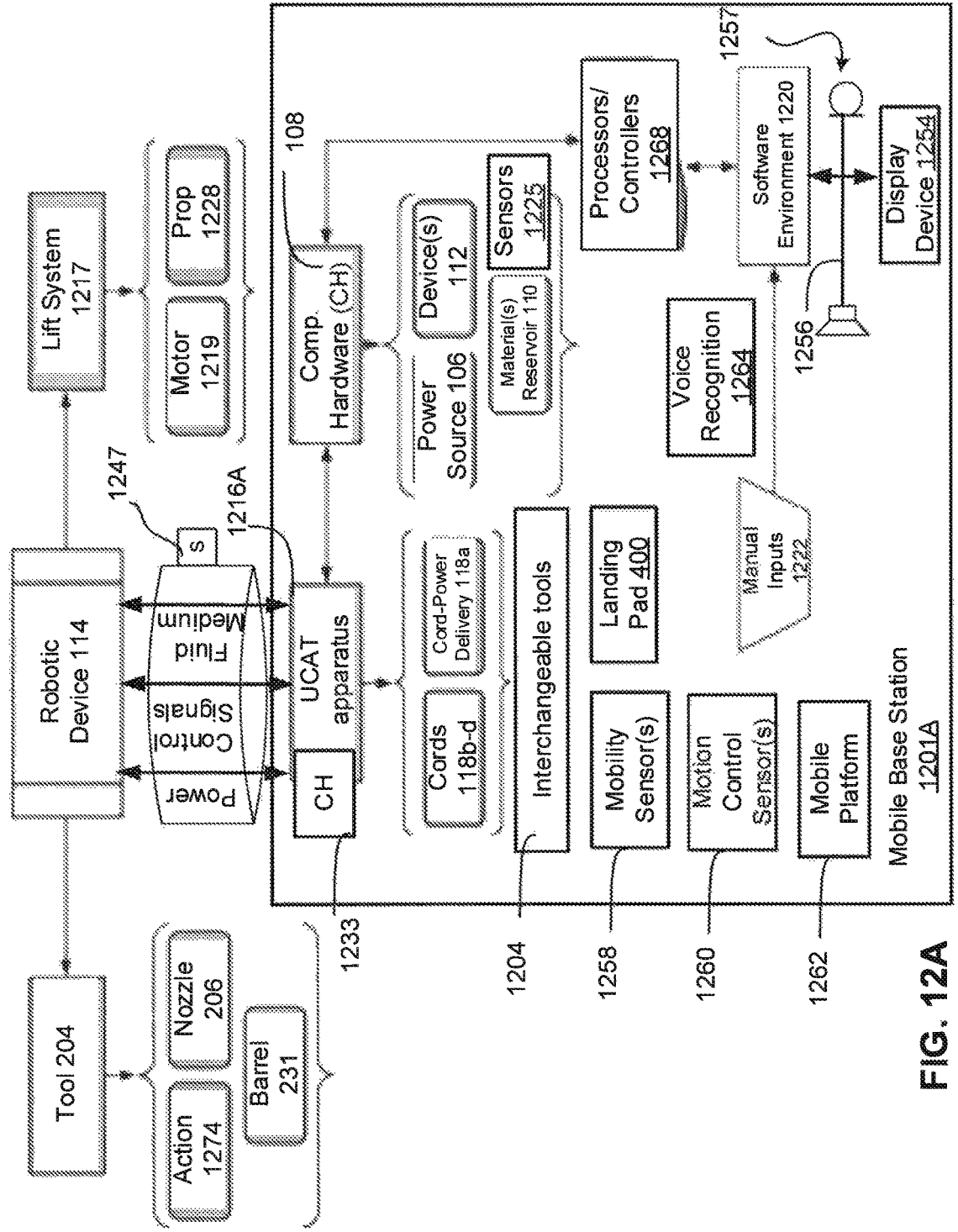
FIG. 12A is a block diagram of the interrelationship of the main components of the UCAT operations system, according to an aspect of the present disclosure.
Figure 12B:
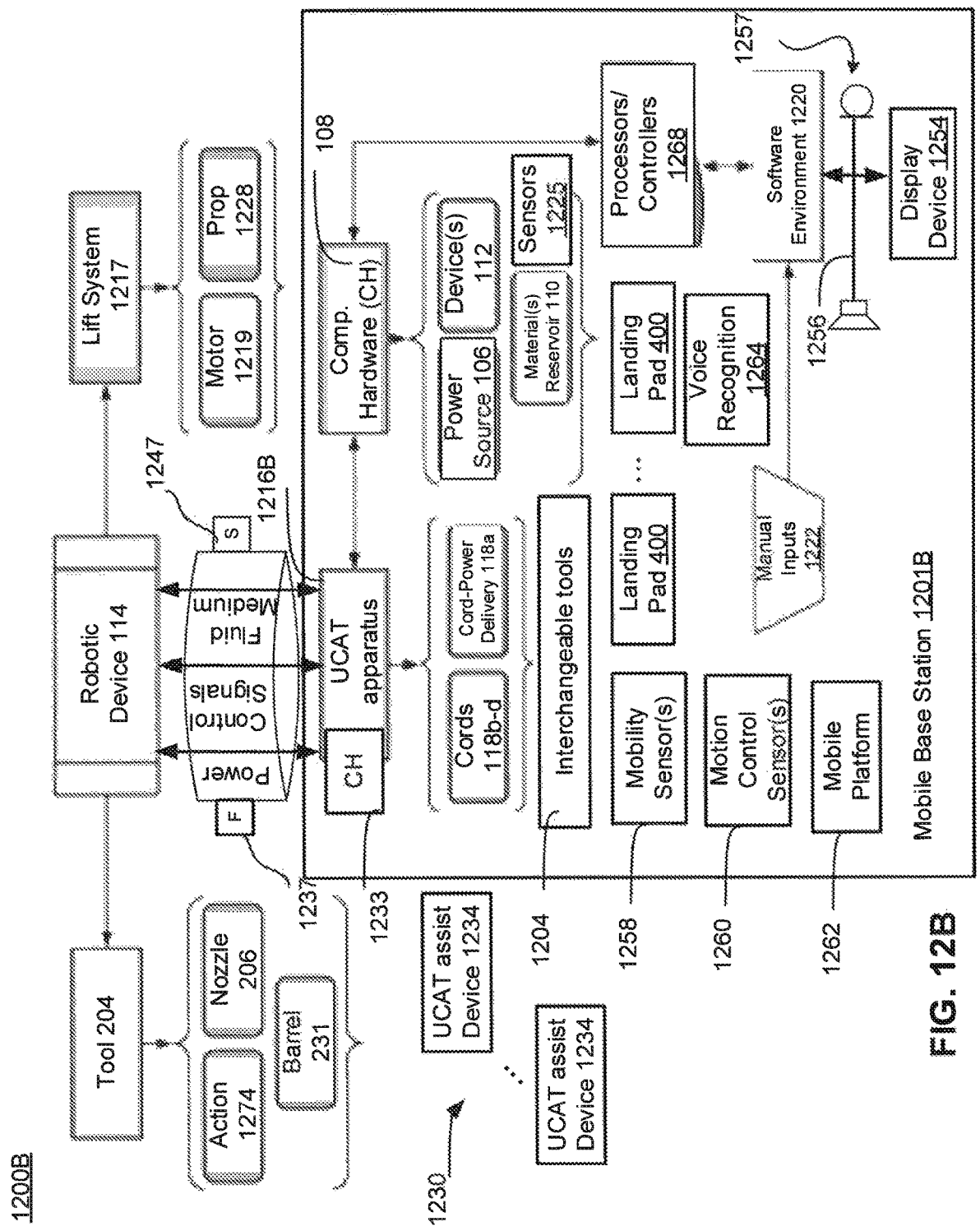
FIG. 12B is a block diagram of the interrelationship of the main components of the UCAT operations system with a UCAT assist system, according to an aspect of the present disclosure.

The computational device(s) may be configured to be either pre-programmed to accept verbal commands of a specific form and/or may be configured to interpret free-form verbal commands via voice recognition module 1264 of FIGS. 12A and 12B or as part of mobile computing device 126. By way of example and not limitation, a pre-programmed verbal command may comprise the phrase, "Refill paint bucket." Alternatively, a free-form command such as, "Add more paint to the bucket" may be understood by the computing device(s) of system 100A, UCAT apparatus 116A or robotic device 114 or as part of mobile computing device 126. Alternatively and/or additionally, user 124 may use motion/gesture commands to communicate with system 100A, UCAT apparatus 116A, robotic device 114, or mobile computing device 126. Motion/gesture commands may be received by system 100A, UCAT apparatus 116A, robotic device 114, or mobile computing device 126 via one or more cameras, motion control devices, motion capture devices, and/or any similar devices as recognized by those skilled in the relevant art(s) that are currently known or will be known in the future. The motion control sensors 1260 of FIGS. 12A and 12B or within UCAT apparatus 116A, robotic device 114, or mobile computing device 126 may include one or more of cameras, motion control devices, motion capture devices or the like. These devices may be of the standalone variety and/or may be physically integrated with one or more of the other components of the system(s).

Furthermore, in some additional embodiments system 100A, UCAT apparatus 116A, robotic device 114, or mobile computing device 126 includes at least one display device (i.e., display device 1254 of FIGS. 12A and 12B) and/or projection device that is communicatively coupled to computational hardware 108 or computational hardware embedded in or added to UCAT apparatus 116A, robotic device 114 or mobile computing device 126, either as a standalone component and/or physically integrated with another component of system 100A, UCAT apparatus 116A, robotic device 114, or mobile computing device 126 such as mobile base station 101A. In such aspects, the projection device may display information pertaining to system 100A, UCAT apparatus 116A, robotic device 114, or mobile computing device 126 on a wall, a screen, the ground, any other surface as recognized by those skilled in the relevant art(s) as being capable of displaying a projected output, and/or in the form of a hologram. User 124 may be able to interact with the projected display and use it to control various aspects of system 100A, UCAT apparatus 116A, robotic device 114, or mobile computing device 126 via one or more motion control devices (i.e., motion control sensors 1260 of FIGS. 12A and 12B) or via any similar technology as currently recognized or will be known in the future by those skilled in the relevant art(s). Additionally, system 100A may be able to communicate with user 124 via the illumination of one or more light sources and/or the functioning of one or more audio outputs (via speaker 1256 of FIGS. 12A and 12B) or computational hardware embedded in or added to UCAT apparatus 116A, robotic device 114, or mobile computing device 126, configured to send messages in the form of audio and/or illuminative effects that represent various messages. By way of example and not limitation, two "beeps" from robotic device 114 could mean that it has power supply levels that are below a certain threshold, or robotic device 114 could "speak" the phrase, "Power supplies are low." In other use cases there may be a physical controller (similar to a joystick) with knobs and dials and switches, etc. The system(s) 100A, UCAT apparatus 116A, robotic device 114, or mobile computing device 126, may initiate the refill/replenishment process and/or adjust the material/power supply continuous transfer rate automatically, and or contact the operator (send a text, an e-mail, flash lights, make sounds, etc.). One or more components of the system 100A, UCAT apparatus 116A, mobile base station 101A, robotic device 114, or mobile computing device 126 may be remotely controlled via the Internet.

The refill/replenishment process may take place via UCAT apparatus 116A, which connects robotic device 114 to mobile base station 101A. In some aspects, quick connection mechanisms may allow UCAT apparatus 116A to be quickly and easily connected to and disconnected from robotic device 114 and/or mobile base station 101A. Mobile base station 101A may comprise a mobile platform 102A, wheels (shown only as 104a and 104b in FIG. 1A for clarity), one or more power supply sources (PSS) 106, computational hardware (CH) 108, depletable material(s) reservoir 110, and one or more supplemental devices 112. The mobile platform 102A is propelled via the power of motor 115. The motor 115 may be electric or gas powered. Power supply source 106 may be directly connected to robotic device 114 via cord(s) 118a. Similarly, computational hardware 108, material(s) reservoir 110, and supplemental device(s) 112 may be directly connected to robotic device 114 via cords 118b, 118c, and 1/8d, respectively. The cords (i.e., cords 118a-118d) may pass through and be contained by UCAT apparatus 116A. In some aspects, one or more cords are not contained within the casing of the UCAT apparatus 116A.

Specifically, the UCAT apparatus 116A may include a casing, such as without limitation a flexible conduit, through which the cords 118a-118d are bundled. In yet some additional aspects, UCAT apparatus 116A is not used at all and only cords 118a-118d attach mobile base station 101A to robotic device 114. Furthermore, cords 118a-118d may comprise cables, tubes, hoses, fiber optic cables, wires (insulated and non-insulated—electrical and mechanical wire), rods, chain, rope, string, monofilament or any similar connection mechanism as will be appreciated by those skilled in the relevant art(s) after reading the description herein. Not only may UCAT apparatus 116A bring materials, power supplies, and communications/data to robotic device 114, it may also carry used/old materials as well as communications/data away from robotic device 114. By way of example and not limitation, tubing within UCAT apparatus 116A may carry used, dirty water away from robotic device 114 after the water has been used to wash something, as will be described in more detail later. Material(s) carried away from robotic device 114 by UCAT apparatus 116A may either be discharged into the open environment when appropriate and/or transferred to reservoir 110 and/or supplemental device(s) 112 or compartments therein. Material(s) transferred to reservoir 110 and/or supplemental device(s) 112 may be processed/filtered/cleaned (via the addition of chemicals or organic compounds, bacteria, passed through membranes, filters, inert organic or inorganic matter, etc.) and held or discharged from reservoir 110.

UCAT apparatus 116A may comprise an elongated hollow casing structure of a flexible yet durable nature that may contain and protect cords 118a-118d from environmental elements and other potential sources of damage such that UCAT apparatus 116A may be used underground, underwater, in snow/ice, on any surface, in the air, in outer space or in any other location as may become apparent to those skilled in the relevant art(s) after reading the description herein. By way of example and not limitation, UCAT apparatus 116A may comprise one or more polymers, metals, and/or fabric-like materials configured as a flexible tube, or any similar substances and configurations as will be appreciated by those skilled in the relevant art(s) after reading the description herein. Additionally, in some aspects, the length and configuration of UCAT apparatus 116A may be adjustable in order to accommodate the demands of different tasks. By way of example and not limitation, UCAT apparatus 116A and any cord(s) 118a-118d associated with system 100A may have the capability to expand and/or collapse in a fashion similar to that of a rubber band.

Figure 1B:
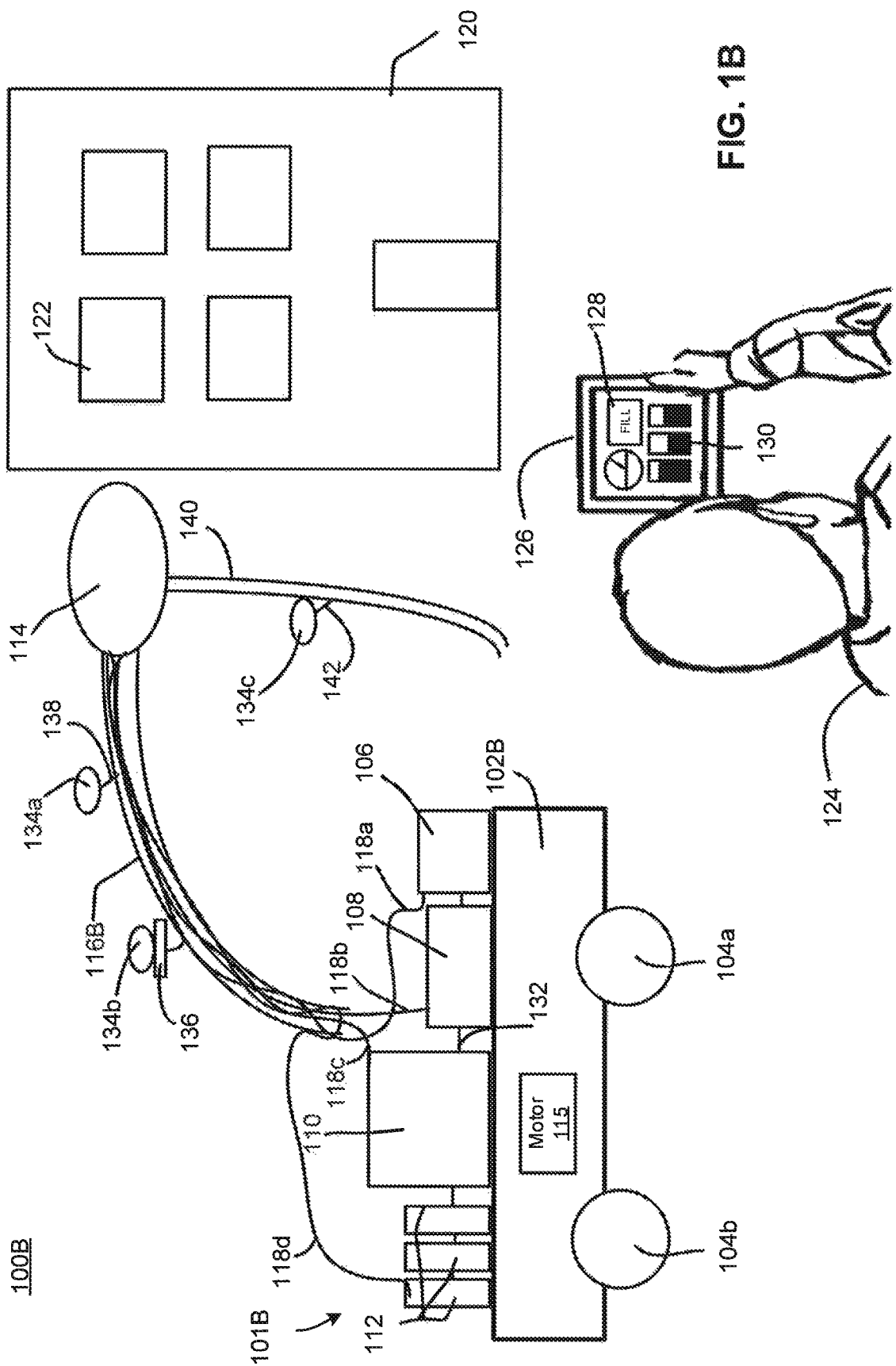
FIG. 1B is a block diagram of an umbilical cabling and tethering (UCAT) operations system with a UCAT assist system in a land-based environment, according to an aspect of the present disclosure.

FIG. 1B is a block diagram of an umbilical cabling and tethering (UCAT) operations system 100B with a UCAT assist system (i.e., UCAT assist system 1530A or 1530B of FIGS. 15A and 15B, respectively) in a land-based environment, according to an aspect of the present disclosure. The UCAT operational system 100B is similar to UCAT operational system 100A hence only the differences will be described in detail. The UCAT assist system may include one or more mini robotic devices 134*a*, 134*b*, and 134*c* similar to robotic device 114 which may be located at various intervals along the UCAT apparatus 116B and/or tube 140 in order to support its weight, move it around, manipulate it, and/or attach it to a structure for weight support and stabilization. Such a configuration may be particularly necessary when robotic device 114 is performing tasks that are significantly above or below ground level and/or a water surface, where UCAT apparatus 116B would otherwise be suspended over a considerable distance without any support. Cordless mini robotic devices could, in some scenarios, stay on the mobile base station 101B or "parked" on the ground or in some "out of the way location" until needed when they would fly up or submerge, attach to the UCAT apparatus and move/manipulate the UCAT apparatus.

In aspects wherein UCAT apparatus 116B is attached to a structure, mini robotic device(s) 134*a* and 134*b* may attach, detach, move, and reattach apparatus 116B as needed as robotic device 114 moves during the performance of its task(s). Mini robotic device(s) 134*a* and 134*b* may draw power supplies from UCAT apparatus 116B and have their power supplies monitored and replenished in ways similar to robotic device 114 via mini tethering apparatus 138. The mini robotic devices may have self-contained power and operations. More specifically, mini robotic device(s) 134*a*-134*c* may be configured to access mobile base station 101B via one or more cords 118*a*-118*d* within UCAT apparatus 116B connected to mini tethering or UCAT apparatus 138 for the purpose of obtaining materials and/or power supplies from reservoir 110, supplemental device(s) 112, and/or power supply or resupply source 106.

In some alternative aspects, one or more mini base stations 136 similar to landing pad 400A or 400B (shown in FIGS. 4A and 4B) or an underwater or outer space docking station may be modified to be integrated with UCAT apparatus 116B at various intervals for the purpose of providing materials and/or power supplies to mini robotic device(s) 134*a*-134*c*, as well as a landing pad/docking/recharging station. In some aspects, multiple mini robotic devices 134*a*-134*c* may share one or more landing pads 136. In other aspects, there is one landing pad 136 for each mini robotic device 134*a*-134*c* within system 100B. In some additional aspects, mini robotic device(s) 134*a*-134*c* operate wirelessly within system 100B. In yet some alternative aspects, mini robotic device(s) may make direct physical contact with UCAT apparatus 116B and obtain materials and/or power supplies therefrom either via a physical connection mechanism to the appropriate cord(s) 118*a*-118*d*. In some additional aspects, mini robotic device(s) 134*a*-134*c* may contain sensors as well as various computational elements for facilitating the ability of device(s) 134*a*-134*c* to communicate with system 100B and to autonomously determine when to provide assistance/implement a task for any component of system 100B and thereafter actually engage in providing such assistance at a time determined to be appropriate. Alternatively, mobile base station 101B, robotic device 114, UCAT apparatus 116B, and/or computing device 126 may send instructions to mini robotic device(s) 134*a*-134*c* for performing any one of a variety of tasks. When not in use, mini robotic device(s) 134*a*-134*c* may be stored on a designated part of mobile base station 101B or another designated area until they are needed, as will be described in more detail. The mobile base station 101B includes a mobile platform 102B configured to be propelled by motor 115. The mini robotic devices can also act as autonomous "helpers" determining on their own that the system and UCAT apparatus need assistance and/or they can be controlled by the mobile base station 101B or the robotic device/drone 114. Further the mini robotic devices are interchangeable with the robotic device 114 allowing multiple robotic devices to coordinate and work simultaneously from a single UCAT apparatus.

Mini base station(s) 136 may comprise support arms, cables, or other similar structures as will be appreciated by those skilled in the relevant art(s) after reading the description herein in order to attach them to UCAT apparatus 116B with stability. In aspects wherein UCAT apparatus 116B is not on a solid surface, mini base station(s) 136 may include means for hovering in the air and/or maintaining a certain depth under water. In yet some additional aspects, mini base station(s) 136 may be constantly attached to mini robotic device(s) 134 while system 100B is functioning. In such aspects, mini robotic device(s) 134 may keep mini base station(s) 136 in position either completely independently or in conjunction with positioning mechanisms within mini base station(s) 136 as described previously.

In some scenarios, the mini robotic devices may retrieve mini base stations or landing pads from the mobile base station or elsewhere and via quick connect options attach it to the UCAT apparatus. Likewise the mini robotic devices could disconnect a mini base station (or landing pad) and return it to the ground, a repository or the mobile base station 101B. The mini robotic devices are also able to retrieve various hooks, wires, clips, etc. from the ground, a repository, or the mobile base station 101B and attach them to, reposition them from, or remove them from the UCAT apparatus and structures the UCAT apparatus may want to connect or attach.

In some aspects, mini robotic device(s) 134 may retrieve mini base station(s) 136 from mobile base station 101B or any other location and attach mini base station(s) 136 to UCAT apparatus 116B via quick connection mechanisms. Likewise, mini robotic device(s) 134 may remove mini base station(s) 136 from UCAT apparatus 116B and deposit mini base station(s) 136 within a designated area on mobile base station 101B and/or any other designated location. Additionally, mini robotic device(s) may also be able to retrieve various hooks, wires, clips, and/or similar elements as will be appreciated by those skilled in the relevant art(s) after reading the description herein from a container configured as a supplemental device 112 within mobile base station 101B or any other designated location and attach them to, reposition them on, and/or remove them from UCAT apparatus 116B for the purpose of connecting mini base station(s) 136 and/or other objects thereto.

Figure 15A:
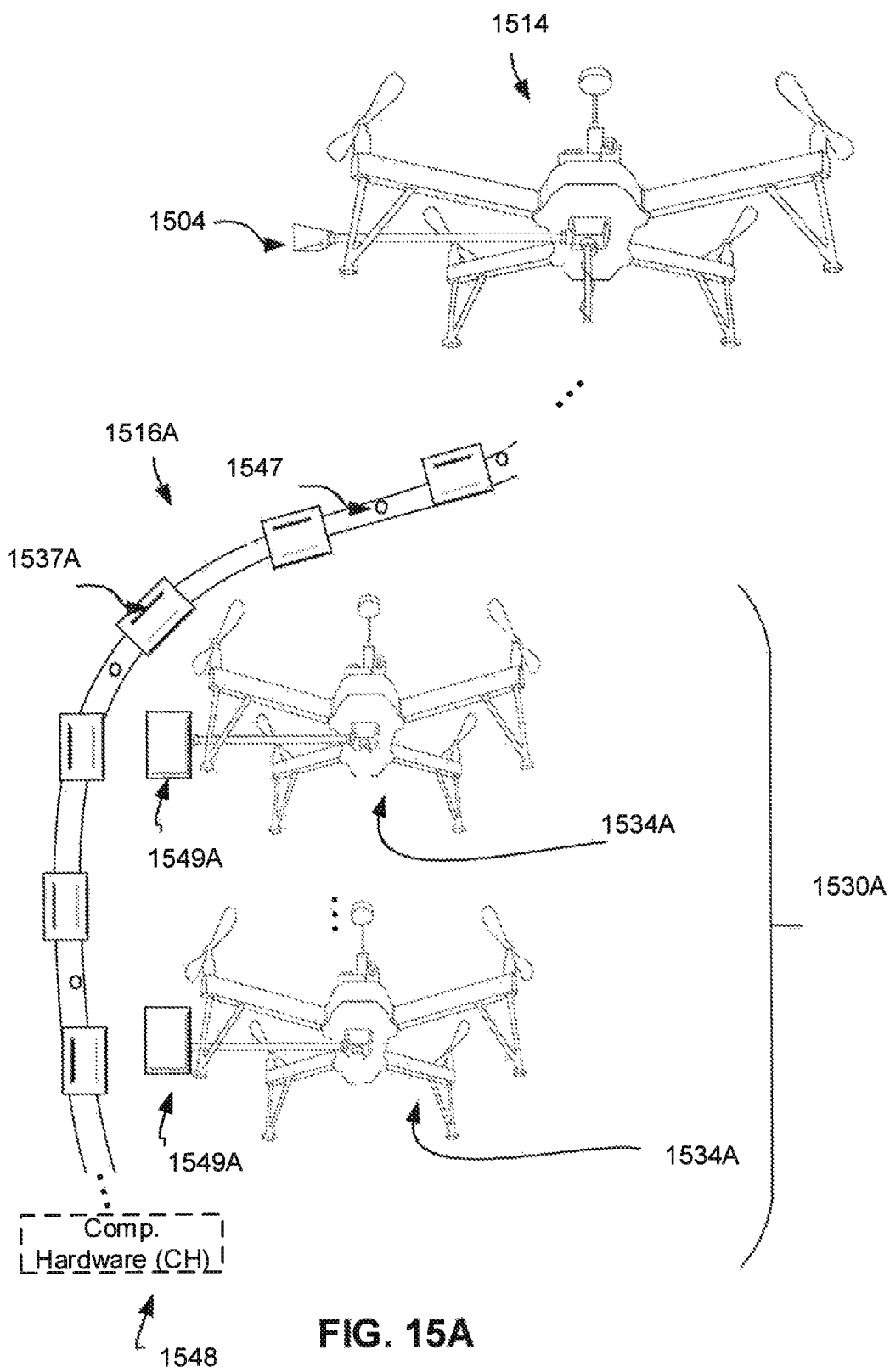
FIG. 15A is a view of the UCAT assist system, according to an aspect of the present disclosure.
Figure 15B:
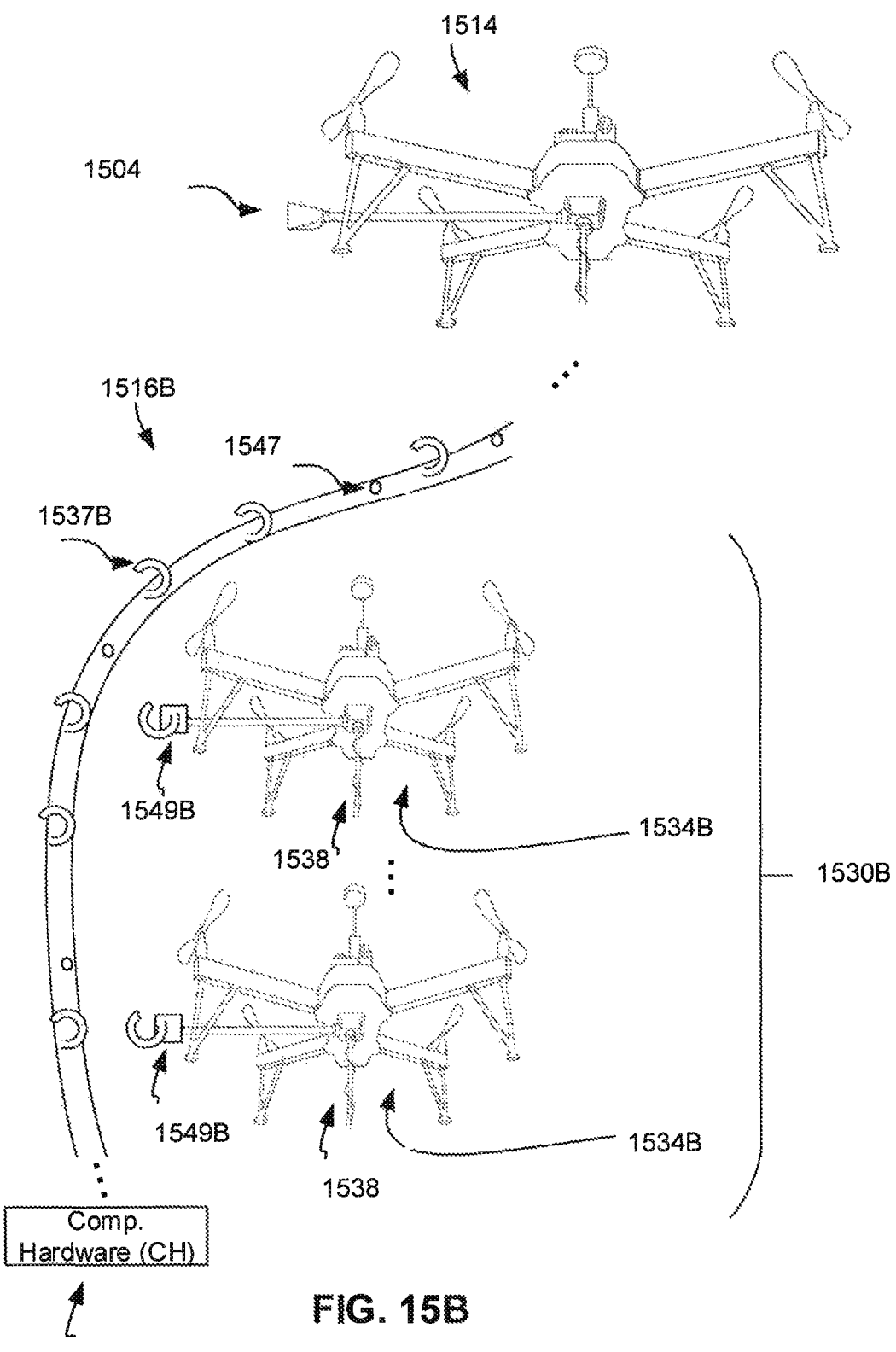
FIG. 15B is a view of the UCAT assist system, according to an aspect of the present disclosure.

UCAT apparatus 116A, 116B or 116C may further comprise its own computational hardware, including embedded processors, sensors, and similar devices as will be appreciated by those skilled in the relevant art(s) after reading the description herein, as will be describe in more detail in relation to FIGS. 15A and 15B. The embedded processors of the UCAT apparatus may be part of computational hardware 108 and/or in a mobile computing device. The computational hardware may allow the other computational devices of system 100A, 100B or 100C to have the ability to determine the position and current functionality status of UCAT apparatus 116A, 116B or 116C, as well as similar information as will be recognized by those skilled in the relevant art(s) after reading the description herein. By way of example and not limitation, system 100A, 100B or 100C may be able to determine and display to user 124 that one or more cords 118a-118d and/or UCAT apparatus 116A, 116B or 116C itself is not functioning properly due to a physical deformation, operational failure, or potential failure sensed by the computational hardware or reported by the software, user, or other input.

Figure 1C:
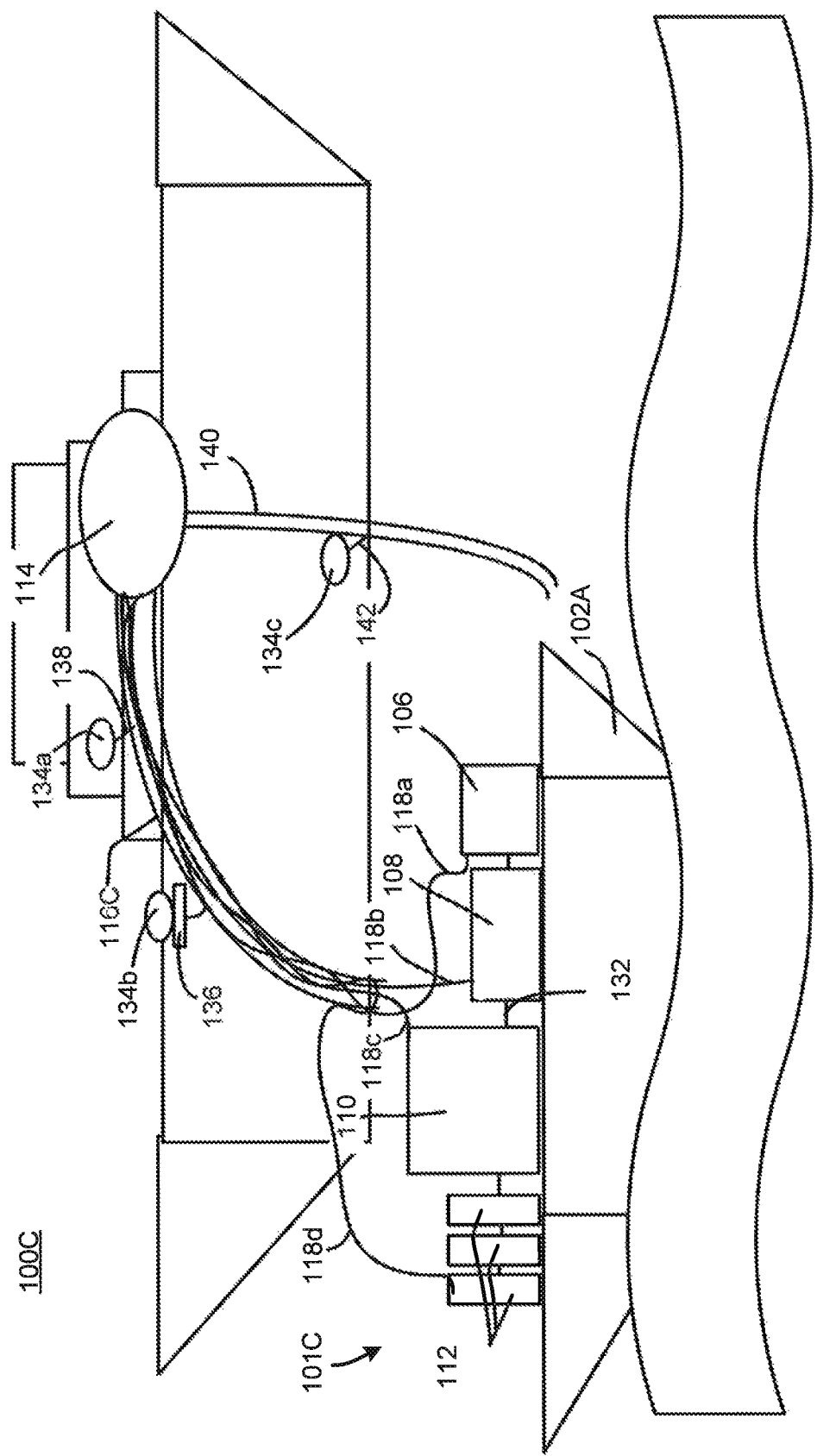
FIG. 1C is a block diagram of an umbilical cabling and tethering (UCAT) operations system with a UCAT assist system in a water-based environment, according to an aspect of the present disclosure.

FIG. 1C is a block diagram of an umbilical cabling and tethering (UCAT) operations system 100C with a UCAT assist system in a water-based environment, according to an aspect of the present disclosure. The system 100C may omit the UCAT assist system as the UCAT assist system may be a modular add-on functionality to system 100C. In system 100C wheels 104a and 104b are not included with mobile base station 101C. In such aspects, mobile base station 100C may be configured to hover in the air, float on a body of water via mobile platform 102C, or be partially or completely submerged within a body of water and may be movable by the use of propellers, propulsion forces, or any other appropriate means as will be apparent to those skilled in the relevant art(s) after reading the description herein. The mobile platform 102C is configured to be navigated in a body of water to carry out the tasks at hand. By way of example and not limitation, mobile base station 101C may be placed within or otherwise secured to the bed of a truck, placed on a boat trailer, or may hang from or be otherwise attached to a flying vehicle such as a blimp or airplane. In other scenarios the mobile base station could be an electric vehicle such as car, truck, golf cart, ATV, etc. (self-driving or otherwise).

In some additional aspects, mobile base station 101A, 101B or 101C is not configured to be mobile, but rather may be used in a stationary fashion. In such aspects, base station 101A, 101B or 101C may hang from or be otherwise attached to a building or other supportive structure, including a rock formation or one or more trees, or any object capable of receiving and securing base station 101A, 101B or 101C as may become apparent to those skilled in the relevant art(s) after reading the description herein.

Material(s) reservoir 110 may be integrated with one or more interchangeable supplemental devices 112 to enhance the usability of the materials it contains. By way of example and not limitation, in an instance wherein robotic device 114 is a drone engaged in washing a window 122 on a structure 120, material(s) reservoir 110 may contain water and be integrated with a supplemental device 112 that contains soap to produce a soap and water mixture. In some aspects, material(s) reservoir 110 may contain automated stirring and/or mixing elements in order to thoroughly mix substances added thereto from one or more supplemental devices 112. Such stirring/mixing elements may comprise metallic or plastic blades or any similar structure(s) as will be appreciated by those skilled in the relevant art(s) after reading the description herein, and may be controlled by computing device 126 and/or computational hardware 108. Thus, soap from a supplemental device 112 may be thoroughly mixed with the water in reservoir 110. The soap and water mixture may be further enhanced by another supplemental device 112 in the form of a pressurized pump to provide added water pressure to the mixture when it is sprayed by a nozzle 206 (FIG. 2) attached to robotic device 114.

An additional supplemental device 112 may comprise a water heater in order to add warmth to the mixture of soap and water so as to increase its cleansing abilities. Additional supplemental devices 112 may include compressors, dispensers, cameras, computers and processors and similar devices as will be appreciated by those skilled in the relevant art(s) after reading the description herein. Having all the necessary materials for system 100A, 100B or 100C contained within reservoir 110 and supplemental device(s) 112 allows for robotic devices 114 that are used with the system to be smaller and therefore more efficient in operation. This is because they do not have to carry the materials onboard and therefore require less power to operate. As will be apparent to those skilled in the relevant art(s) after reading the description herein, although a singular reservoir 110 is referenced throughout this description, more than one reservoir 110 may be configured with mobile base station 101A, 101B or 101C, either in the form of or in addition to supplemental device(s) 112.

In some aspects, reservoir 110 and/or supplemental device(s) 112 contain one or more compartments in order for multiple substances to be contained therein. The substances may either be used to create a mixture, may be used as alternatives to one another, or may influence each other in other ways as will become apparent to those skilled in the relevant art(s) after reading the description herein (e.g., ice in a compartment keeping a substance in a different compartment cold). By way of example and not limitation, a material(s) reservoir 110 may contain two compartments: one that contains red paint and another that contains blue paint. Robotic device 114 may use the red paint for some parts of a project and switch to the blue paint for other parts; or, robotic device 114 may access various amounts of red and blue paint simultaneously in order to obtain various shades of purple wherein painting application and other applications are described in detail in U.S. patent application Ser. No. 14/674,524 filed Mar. 31, 2015 entitled "INDOOR AND OUTDOOR AERIAL VEHICLES FOR PAINTING AND RELATED APPLICATIONS" incorporated herein by reference as if set forth in full below. Alternatively, stirring/mixing elements within material(s) reservoir 110 may mix the red and blue paint before it leaves reservoir 110. Further, such coatings may be variable in their composition and use of material from reservoir 110 and supplemental device(s) 112 in order to "spot treat" different areas with thicker or thinner coatings, coatings that may contain more or less supplemental material such as sand, microscopic granulates of metal, water, air, gases, chemicals, organic and inorganic compounds, and similar substances as recognized by those skilled in the relevant art(s) in order to ensure the areas of special concern such as "spot treated areas" receive the intended coating or material(s) application.

Power supply source 106, material(s) reservoir 110, supplemental device(s) 112, and/or UCAT apparatus 116A, 116B or 116C may contain various sensors and accompanying mechanisms that may function to provide system 100A, 100B or 100C, robotic device 114, or mobile computing device 126 with information regarding the status of any materials and/or power supplies contained therein, including but not limited to, amount remaining, pH level, viscosity, temperature, mixture ratios, and similar information as will be appreciated by those skilled in the relevant art(s) after reading the description herein. By way of example and not limitation, in an instance wherein robotic device 114 is a drone engaged in spraying a coating material on a structure or part of a structure, reservoir 110 may receive various components from supplemental device(s) 112 such as sand, microscopic granulates of metal, water, air, gases, chemicals, organic and inorganic compounds, and similar substances as recognized by those skilled in the relevant art(s) in order to maintain a certain material viscosity, chemical composition, pressure level, temperature, or other similar state as recognized by those skilled in the relevant art(s).

Power supply source 106 may comprise one or more batteries, solar panels, one or more electrical generators, one or more storage tanks for gaseous or liquid fuel, or any other source(s) of power that may be supplied to robotic device 114 and mobile base station 10A, 101B or 101C and the other components of system 100A, 100B or 100C as will be appreciated by those skilled in the relevant art(s) after reading the description herein. In some aspects, power supply source 106 is directly connected to the local power grid via, for example, a domestic outlet, in order to give power supply source 106 access to a continuous flow of electrical power which may in turn be relayed to robotic device 114 and/or utilized by mobile base station 101A, 101B, or 101C and/or any other component of system 100A, 100B or 100C, including computing device 126. In aspects wherein power supply source 106 is a storage tank for gaseous, solid, semi-solid, or liquid fuel, a pump or other mechanism may be associated with power supply source 106 in order to transfer it through a tube within UCAT apparatus 116A, 116B or 116C to robotic device 114.

Computational hardware 108 may comprise an intelligent command and control system, such as, by way of example and not limitation, a computer tablet, embedded systems, or any similar configuration as will be appreciated by those skilled in the relevant art(s) after reading the description herein. Computational hardware 108 may also comprise wireless connectivity modules to allow it to communicate wirelessly with computing device 126, robotic device 114 and the rest of system 100A, 100B or 100C. Additionally, computational hardware 108 may comprise components such as processors, controllers, communication conduits, and other modules as recognized by those skilled in the relevant art(s) that allow it to receive instructions from computing device 126 and interpret and/or transmit them to robotic device 114, mini robotic device(s) 134a, 134b or 134c, the UCAT apparatus 116B or 116C, the mini base stations (or landing pads) 136, and/or any and all the components of mobile base station 101B or 101C directly via cord(s) 118b or wirelessly via corresponding wireless connectivity modules within computational hardware 108 and robotic device 114 and all other components and sub systems of system. Furthermore, computational hardware 108 may comprise components that allow it to control the movement of mobile base station 101 via a motor 115 housed within mobile base station 101A or 101B, such movement based either according to instructions directly from user 124, sent by computing device 126, sent by robotic device 114, or sent by UCAT apparatus 116A, 116B or 116C. Instructions may be sent by robotic device 114 or UCAT apparatus 116A, 116B or 116C wirelessly or via cord(s) 118b.

Computational hardware 108 may also be interconnected, either directly via wires and/or cables or wirelessly via wireless connectivity modules, to every component associated with system 100A, 100B or 100C in order to monitor and/or control them. By way of example and not limitation, computational hardware 108 may be connected to material(s) reservoir 110 via a connector 132 in order to monitor and control the transfer of materials from reservoir 110 to robotic device 114. Computational hardware 108 may additionally be connected to any pumps, heaters, compressors, valves, switches, supplemental devices 112, and similar devices as recognized by those skilled in the relevant art(s) that may be integrated with system 100A, 100B or 100C in order to control their function and performance. Likewise, computational hardware 108 may be connected to power supply source 106 in order to control how much power is sent to robotic device 114 and/or to initiate a power replenishment or power supply process. In some aspects, computational hardware 108 is configured as a mobile computing device, such as a tablet or any similar device as will be appreciated by those skilled in the relevant art(s) after reading the description herein.

In some aspects, supplemental device(s) 112 may comprise one or more storage containers used to store various accessories 204 (FIG. 2) that may be used with robotic device 114 to assist in the performance of various tasks, as will be outlined in greater detail below. By way of example and not limitation, accessories 204 are tools which may comprise slapping rag brushes, brushes, squeegees, blowers, shovels, scoops, spackling/putty knives, rags, welding components, sanders, sensors, components for additive manufacturing processes, and any similar accessories as will be appreciated by those skilled in the relevant art(s) after reading the description herein. Mini robotic device(s) 134 may have the ability to retrieve accessories 204 and attach/remove them to/from robotic device 114 as needed. The supplemental device(s) 112 may include a vacuum unit or a suctioning device. The terms accessory, tool, and add-on are interchangeably used herein. Further, the mini robotic device(s) 134a, 134b or 134c may be configured to retrieve these components and accessories from the base station or elsewhere and attach them to the main robotic device 114 or other mini robotic device(s) 134a, 134b, 134c.

Supplemental device(s) 112, material(s) reservoir 110, computational hardware 108, and power supply source 106 may all be physically and communicatively joined together via connectors 132. Connectors 132 may comprise tubes, valves, sensors, switches, wires, wireless connectivity modules, cables, pipes, or any other similar structures as will be appreciated by those skilled in the relevant art(s) after reading the description herein. Computational components, including controllers and processors, may be integrated with all the devices of system 100A, 100B or 100C such as to allow them to communicate and function seamlessly with one another.

In some aspects, robotic device 114 may be further integrated with a discharge or intake tube 140. Discharge or intake tube 140 may comprise a hollow, elongated member comprised of one or more polymers, metals, and/or fabric-like materials that functions to transport material(s) away from device 114 and release them into the environment or it may collect material from the environment and relocate it through robotic vehicle 114 (and/or in coordination with the mini robotic devices 134c) or transfer the material to a mobile or stationary base station. In some aspects, several discharge and/or intake tubes 140 may be attached to the robotic device 114 and/or mobile base station 10A. By way of example and not limitation, robotic device 114 may engage in the task of removing snow from the top of a structure. Discharge or intake tube 140 may take the snow away from robotic device 114 and disperse it onto the ground. In another embodiment, collected material from discharge or intake tubes 117 may be transferred via the robotic device 114 and UCAT system 116A to the mobile base station 10A for storage, processing or disposal, including but not limited to expulsion via intake and discharge tube 117.

In the embodiment of FIGS. 1B and 1C, in order to provide for an even distribution of material(s), one or more mini devices 134c may move/reposition discharge or intake tube 140 as needed by attaching thereto via attachment mechanism 142. Similarly mini devices 134a, 134b, or 134c may move/reposition the discharge or intake tube 117. The mini device 134c may be part of the UCAT assist system. Attachment mechanism 142 may comprise one or more components made of one or more polymers, metals, fabric-like materials, or similar elements as will be appreciated by those skilled in the relevant art(s) after reading the description herein. Attachment mechanism 142 may be rigid, semi-rigid, or flexible and may comprise hooks, claws, magnets, or other means of attaching to discharge or intake tube 140 or 117 as will be appreciated by those skilled in the relevant art(s) after reading the description herein. In alternative aspects, discharge or intake tube 140 or 117 can either release material(s) into the environment or transports them to reservoir 110 and/or supplemental device(s) 112 or compartments therein, or other containers not associated with system 100A, 100B or 100C for storage until they can be properly disposed of, processed, or otherwise dealt with. In such aspects, discharge or intake tube 140 or 117 may be completely or partially integrated within the casing of the UCAT apparatus 116A, 116B or 116C. As shown, the discharge or intake tube 140 is separate from the casing of the UCAT apparatus 116A, 116B or 116C. In an embodiment, the UCAT apparatus may include the casing tethering the robotic device 114 to the mobile base station and the casing of the discharge or intake tube 140.

In some aspects, mobile base station 101A or reservoir 110 may be further integrated with a discharge and/or intake tube 117. The discharge and/or intake tube 117 may comprise a hollow, elongated member comprised of one or more polymers, metals, and/or fabric-like materials that functions to transport material(s) away from mobile base station 101A and release them into the environment or it may collect material from the environment and relocate it through the mobile base station 101A (and/or in coordination with the mini robotic devices 134d) or transfer the material through the UCAT apparatus to robotic system 114 or mini robotic systems 134a or 134b. In some aspects, several discharge and/or intake tubes 117 may be attached to the mobile base station 101A. By way of example and not limitation, robotic device 114 may engage in the task of irrigating crops. The discharge and/or intake tube 117 may be placed in a lake or pond and water transferred to robotic system 114 to irrigate the crops. Further in some instances supplemental device(s) 112 and material(s) reservoir 110 may be utilized to add, mix, filter, and prepare the lake or pond water with pesticides, fertilizers, seeds, etc. In another example, the discharge or intake tube 140 could be dropped into a pool and the pool water "sucked up" through the UCAT apparatus 116A, 116B or 116C and into the reservoir 110 where it can be treated and discharged via the discharge and/or intake tube 117.

Figure 2:
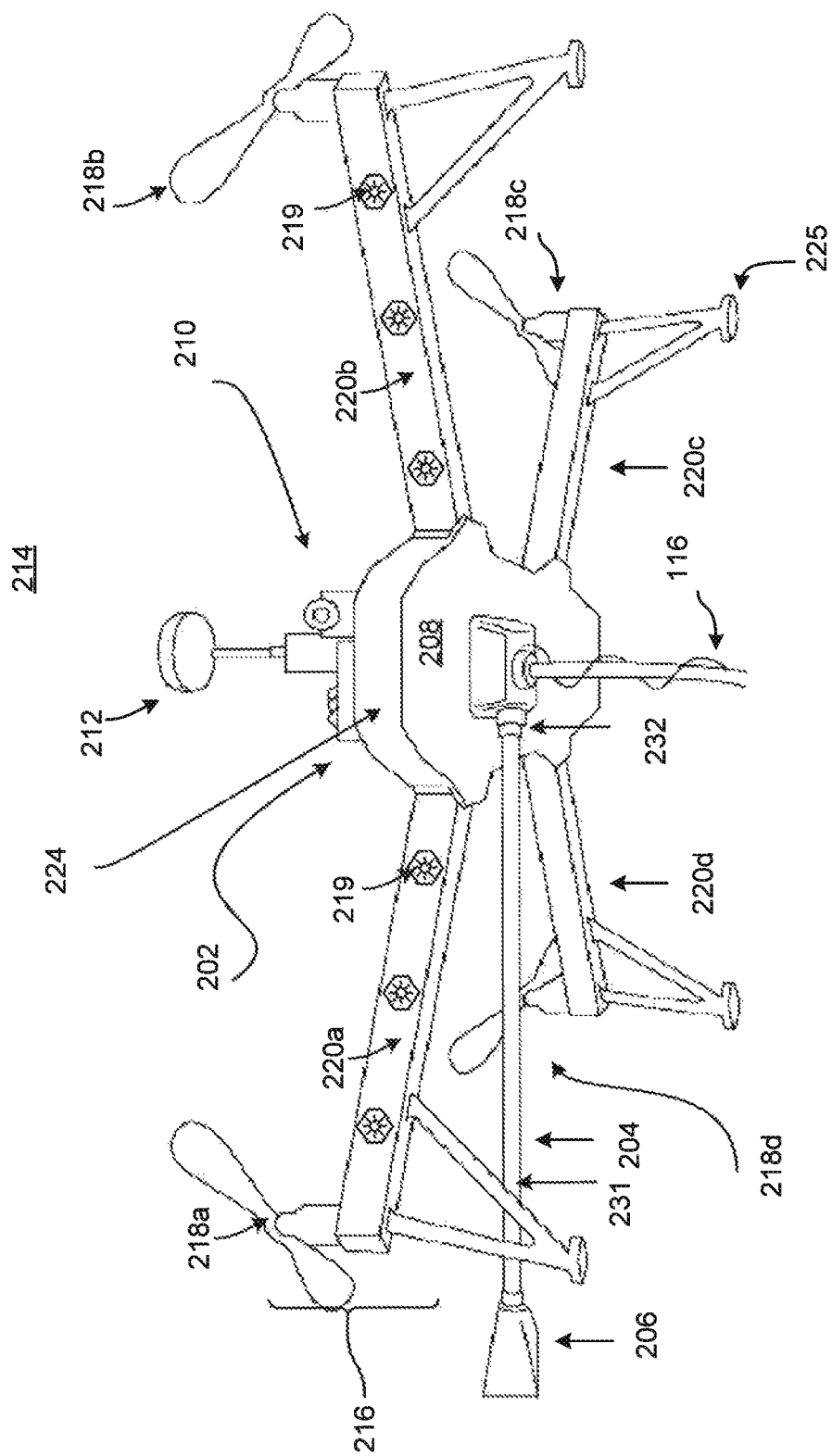
FIG. 2 is a perspective view of an aerial vehicle that may be used within the system of FIGS. 1A-1C having interchangeable arms for housing tools to perform a variety of tasks, according to an aspect of the present disclosure.

Referring now to FIG. 2, a perspective view of an aerial vehicle 214 that may be used within system 100A, 100B or 100C having interchangeable arms for housing tools to perform a variety of tasks, according to an aspect of the present disclosure, is shown.

Aerial vehicle 214 is one of a variety of robotic devices 114 that may be used with UCAT apparatus 116A, 116B or 116C and mobile base station 101A, 101B or 101C. Any of the features discussed in conjunction with aerial vehicle 214 may be configured for integration with the more general robotic device 114.

Figure 3:
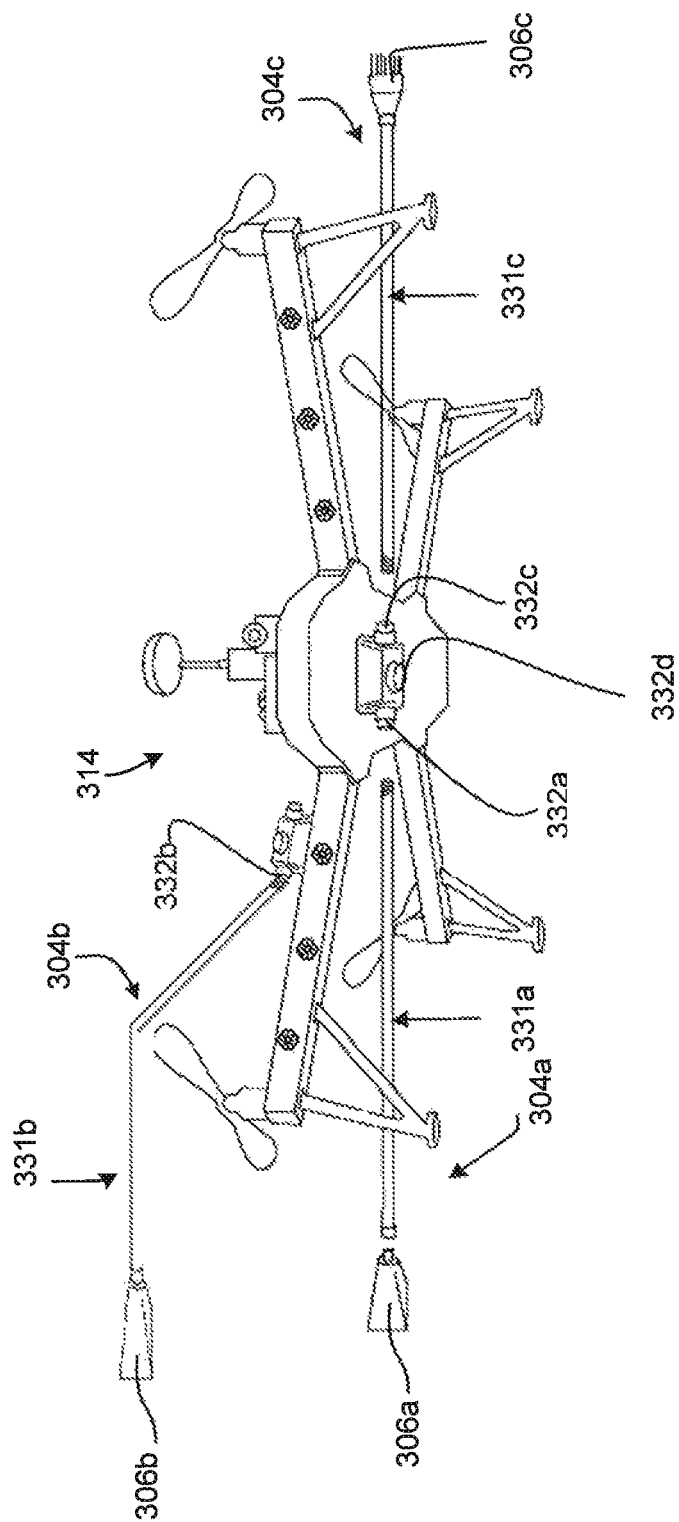
FIG. 3 is a perspective view of an aerial vehicle having multiple add-on attachment points, according to various aspects of the present disclosure.
Figure 5:
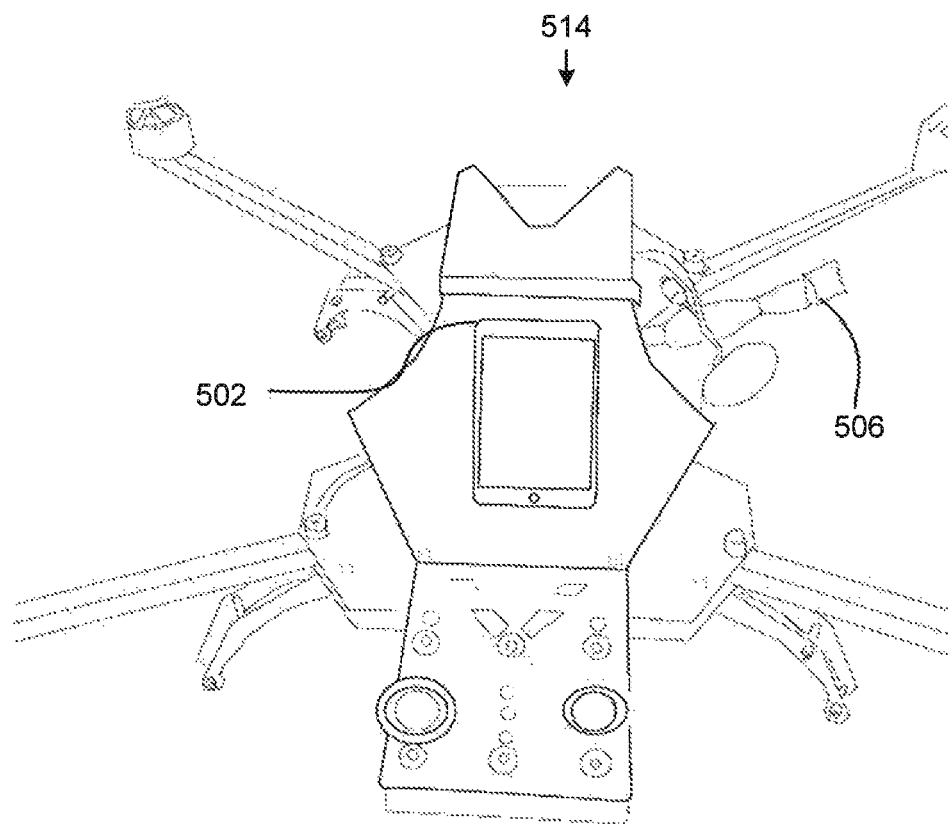
FIG. 5 is a top view of an aerial vehicle including a removable mobile computing device, according to an aspect of the present disclosure.

Aerial vehicle 214 may be capable of vertically taking off and landing, hovering and precisely maneuvering near walls and other structures. Aerial vehicle 214 may be a rotorcraft such as a multicopter (e.g., a quadcopter). Aerial vehicle 214 includes vehicle command and control systems 202, multiple rotor arms 216, one or more accessories 204 capable of being "swapped out" in service by the mini robotic device, a base/UCAT connection portion 208, at least one sensor 210, and a primary/backup/tertiary power source 224. In some aspects, aerial vehicle 214 includes additional elements, as shown in FIG. 3 and FIG. 5 (the tablet 502 shown in FIG. 5). In other aspects, portions may be omitted from aerial vehicle 214. Each rotor arm 216 includes a rotor (i.e., rotor 218a, 218b, 218c and 218d) at an end portion of a boom (i.e., boom 220a, 220b, 220c and 220d). One or more of the booms 220a, 220b, 220c and 220b may include one or more light emitting diodes (LEDs) 219, speakers or other communications sources.

The command and control system 202 receives inputs from sensors including sensors 210 contained in a sensor area and may work with sensors on the ground, satellites, via a network or other connections) as well as omnidirectional sensor 212, from the mobile computing device 502 shown in FIG. 5, from UCAT apparatus 116 (i.e., UCAT apparatus 116A, 116B or 116C), and/or from mobile base station (i.e., mobile base station 101A, 101B or 101C) in order to determine the positioning of aerial vehicle 214 relative to its surroundings and for other tasks/operations. Command and control system 202 (or controlled by the tablet 502 or mobile computing device shown in FIG. 5) controls a plurality of rotors 218a-218d in order to pilot aerial vehicle 214, controlling altitude and attitude, including pitch, yaw and angular orientation. Command and control system 202 may receive instructions from user 124 in multiple ways, including via an onboard device (i.e., table 502 or mobile computing device) as shown in FIG. 5, with the device detached or attached to aerial vehicle 214, to fly to a designated area and perform a task (e.g., paint a wall, cut in portions of the wall, paint an image on a wall, and the like). Such instructions may be received via direct data connection, wireless data connection, or input via an integrated input device, such as computing device 126. In some aspects, computing device 126 is not integrated directly with aerial vehicle 214 and/or system 100A, 100B or 100C, but rather communicates with vehicle 214 and/or the rest of system 100A, 100B or 100C via network connectivity, such as that provided by the global, public internet, via various data storage and communication modules as will be recognized by those skilled in the relevant art(s). In such a configuration, computing device 126 may access system 100A, 100B or 100C and/or aerial vehicle 214 remotely. Aerial vehicle 214 may operate autonomously after receiving instructions. In another aspect, a user pilots aerial vehicle 214 to the designated area and causes aerial vehicle 214 to perform the desired task by sending a series of commands (i.e., remote control operation) such as disclosed in U.S. patent application Ser. No. 14/730,187, entitled "MOBILE COMPUTING DEVICE-BASED GUIDANCE NAVIGATION AND CONTROL FOR UNMANNED AERIAL VEHICLES AND ROBOTIC SYSTEMS," filed Jun. 3, 2015, incorporated herein by reference in their entirety. One such command may be to paint a desired portion of a wall by flying in a raster or other pattern and spraying paint on the wall during the flying of the pattern. Another command may be to "blot out" an electrical receptacle whereby the aerial vehicle 214 would paint the electrical wall receptacle with the same paint of the same color as the surrounding wall and would not cut in around the receptacle leaving it unpainted.

When the aerial vehicle 214 is used off-shore, wireless communications may include marine communications, satellite communications and/or underwater communications.

During autonomous or semi-autonomous operation, command and control system 202 (or controlled by the tablet 502 shown in FIG. 5) utilizes the sensors to position aerial vehicle 214 in advantageous positions and orientations in order to carry out the desired task. For example, where aerial vehicle 214 is painting a structure, command and control system 202 (or controlled by the tablet 502 shown in FIG. 5) pilots aerial vehicle 214 to an ideal distance away from the structure in order to paint the structure via accessory 204 adapted for painting, such as a sprayer, a brush, or other instrument apparent to those skilled in the relevant art(s) after reading the description herein. For example, accessory 204 may comprise an elongated arm 231 having one connection end 232 removably attached to the aerial vehicle 214 and an opposite end having a removable spray nozzle 206, such as without limitation, for applying paint. Spray nozzle 206 may be configured to optimally apply paint when positioned normal to the surface being painted and offset three to six inches, or a variable distance as would be appropriate based on the material(s) being applied, the volume of the application, as well as similar factors as will be recognized by those skilled in the relevant art(s) after reading the description herein. In this instance command and control system 202 (or controlled by the tablet 502 shown in FIG. 5) will detect the surface using sensors and pilot aerial vehicle 214 to an attitude and position where spray nozzle 206 is within the required distance and tolerance from the surface being painted based on the application needs and is normal to the surface. In an embodiment, the accessory 204 is interchangeable.

Command and control system 202 (or controlled by the tablet 502 shown in FIG. 5, or a combination of system 202 and tablet 502) additionally controls the action of accessories 204. Accessories 204 may also contain their own controllers or processors and information/data interfaces for the purposes of connecting to and exchanging data with system 202 and/or system 100A, 100B or 100C. For example, a paint applicator is activated by command and control system 202 when aerial vehicle 214 reaches the desired location relative to the surface to be painted.

Command and control system 202 may be preprogrammed, controlled by the tablet 502 shown in FIG. 5, and/or controlled by the onboard controller/processor of an accessory 204 to determine a flight path to paint such an object or it may contain algorithms which determine, on-the-fly, the appropriate actions to take in order to paint the specified surface(s). Further, monitors and sensors, including but not limited to video cameras attached to aerial vehicle 214 or an arm or one or more attachments can monitor the paint application and adjust the paint flow or paint pressure or require aerial vehicle 214 to adjust in real time or to complete an additional "pass" over the area with another spray for optimal paint application and coverage. That is, sensors such as cameras may be used to detect "skips" or "holidays" (instances where the paint application is not optimal and some of the old paint color may show through). Further sensors such as Low-Voltage Pinhole Detectors or others that, among other things, inspect various coatings on conductive substrates for holidays, pinholes and other small defects can be attached as modular add-ons (tools) 204 and with nozzle 206. Other sensors for determining paint thickness or depth (old or new paint or a combination thereof) can also be added. Based on this detection, command and control system 202 may cause aerial vehicle 214 to repaint such deficient areas, report conditions to an operator, log the data, or take other actions including but not limited to modifying the material being applied.

Aerial vehicle 214 may measure local environment properties such as the ambient temperature, humidity and the like, access that information remotely from a repository such as the Internet or from locally deployed environmental sensors (such as sensors in the mobile base station 101A, 101B or 101C or the remote "micro weather/environmental" sensors) in order to determine when to apply a subsequent coat of paint or to initiate specified actions, such as, by way of example and not limitation, to stop painting while a gust of wind passes and subsides. Furthermore, where aerial vehicle 214 is painting outside or performing other tasks in an outdoor environment, aerial vehicle 214 may be programmed to access weather forecast data from third party sources and determine the appropriate timeframe to complete such tasks.

Aerial vehicle 214 may also access the manufacturer of the paint or material being applied or sprayed or a general knowledge repository such as the internet for information about the material being applied such as optimal viscosity, level or volume of material required for various surfaces (such as the microns of thickness the paint should be applied), known failures or best management practices of application of the material etc. Further, aerial vehicle 214 may also access the manufacturer of the structure or material being painted or coated for information such as physical layout and blueprints of the structure as well as optimal coating material (i.e. paint or coating) to use on the physical material (steel, aluminum, brick, wood, etc.) including best management practices for maintenance of the structure and structure material such as application best management practices or specifications including but not limited to specific types of coatings to best ensure rust prevention or the integrity of the structure's materials. Additionally, aerial vehicle 214, mobile base station 101A, 101B or 101C, tablet 502, and/or computing device 126 may access the architectural blueprints, drawings, and other information about the structure from a local or remote database or data repository of the manufacturer, builder, surveyor, or similar source related to the structure itself, its composition, construction, maintenance, as well as any similar aspects as will be recognized by those skilled in the relevant art(s).

Sensors on robotic device 114 or the UCAT apparatus 116A, 116B or 116C may analyze factors such as moisture content and the thickness of concrete, as well as the depth and condition of the reinforcement to determine material to apply (paint, polymer, fiberglass, epoxy, liquid metal, liquid or spray concrete, etc.), type of application (spray, glob on [apply a lump of a semiliquid substance], roll or brush on, etc.), volume of material to use, etc. Further sensors such as dry or wet film thickness digital gauge, ultrasonic thickness measuring devices, and others can be utilized to provide environmental information. One tool may include devices for air quality sampling and if the air quality was very acidic, for example near an industrial exhaust vent, the system could modify its materials application and the material itself to account for it. The aerial vehicle 214 may be configured for hazardous environments or varying environments. The hazardous environments may include, without limitation, environments with hazardous materials in the air and/or extreme temperatures, The camera or optical lenses of the on-board camera or lens of a tool may need to be protected by a coating (such as a hydrophobic coating) to maintain vision clarity through the lens. The chassis of the aerial vehicle 214 may be coated with a material to prevent corroding or other damage to the chassis as the result of operation in hazardous environments.

In some applications, the task performed by the aerial vehicle may cause an extreme environment for example, when using hot high pressure water jets for cleaning. For example, cleaning of a heat exchanger with hot high pressure water jets, when cleaning, may create a caustic or acidic environment. Thus, the aerial vehicle 214 may require coatings for protecting one or more components from such caustic or acidic environment. Likewise, the mobile base station may require similar coatings for some environments.

Accessory 204 may be an appendage or other member attached or removably attachable to aerial vehicle 214. Accessory 204 may be changed in order to adapt aerial vehicle 214 to specific uses. In some aspects, aerial vehicle 214 is capable of changing accessory 204 autonomously. In other aspects, one or more separate aerial vehicles 214 and/or mini robotic devices 134 (not shown in FIG. 2) may change accessory 204 with or without the assistance of the original aerial vehicle 214 (the one requiring the change of accessory 204). Accessory 204 may comprise an accessory tip 206, such as spray nozzle 206 as described above. In some aspects, aerial vehicle 214 comprises multiple accessories 204. Some accessories 204 are equipped with sensors such as pressure sensors in order to aid in precisely identifying the location of walls and the like. Accessory 204 may include similar sensors to the sensors included in sensor area 210. Some accessories 204 include functional appendages that affect actions such as spraying, rubbing or wiping, cutting, grabbing, cutting, sanding, polishing and more. In some aspects, an accessory 204 may comprise multiple functionality parts and/or accruements thereof in order to perform various tasks. By way of example and not limitation, a single accessory 204 may comprise a "scraper" portion to smooth or otherwise prepare a surface for coating as well as a portion for spray nozzle 206 in order to apply one or more coating materials to the prepared surface.

Accessories 204 may be rigidly mounted to aerial vehicle 214 or they may be mounted for movement. Accessory 204 mounted for movement may comprise one or more motors or actuators controllable by command and control system 202 (or controlled by the tablet 502 shown in FIG. 5) in order to adjust the orientation of, for example, attached spray nozzle 206. Such movement is advantageous for cleaning, painting, orienting accessory 204 to reach or point in directions that are otherwise inaccessible and the like. Specifically, a painting accessory 204 attached for movement to aerial vehicle 214 may be pitched upward by causing motor to point accessory 204 upward, altering the attitude of aerial vehicle 214 by pitching a portion of the vehicle upward, or both, in order to cut in near the top of an interior wall. Such action may be necessary in order to avoid running into the ceiling or other obstacle.

One or more accessories 204 may be a rotating brush or other cleaning device configured to clean portions of the surface aerial vehicle 214 will paint, wash, or otherwise interact with. In this manner accessory 204 may brush dirt or other material off the surface, ensuring that paint adheres to the surface more readily. Alternatively, cleaning and polishing via aerial vehicle 214 may be facilitated.

Aerial vehicle 214 is configured to dock with mobile base station 101 and/or a landing pad 400 or connect to/dock with UCAT apparatus 116A, 116B or 116C via an underside portion of aerial vehicle such as base connection portion 208 or the base of the feet or landing legs/wheels/skids 225. Base connection portion 208 includes power and data connectors for recharging or otherwise refilling onboard power source 224 and receiving or transmitting flight and operation information. Base connection portion 208 may also include connections for receiving items such as paint, water, cleaning fluids, solid objects, and the like. Base connection portion 208 connects to the accessory 204 at connection end 232 and includes at least one connection for attachment to the cords of the UCAT apparatus 116A, 116B or 116C.

Sensor area 210 includes one or more sensors which aid the operation of aerial vehicle 214 by gathering information or data for operational performance matrixes and/or historical, environmental, and usage information/data. Sensors may include cameras, infrared sensors, thermal sensors, other visible spectrum sensors, GPS transceivers, magnetometers, laser range finders, sonar, LIDAR, radar, chip-scale combinatorial atomic navigation (C-SCAN), Quantum Assisted Sensing (QuASAR), Visual Simultaneous Localization and Mapping (vSLAM), and other types of sensors or positioning devices apparent to those skilled in the relevant art(s) after reading the description herein. Inertial sensors, displacement sensors, gyroscopes, and other devices may also be integrated into sensor area 210. The sensors at sensor area 210, omnidirectional sensor 212, sensors located on other portions of aerial vehicle 214 and command and control system 202, the mobile computing device 502 shown in FIG. 5, networked or remote computing devices 126 and/or other devices may operate in concert to form a guidance navigation and control system for aerial vehicle 214. Similarly, Infrared Relative Localization (IRLP), Angle Detection Systems, as well as other similar systems as recognized by those skilled in the relevant art(s) may be used to facilitate guidance navigation and control, as well as localization capabilities to determine where in space aerial vehicle 214 is. Additional sensors may have the capability to determine atmospheric compositions, including but not limited to oxygen levels, chlorine levels, and other gaseous levels. In some aspects, sensors may be located on aerial vehicle 214 in areas other than sensor area 210, such as, by way of example and not limitation, the body of aerial vehicle 214, attachments affixed to aerial vehicle 214, and other portions of vehicle 214, including hanging therefrom. In yet some additional aspects, sensors may be located remotely from vehicle 214, such as on UCAT apparatus 116A, 116B or 116C, mobile base station 101A, 101B or 101C, a building, a tree, or any other location as will be appreciated by those skilled in the relevant art(s) after reading the description herein.

Aerial vehicle 214 may further include one or mom visual or audio alert devices such as speakers, LEDs, and the like. Such alert devices may be utilized to warn bystanders to avoid aerial vehicle 214, indicate various statuses of aerial vehicle 214 (e.g., battery status, onboard supply status, task completion status). Similarly, input devices such as microphones and cameras located on aerial vehicle 214 itself or within attachments therewith may be utilized to receive commands and information or data in audio or visual format from its surroundings in order to identify animals, machine noises, humans, voices, traffic sounds, and similar environmental occurrences in order to alert aerial vehicle 214 as well as other components of system 100A, 100B or 100C, robotic device 114 or mobile computing device 126 of unexpected situations and/or instructions that may require a reaction on the part of vehicle 214 and/or other system components.

In some aspects, aerial vehicle 214 is battery powered and power source 224 is a rechargeable battery. In other aspects, aerial vehicle is powered by liquid or gaseous fuels and power source 224 is a storage tank for such fuel. Aerial vehicle 214 may also be powered by UCAT apparatus 116A, 116B or 116C connected to mobile base station 101A, 101B or 101C, or another location such as an electrical outlet.

In some aspects, aerial vehicle 214 may upload data from its use to a remote database. The remote database may receive data from one aerial vehicle 214 or many aerial vehicles 214. The remote database may store information related to the locations of buildings aerial vehicles 214 work on, the conditions of the surfaces being painted and/or cleaned, weather conditions at time of operation, the amount of paint or cleaner used and the like. Among other things, collection of this information allows an aerial vehicle producer to track efficiency of aerial vehicles models, identify improvements that can be made and proactively inform users that a particular aerial vehicle 214 is functioning poorly which may indicate a problem.

Referring now to FIG. 3, a perspective view of an aerial vehicle 314 having multiple add-on attachment points 332a, 332b and 332c, according to various aspects of the present disclosure, is shown. The aerial vehicle 314 is similar to aerial vehicle 214 thus only the differences will be described in detail. Aerial vehicle 314 may be modular in that add-ons (tools) 304a, 304b and 304c may be attached and detached at attachment points 332a, 332b and 332c. In an embodiment, the attachment point 332b may be coupled to a respective one boom. Attachment points 332a, 332b and 332c may be located anywhere on aerial vehicle 314. An add-on (tool) 304a, 304b and 304c may include an elongated arm 331a, 331b and 331c, respectively, connectable to one of many end effectors or nozzles 306a, 306b, and 306c, respectively. The elongated arm 331b is an off-set arm. The elongated arms such as elongated arm 331b may be "flexible", "bendable" or "articulable" as well as having a fixed offset. Attachment points 332a, 332b and 332c may be located at a variety of locations on aerial vehicle 314. Multiple add-ons (tools) 304a, 304b and 304c may be mounted on aerial vehicle 314 simultaneously.

Returning again to FIG. 2, aerial vehicle 214 may have legs/wheels/skids 225 to enable it land and/or roll along a floor or inclined surface (to paint baseboards, etc.). Such legs/wheels/skids 225 may also be utilized to connect to mobile base station (i.e., mobile base station 101A, 101B or 101C) or other location to receive power, refill onboard power source 224 and receive or transmit flight and operation information. Further, legs/wheels/skids 225 may be configured to receiving items such as paint, water, cleaning fluids, solid objects, and the like. In other operations, legs/wheels/skids 225 can be utilized for travel over land, liquid water, ice, or snow to reach the intended destination without aerial vehicle 214 having to fly or leave the ground surface.

Figure 16:
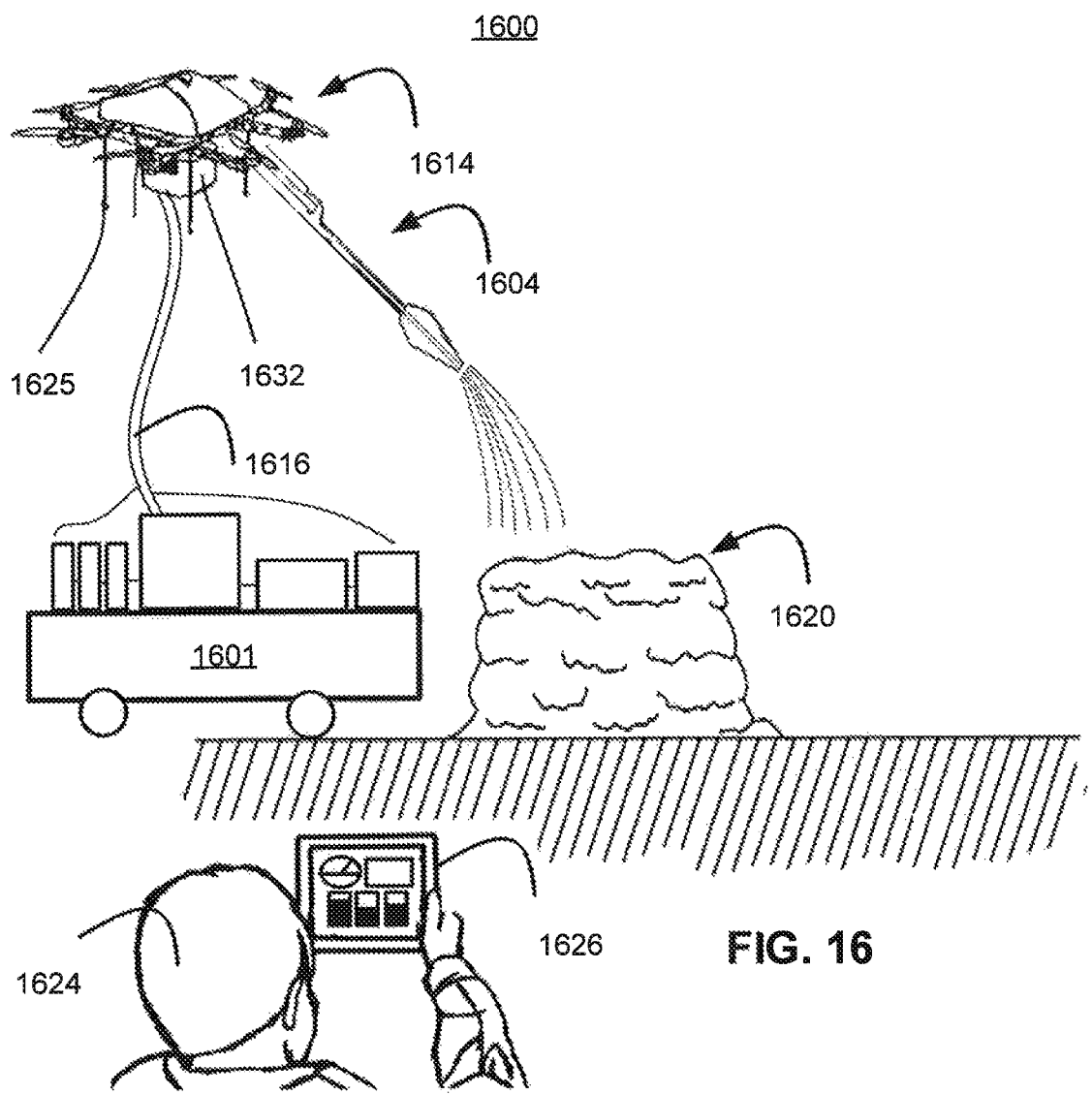
FIG. 16 is a view of a UCAT operations system building a structure, according to an aspect of the present disclosure.

In some aspects, aerial vehicle 214 or 314 may comprise container 1632, as best seen in FIG. 16, as will be described in more detail in relation to FIG. 16. Container (i.e., container 1632) may hold liquid or other material to be dispersed. In some aspects, such as aerial vehicle 214 or 314 includes an accessory 204 or 304a, 304b, 304c such as a vacuum accessory, a "scoop" or similar accessory, or any of a number of accessories to retrieve/receive material including gases, liquids, solids, small animals and insects, soil samples, etc. The container (i.e., container 1632) may be configured to hold the collected material. The contents of container (i.e., container 1632) may be filled or emptied by user 124, by portions of mobile base station 101A, 101B or 101C, or by an automatic container "rotator" that is part of the landing pad shown in FIGS. 4A and 4B, and/or transferred to mobile base station 101A, 101B or 101C via UCAT apparatus 116A, 116B or 116C. Containers (i.e., container 1632) may be modular and detachable via container connectors, thereby enabling aerial vehicle 214 or 314 to rapidly connect to and disconnect from the container (i.e., container 1632). In some aspects, the connection is performed autonomously. In some aspects, container (i.e., container 1632) is a one-gallon, one-quad, or other standard size container, such as the size of a paint can.

Aerial vehicle 214 or 314 may be attached to the ground or mobile base station 101A, 101B or 101C via UCAT apparatus 116A, 116B or 116C. In some aspects, UCAT apparatus 116A, 116B or 116C is electrically connected to aerial vehicle 214 or 314 and connected to the local power grid via, for example, a domestic outlet, in order to provide power to aerial vehicle. UCAT apparatus 116A, 116B or 116C may be connected to container (i.e., container 1632) or another portion of aerial vehicle in order to provide, receive, or discharge fluids or other material. The system 100A, 100B, or 100C, UCAT apparatus 116A, 116B or 116C and aerial vehicle 214 or 314 are designed to be used in underwater and other environments such as inside pipes, ducts, or crawl spaces.

Referring now to FIG. 4A, a perspective view of a landing pad 400A having markings and being configured to provide power, material, and data connections to aerial vehicle 214, according to an aspect of the present disclosure, is shown.

Landing pad 400A may be integrated with mobile base station 101A, 101B or 101C and/or UCAT apparatus 116A, 116B or 116C in order to provide an alternative means of providing power and data connectivity to robotic device 114, mini robotic device(s) 134, and/or other components of system 100A, 101B, or 101C, particularly when devices 114 and/or 134 and/or the other components are in the form of aerial vehicle 214 or 314, and may further act as a landing pad/storage interface for any of the devices and/or components that may be used with system 100A, 100B or 100C. Landing pad 400A is an example of a specific type of station that may be used with system 100A, 100B or 100/c. Any means fulfilled by landing pad 400A may be performed equally well by mobile base station 101A, 101B or 101C, either independently from or in conjunction with landing pad 400A. Landing pad 400A provides power, data, and fluid reservoirs 412 for aerial vehicle 214 in order to facilitate operations. In some aspects, landing pad 400A may be mountable on top of a material(s) reservoir 110, such as a five-gallon paint bucket. In other aspects, landing pad 400A or a modified version thereof is mounted on UCAT apparatus 116A, 116B or 116C or other locations such as on a tower, bridge, building, or similar structure as will be apparent to those skilled in the relevant art(s) after reading the description herein. The landing pad 400A may be placed on the ground in the working area but should not interfere with the movement of the mobile base station. As described later, the landing pad may be located on the mobile base station.

Landing pad 400A includes a landing pad marking 402. Landing pad marking 402 may be machine readable markings to assist aerial vehicle 214 during landing. Landing pad 400A may employ sensors 470, GPS 472, emitters 474, and/or other computational components (CC) 476 to assist aerial vehicle 214 in determining and monitoring aerial vehicle 214 location, as well as to communicate with other computational devices within system 100. Landing pad 400A may also include power and data connections 404a and 404b in FIG. 4A which aerial vehicle 214 connects with upon landing. The power and data connections 404a and 404b may be used to charge the aerial vehicle 214. Landing pad 400A may be a fabric-like or plastic material that can be "rolled up" or "rolled out" for use by aerial vehicle 214. A power supply 408 is electrically connected to power connections 404a and 404b. In some aspects, power supply 408 is a battery, a rechargeable power source, or an independent power source such as liquid or gaseous fuels. In alternative aspects, power supply 408 may be a transformer or power converter connected to an electrical source such as a domestic power outlet providing AC power. Other configurations of power source 408 may be used as will be apparent to those skilled in the relevant art(s) after reading the description herein. In still other aspects, power supply 408 may be power supply source 106. Reservoir 110 and/or one or more supplemental devices 112 (represented by 412 as an embodiment in FIG. 4A, for simplicity and clarity) containing selected fluids or other materials may be integrated or otherwise connected to landing pad 400A in order to provide such material(s) to aerial vehicle 214. Landing pad 400A further includes a platform 406 configured to attach the landing pad to other physical devices or objects. In some aspects, platform 406 is configured to attach to bucket 802 shown in FIG. 8 in order to facilitate painting and other operations. In other aspects, platform 406 may be attached to UCAT apparatus 116A, 116B or 116C or other locations such as on towers, bridges, buildings, or similar structures as will be apparent to those skilled in the relevant art(s) after reading the description herein.

FIG. 4B is a perspective view of a landing pad 400B using beacons and being configured to provide power, material, and data connections to an aerial vehicle 214, according to an aspect of the present disclosure. FIG. 4B is similar to the landing pad 400A thus only differences will be described. The landing pad 400B includes beacons 407. The beacons may include LEDs, radio frequency beacons, sonar, etc. such as without limitation, infrared LED lights detectable by the aerial vehicle 214 to assist in landing.

Referring now to FIG. 5, a top view of aerial vehicle 514 including a removable mobile computing device 502, according to an aspect of the present disclosure, is shown.

Mobile device 502 is a mobile computing device such as a tablet computer. Mobile device 502 may be a commercial off-the-shelf (COTS) tablet computing device or a customer computing device. In some aspects, mobile device 502 operates via an operating system and/or software designed specifically for use with aerial vehicle 514 and/or system 100A, 100B or 100C. The operating system and software may be contained within various computing modules and components as will be recognized by those skilled in the relevant art(s). Mobile device 502 is removable from aerial vehicle 514 and is used by a system user 124 to provide command and control for aerial vehicle 514 or is removed and then reattached to aerial vehicle 514. Mobile device 502 may also be used to actively or passively provide guidance, navigation and control signals to aerial vehicle 514.

Mobile device 502 connects to the system components of aerial vehicle 514 via wireless or wired connection or when attached to aerial vehicle 514. Via this connection, mobile device 502 also receives input signals from sensors onboard aerial vehicle 514, as well as from other sources including UCAT apparatus 116A, 116B or 116C, mobile base station 101A, 101B or 101C, and/or other components of system 100A, 101B or 101C. Mobile device 502 may also include sensors which assist in determining the attitude, elevation, distance from objects, and location of aerial vehicle 514 such as a gyroscope, an accelerometer, one or more cameras, and the like. In some aspects, when connected to aerial vehicle 514, mobile device 502 handles all guidance, navigation, and control for aerial vehicle 514, including the operation of attachments such as spray nozzle 506 and other painting or task oriented attachments. In other aspects, mobile device 502 handles the majority of such functionality. A user may physically detach mobile device 502 from aerial vehicle 514 and, via a user interface, provide operation instructions for aerial vehicle 514 such as a desired flight path, task to be completed, and the like. The aerial vehicle 514 may include a drone, UAV, robotic device 114, a waterproof robotic device or a waterproof UAV.

Figure 6:
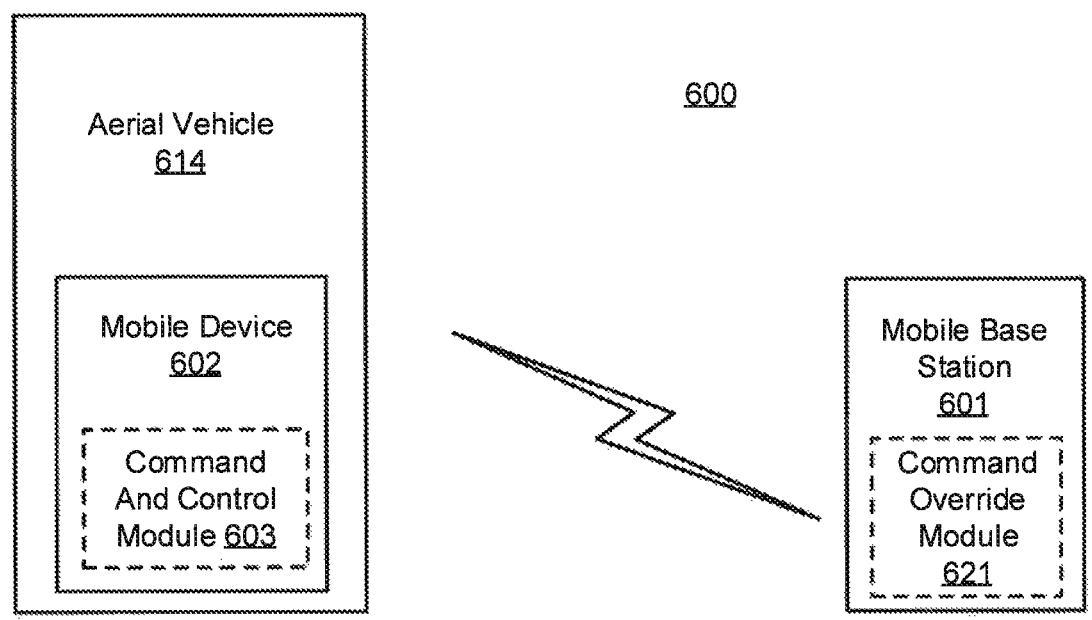
FIG. 6 is a dataflow diagram depicting wireless operation of the aerial operations system, according to an aspect of the present disclosure.

Referring now to FIG. 6, a dataflow diagram depicting certain wireless operations of UCAT operations system 600, according to an aspect of the present disclosure, is shown.

UCAT operations system 600 comprises mobile base station 601 and aerial vehicle 614 (i.e., aerial vehicle 214, 314 or 514). Aerial vehicle 614 includes mobile device 602 containing command and control system modules 603 for communicating with an embedded command and control system onboard aerial vehicle 614 of UCAT operations system 600. User (i.e., user 124) may input commands via mobile device 602. Mobile base station 601 includes a command override module 621 and user controls which enable user (i.e., user 124) to deactivate aerial vehicle 614 or otherwise cause aerial vehicle 614 to return to mobile base station 601 or the ground should the need arise prior to the completion of the flight path provided to mobile device 602. In some aspects, another device is included, such as a cellular transceiver, cellular telephone, tablet, or portions thereof which can communicate with mobile base station 601, aerial vehicle 614, or both devices and send override commands to aerial vehicle 614. In some aspects, commands provided to module 602 are general (e.g., proceed to position X, scan the wall, process the scan, determine areas to be painted and paint the wall) and command and control module 602 determines the appropriate actions to carry out the command. In other aspects, command module 602 receives a general command and generates sub-commands in order to execute the general command. Aerial vehicle 614 may transmit data and information back to mobile base station 601. In some aspects, the landing pad 400A or 400B may provide some of the functionality described in relation to the mobile base station 600 of FIG. 6 such as for communicating with the mini robotic devices 134a, 134b or 134c.

Figure 7:
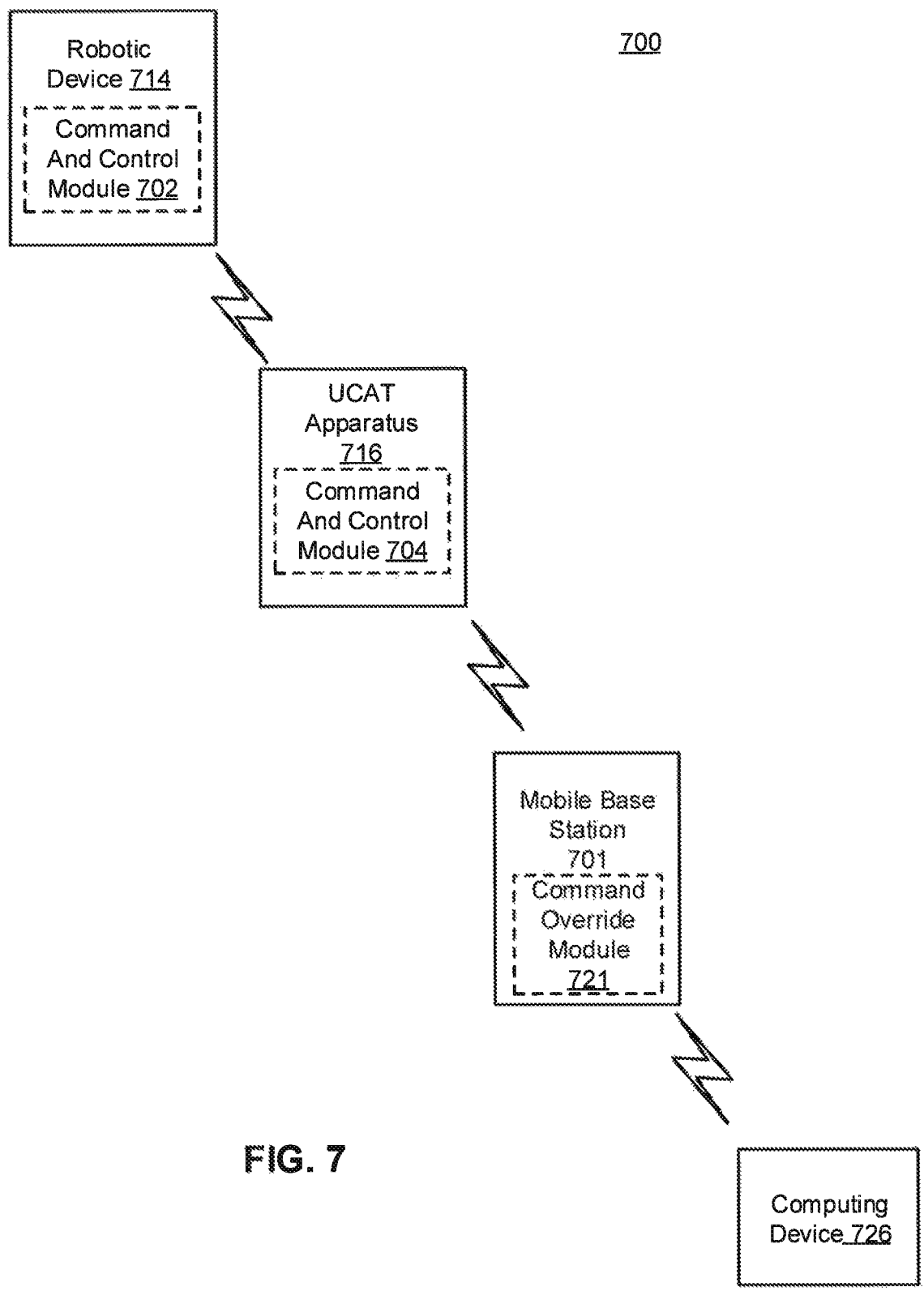
FIG. 7 is a dataflow diagram depicting wireless operation of the UCAT operations system, according to an aspect of the present disclosure.

Referring now to FIG. 7, a dataflow diagram depicting certain wireless operation of UCAT operations system 700, according to an aspect of the present disclosure, is shown.

UCAT operations system 700 comprises robotic device 714 (i.e., robotic device 114 or aerial device 214 314, or 514), UCAT apparatus 716 (i.e., UCAT apparatus 116A, 116B, or 116C), mobile base station 701 (i.e., mobile base station 101A, 101B or 101C), and, in some aspects, computing device 726 (i.e., computing device 126). Robotic device 714 and UCAT apparatus 716 include command and control system modules 703 and 704, respectively, for communicating within UCAT operations system 700. Similarly, mobile base station 701 includes a command override module 721 and user controls which enable user (i.e., user 124) to deactivate robotic device 714 or otherwise cause robotic device 714 to return to mobile base station 701 and/or the ground should the need arise prior to the completion of the designated task provided to command and control module 702. In some aspects, computing device 726 may communicate with mobile base station 701 and send override commands to robotic device 714 to deactivate it or otherwise cause it to return to mobile base station 701 and/or the ground before its task is completed. In some aspects, commands provided to module 702 are general (e.g., proceed to position X, scan the wall, process the scan, determine areas to be painted and paint the wall) and command and control module 702 determines the appropriate actions to carry out the command. In other aspects, command module 702 receives a general command and generates sub-commands in order to execute the general command. Robotic device 714 may transmit data and information back to mobile base station 701, which may in turn, in some aspects, transfer data and information back to computing device 726.

It is further noted that any component of UCAT operations system 700 may have the capability to communicate with and/or send/receive data to/from any other component of system 700. Thus, dataflow is in no way limited to the representation of FIG. 7. Specifically, mini robotic device(s) 134a, 134b and 134c (FIG. 1A, 1B or 1C), as well as other devices as will be appreciated by those skilled in the relevant art(s) after reading the description herein, may send/receive communications/data to/from mobile base station 701, UCAT apparatus 716, computing device 726, and any other component associated with system 700.

Figure 8:
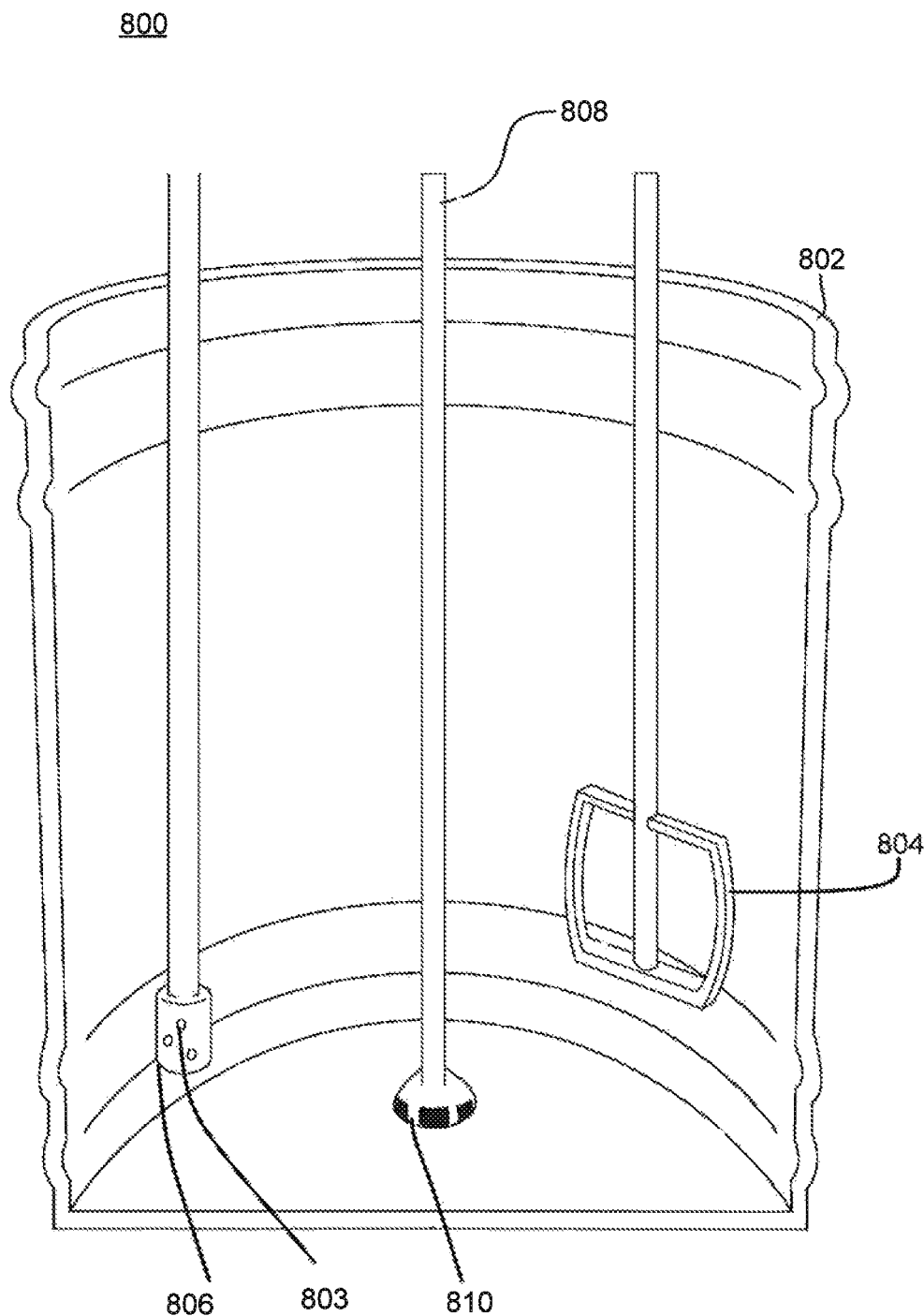
FIG. 8 is a side view of a container system configurable as a material(s) reservoir, a supplemental device and/or a power supply source (shown as a bucket in FIG. 8) and connectable to a mobile base station and capable of providing paint or other materials or power supplies for use by a robotic device, according to an aspect of the present disclosure.

Referring now to FIG. 8, a side view of a container system 800 configurable as material(s) reservoir 110, and/or supplemental device 112 (shown as bucket 802 in FIG. 8) and connectable to mobile base station 101A, 101B or 101C and capable of providing paint, fluid medium or other materials for use by robotic device 114, according to an aspect of the present disclosure, is shown.

In aspect, mobile base station 101A, 101B or 101C further comprises material(s) reservoir 110 configured as a container system 800. The container system 800 may include a bucket 802, which comprises an agitator 804, a siphon 806, and a sensor 810 connected to mobile base station 10A, 101B or 101C via sensor connector 808, for maintaining the appropriate mixture of a large volume of paint during the performance of a painting task by robotic device 114 (e.g., painting an interior room, painting the exterior of a building, dam, tower, etc.). Agitator 804 maintains the mixture of paint and may be activated at preset intervals or in response to sensor data. Siphon 806 removes paint from bucket 802 and supplies it to robotic device 114 when needed. The siphon 806 includes a filtered tip 803 to strain the paint mixture, fluid medium or other material. Sensor 810 detects, for example, the level of paint and the paint viscosity within bucket 802 in order to alert a user when the paint level is low, that a job will require more paint than available, or to automatically add material(s) in order to maintain optimal viscosity. Siphon 806 may also be used to transfer liquid into bucket 802 such as paint thinner or water to ensure the material(s) in bucket 802 is of the correct viscosity and consistency. In some aspects, a compressor may be integrated as a supplemental device 112 with bucket 802 in order to provide nozzle 206 or another accessory 204, such as a spray wand, on robotic device 114 with an appropriately pressurized stream of paint. In some additional aspects, mixing/stirring elements may be integrated within bucket 802 in order to mix-in additional material(s) supplied by supplemental device(s) 112 via connector(s) 132 or from within other portions of bucket 802, such as paint thinner or other liquids and/or non-liquids, such as aluminum flakes, zinc, epoxies, glass (including molten or liquid glass), sand, and similar substances as will become apparent to those skilled in the relevant art(s) after reading the description herein.

In an aspect, robotic device 114 may be configured as a crop duster. In such an aspect, robotic device 114 may comprise aerial vehicle 214, which may fly between rows of crops (e.g., corn) and spray fertilizer, pesticide, or other desired materials on the crops wherein the fluid medium is a fertilizer, pesticide or other desire materials, including without limitation, water.

In an aspect, robotic device 114 may be configured to wash an object. In such an aspect, mobile base station 101A, 101B or 101C may comprise material(s) reservoir 110 and a supplemental device 112 configured as a water holding tank and a cleaning solution tank configured to hold a fluid medium such as water or cleaning solution. By way of non-limiting example, the water holding tank and cleaning solution tank may be connected to each other via connector(s) 132 and attached to a water pump as one of supplemental devices 112 in such a way as to provide a stream of pressurized water mixed with cleaning solution to a tube (i.e., cord 118d) running through UCAT apparatus 116A, 116B or 116C to nozzle 206 on robotic device 114. The water holding tank may be attached to a water source via a hose. In some aspects, computing device 126, computational hardware 108, and/or other computing devices within system 100A, 100B or 100C may be used to control and/or adjust the ratio of water to cleaning solution within the mixture. In some aspects, the water tank is further integrated with a water heater as an additional supplemental device 112. The water heater may be powered by any method as recognized by those skilled in the relevant art(s), including AC power, DC power, solar power, and the like. Further, monitors and sensors, including video cameras attached to robotic device 114 or one or more attachments thereto can monitor the flow of water emitted from nozzle 206 and adjust the flow level and/or water pressure, or require robotic device 114 to adjust in real time or to complete an additional "pass" over an area with another spray for optimal cleansing coverage in response to detected spots that do not meet set standards of cleanliness. Based on this detection, command and control module 702 may cause robotic device 114 to rewash such deficient areas.

In an aspect, robotic device 114 is configured to construct and/or repair an object. In such an aspect, mobile base station 101A, 101B or 101C comprises material(s) reservoir 110 and/or one or more supplemental devices 112 that may contain one or more solid or liquid materials, such as liquid polymers and resins, ultraviolet (UV) curable coatings, emulsions, chemicals, glues, powders, nanoparticles, graphite, liquid metals, liquid concrete, expanding foams, abrasives (for cleaning and/or prepping a surface), and similar substances as will be appreciated by those skilled in the relevant art(s) after reading the description herein. For example, if a hull of a boat becomes damaged, the robotic device 114 may be used to fill a hole in the hull with foam, elastomer or other materials until patched the hole. Multiple layers of material may be applied to enhance the stability of the patch. Heating devices within reservoir 110 and/or configured as or within supplemental device(s) 112 or within robotic device 114 may convert a solid material to and/or maintain the liquid state of one or more materials within reservoir 110, device(s) 112, and/or robotic device 114. Corresponding heating devices may be contained within cord(s) 118d and/or UCAT apparatus 116A, 116B or 116C to further maintain the liquid state of the material(s). By way of non-limiting example, the liquid material(s) may be transferred to nozzle 206 on robotic device 114 by cord(s) 118d configured as one or more tubes running through UCAT apparatus 116A, 116B or 116C where the material(s) are then secreted in thin layers in order to build and/or fix an object. In some further applications, the additive layers of secreted material(s) may be built up in order to form structures, walls, buildings, or similar objects as will be appreciated by those skilled in the relevant art(s) after reading the description herein. Additionally, the additive layers may be produced by computer-controlled processes similar to those that are currently known in the art for creating three-dimensional objects from a three-dimensional model or other electronic data source. Similarly, material(s) reservoir 110 and/or supplemental device(s) 112 may be configured to supply a plastic line feed to robotic device 114 where it is then heated and deposited in sequential layers in order to engage in a process akin to 3D printing.

Referring now to the tools, FIGS. 9A-9E and FIGS. 10A-10I are views of a variety of tools (modular add-ons) usable with an aerial vehicle, according to aspects of the present disclosure. Add-ons (tools) shown in FIGS. 9A-9E and 10A-10I may be attached to robotic device 114 via quick connections 902 at the end of arm extension 914. The length of the extension 914 may vary depending on the tool and the extension length may be configurable with expanding/collapsing or telescoping capabilities. Add-ons (tools) may take the place of one or more accessories 204 or may augment accessories 204. Add-ons include, but are not limited to, those depicted in FIGS. 9A-9E and 10A-10I. Each add-on (tool) may be connected at accessory tip 206 (FIG. 2) and may be added to or removed from robotic device 114 autonomously by retrieval from mobile platform 102A, 102B or 102C of mobile base station 101A, 101B or 101C or similar staging area on the mobile base station or any other appropriate location as will be appreciated by those skilled in the relevant art(s) after reading the description herein. In some aspects, mini robotic device(s) 134 assist robotic device 114 with the attachment and detachment of the add-ons. The main robotic device 114 can automatically attach and/or detach tools by picking them up from a staging area on the mobile base station or elsewhere.

The add-ons are tools which may be selected which allow for multiple painting techniques or effects. For example, an add-on (tool) may position a stencil while a paint sprayer accessory applies the paint. Other effects may be produced such as creating a "stipple" paint effect by spraying the paint with one arm and then having the other arm, containing a stipple brush, make contact with the wall with rapid connecting motions. Additional effects including, but not limited to, Shou-sugi-ban (the Japanese charring of wood aka "burning" wood siding or other materials), "rag wipe", sponge, running a stiff bristle "broom" through the paint to create lines, etc. can also be achieved. The burning (i.e. pre-burning or scorching) of wood may be used as a fire retardant.

The add-ons (tools) may include an arm to distribute solid materials (granules of fertilizer, shredded bark or mulch, etc.). The attachment end could "spin" similar to a broadcast spreader or it could vibrate and sprinkle material. The "broadcast spread" component/attachment also spreads chemicals, salt, ash, and other materials for ice and snow removal/control. An add-on (tool) may comprise an arm or end to pull, move, remove, and/or relocate unwanted materials (trash/litter, weeds, etc.).

FIG. 9C illustrates a brush add-on 904 which may be attached to robotic device 114 to facilitate cleaning a vertical or horizontal surface. FIG. 9D illustrates a squeegee add-on 906 which may be used to clean windows and may further comprise a motorized rotating portion. FIG. 9A illustrates a sprayer add-on 908 which can be used to spray air or water in order to, for example, clean objects or vacuum items. FIG. 9B illustrates a sensor add-on 910 which may be utilized to sample air quality, particulate matter concentrations, radiation and the like. The sensor add-on 910 may further comprise an arm extension 914 and one or more filters 912 shown as a dashed line box. Overspray guard add-on 916 may comprise a physical barrier useful for preventing paint from dripping or spraying onto undesirable locations.

FIG. 10A illustrates an add-on (tool) which may be a material collector arm scoop 1002. Scoop 1002 may be an electric or mechanical "scoop" like wand/arm extension. When scooping materials, a suctioning or vacuuming force may be created through the scoop 1002 such that the material is communicated back to the mobile base station via the UCAT apparatus or through the discharge or intake tube 140. For example, the scoop 1002 may include a hole shown in dashed lines.

FIG. 10B illustrates a material collector arm drill add-on 1004 which may be an electric or mechanical "drill" like wand/arm extension. Material collector arm scoop 1002 which may be an electric or mechanical "scoop" like wand/arm extension "back scoop" that can pivot and pull material(s) into it.

FIG. 10C illustrates a material collector arm claw 1006 which may be an electric or mechanical "claw" like wand/arm extension that can pivot and grab material(s) to it. The arm of claw 1006 is articulating and includes a pivoted joint 1007. The arm of claw 1006 may be controlled using wired or wireless communications to control the articulation or movement of the arm about pivoted joint 1007. Thus, the arm of claw 1006 may be equipped with wireless or wired communication modules to receive control commands. As can be appreciated one or more of the add-ons or tools described herein may also include an articulating arm with a pivoted joint. All connections between the arms and the robotic device; the connections between the arm and nozzle; the connection between the robotic device and the UCAT apparatus; the connection between the UCAT apparatus and the mobile base station; the connection of the discharge or inlet tube may all have multiple degrees of freedom (flexibility) such as by articulation and/or pivoting. In an aspect of the disclosure, the connection may include wireless or wired communications for movement control such as without limitation articulation control and/or pivoting control.

FIG. 10G illustrates a twisting/screwing material cutter and collector 1008 which is an example appendage that can be added to the end/tip of the Wand/Arm or it can be part of an entire modular and replaceable Wand/Arm that can burrow, cut, or drill into materials to extract samples or cut and shape external material. This collection of appendages may be capable of depositing substances into the material being cut or drilled. Such substances may comprise liquids such as water, chemicals, gases such as oxygen and argon, and solids and semisolids such as sand, epoxies, and liquid metals. Other similar substances may be deposited into the material as may become apparent to those skilled in the relevant art(s) after reading the description herein.

FIGS. 10F and 10I illustrate a cutter 1010 and cutter 1012 which are similar devices displaying various cutting techniques. Cutter 1010 has an array of rough/sharp protrusions, or "teeth,' and may rotate, vibrate, or otherwise similarly move in order to insert itself into materials. Cutter 1012 is smoother in that it does not have "teeth" and may therefore extract material(s) with a lesser chance of damaging or altering them and/or the surrounding environment. Additionally, cutter 1012 may be used to collect material(s) that have a different composition then the ones collected using cutter 1010. When extracting materials using cutter 1012, a suctioning or vacuuming force may be created through the cutter via a hole (represented in a dashed line) such that the material is communicated back to the mobile base station via the UCAT apparatus or through the discharge or intake tube 140.

FIG. 10H illustrates puncturing material cutter and collector add-on 1014 which is an example appendage that can be added to the end/tip of the Wand/Arm or it can be part of an entire modular and replaceable Wand/Arm that can burrow or cut or drill into materials to extract samples or cut and shape external material. The puncturing material cutter and collector add-on 1014 includes a collector receiver 1015 wherein while drilling, a suctioning or vacuuming force is created such that dust or particulate matter created as the result of drilling is vacuumed into the receiver 1015 in the direction of the arrow. The collected material may travel to the mobile base station 101A, 101B or 101C via the discharge or intake tube 140 or a return flow in the UCAT apparatus.

FIGS. 10D and 10E illustrate aerator or probe add-ons 1016 and 1018 which may be used to burrow, cut, or drill into materials to extract samples or cut and shape external material. Furthermore, aerator or probe add-ons 1016 and 1018 may be used to push against or into material to insert liquids, solids (pellets) or gasses that can push/puncture, drill, or penetrate into materials or to extract liquids, solids, or gasses.

Figure 21A:
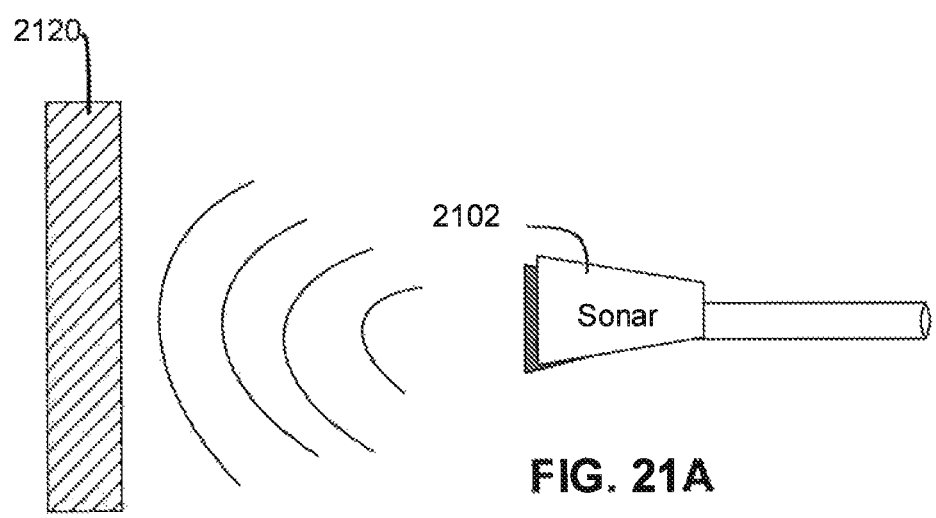
FIGS. 21A-21E are views of tools (modular add-ons) usable with an aerial vehicle, according to aspects of the present disclosure.
Figure 21B:
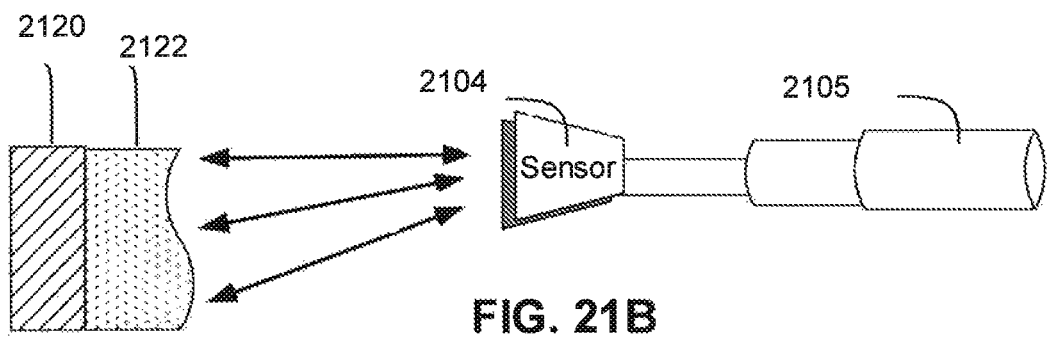
Figure 21C:
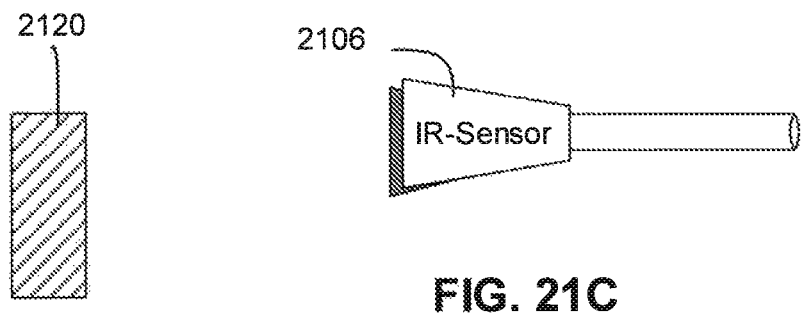
Figure 21D:
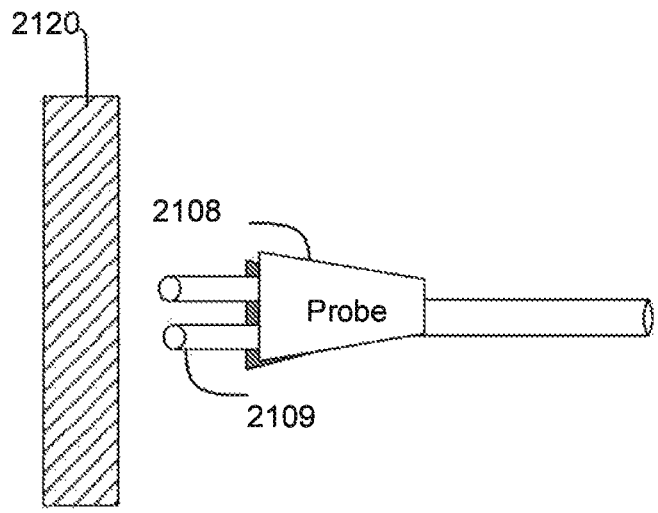
Figure 21E:
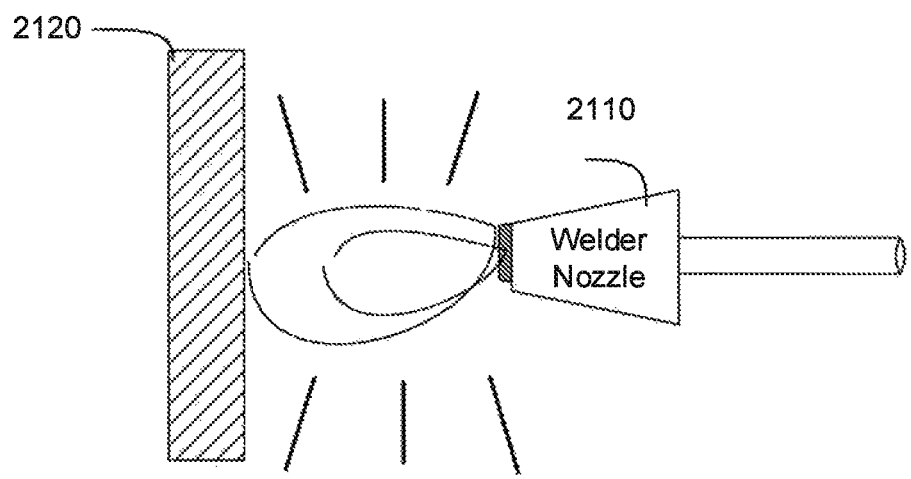

FIGS. 21A-21E are views of tools (modular add-ons) usable with an aerial vehicle, according to aspects of the present disclosure. FIG. 21A illustrates a sonar detector 2102 configured to send sonar in the direction of surface 2120 to detect surface 2120 wherein surface 2120 may be submerged underwater. FIG. 21B illustrates a sensor 2104 configured to detect the thickness of a coating 2122 on surface 2120. The coating may include paint, coating or other material on a surface 2120. By way of non-limiting example, when paint or coating is applied, a certain thickness may be required. The sensor 2104 may detect the thickness of the paint or coating to identify any variations. In this example, the dispensed tool output may be the signal propagated in the direction of the surface 2120 and the sensed signal (thickness) which is then communicated to the mobile base station 101A, 101B or 101C and/or mobile computing device 126. In some embodiments, the sensor 2104 may include a probe which makes contact with the surface and coating 2122 such as for "non-destructive testing". The sensor 2104 may include a telescopic arm 2105 having a plurality of telescopic sections. In an embodiment, one or more add-ons described herein may include a telescopic arm. In one or more embodiments, the telescoping function (lengthening or shortening) of the telescopic arm may be control by the robotic device 114, mobile base station 101A, 101B or 101C and/or mobile computing device 126. FIG. 21C illustrates an infrared sensor 2106 configured to sense infrared wavelengths from surface 2120. Surface 2106 may include ground material or other materials. FIG. 21D illustrates a probe 2108 having probe members 2109 configured to make direct contact with surface 2120 such as for sensing at least one parameter including temperature or thickness. FIG. 21E illustrates a welding tool 2110 having a nozzle configured to dispense a flame therefrom in the direction of surface 2120. In some embodiment, welding may take place above ground, above water or underwater for repairing surface 2120 or for building. Acetylene, propane, oxyacetylene or a compressed gas may be used. The gas may be housed in the mobile base station 101A, 101B or 101C and transferred from the mobile base station through the UCAT apparatus 116A, 116B or 116C to the welding tool 2110. The gas may be ignited at the tool 2110 and used for cutting, welding, solder, weed burning, ice and snow melting, etc.

Figure 17:
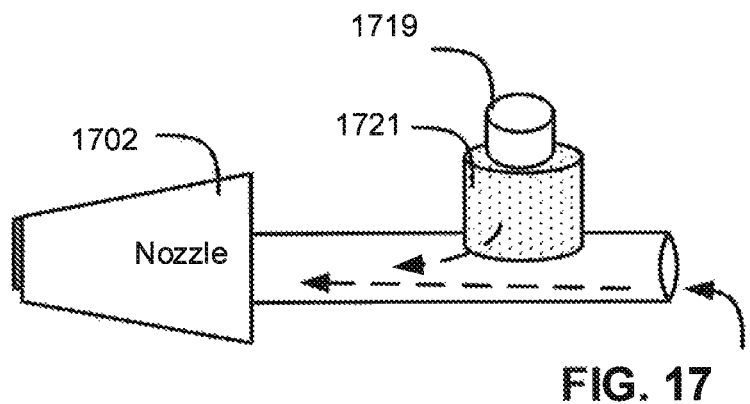
FIG. 17 is a view of a torch tool with a material reservoir, according to an aspect of the present disclosure.

FIG. 17 illustrates a torch tool 1702 with a material reservoir 1721. The torch tool 1702 may be used for thermal spraying applications. Thermal spraying may include a process for applying a coating in which melted (or heated) materials are sprayed onto a surface. Thermal spraying may apply a coatings (approx. thickness range is 20 micrometers to several mm, depending on the process and feedstock) over an area at a high deposition rate as compared to other coating processes such as electroplating, physical and chemical vapor deposition. Coating materials for thermal spraying may include, without limitation, metals, alloys, ceramics, plastics and composites. The coating materials may include a powder stored in material reservoir 1721 which is interjected in the flow of the fluid medium flow into the tool 1702 which may be heated to a molten or semi-molten state and accelerated towards substrates or surfaces in the form of micrometer-size particles. The material reservoir 1721 may include a lid 1719 to replenish the reservoir 1721. The reservoir 1721 may store a wire which can be dispensed therefrom wherein heat would heat the wire to a molten or semi-molten state. In some instances, the materials reservoir would be part of mobile base station 101A and transferred to the torch tool 1702 via the UCAT apparatus 116A.

Also flame powder spraying is another coating with an anti-corrosion solution may be performed. The flame powder spraying may be used for Offshore Oil and Gas or other structures.

Figure 11A:
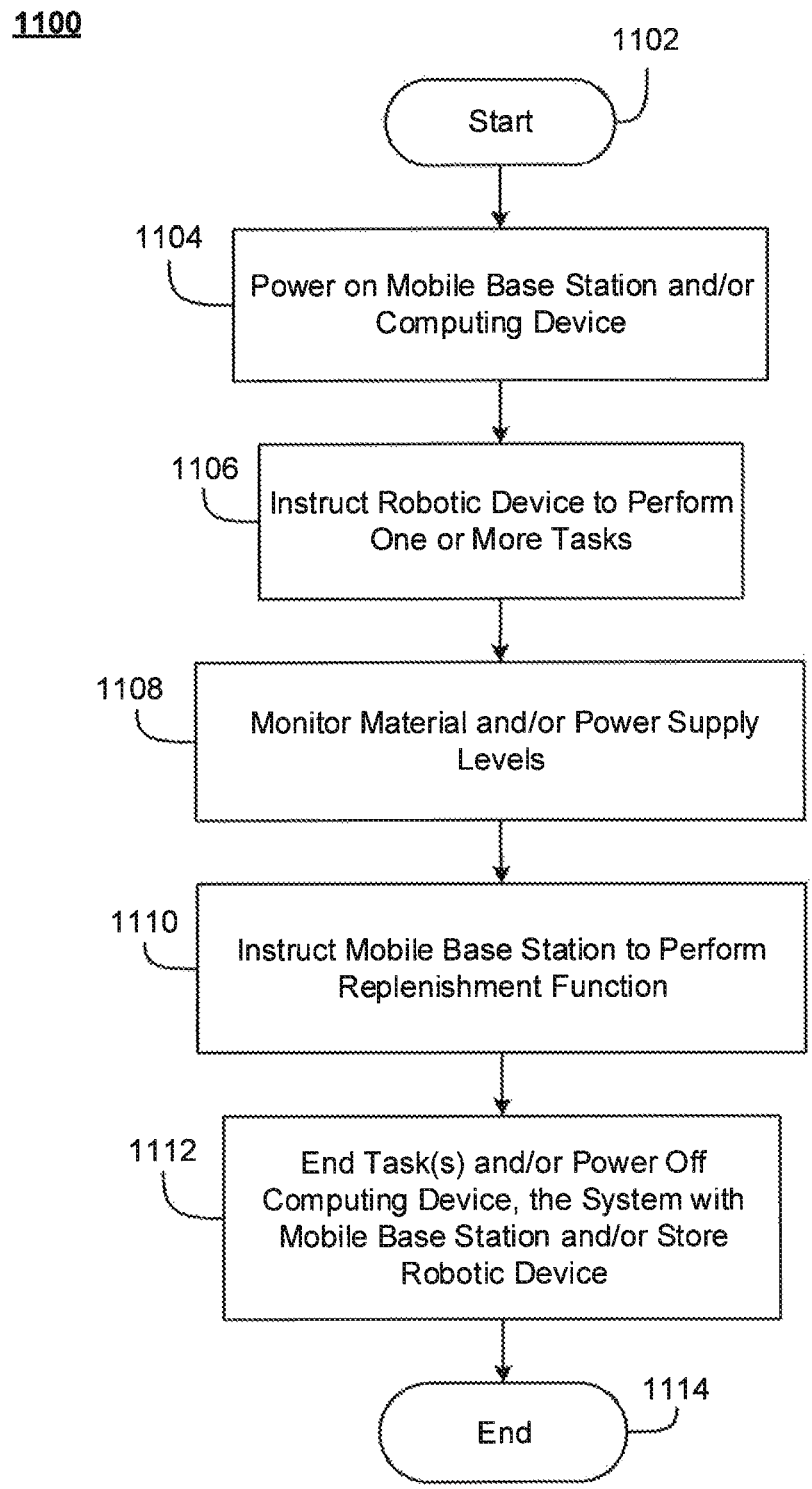
FIG. 11A is a flowchart of a process for a user to initiate a material and/or power supply replenishment process for an aerial vehicle via a mobile base station, according to an aspect of the present disclosure.

Referring now to FIG. 11A, a flowchart illustrating an process 1100 for a user to initiate a material and/or power supply replenishment process for a robotic device 114 via a mobile base station 101A, 101B or 101C with a UCAT apparatus 116A, 116B or 116C, according to an aspect of the present disclosure, is shown. Thus, the process 1100 will be described in relation to the UCAT operations systems of FIGS. 1A, 1B and 1C. However, the process may be applied to other UCAT operations systems described herein.

Process 1100 begins at step 1102 with control passing immediately to step 1104.

At step 1104, user 124 powers on the mobile base station 101A, 101B or 101C and computing device 126.

At step 1106, user 124 may use computing device 126 to select one or more tasks and send instructions for performing the task(s) to robotic device 114. The user may use mobile base station 101A, 101B or 101C to select one or more tasks and send instructions for performing the selected task to robotic device 114. To do this, user 124 first inputs the instructions into computing device 126 (or mobile base station 101A, 101B or 101C) or selects them from a pre-generated set of instructions via, by way of example and not limitation, a touchscreen interface or similar non-touchscreen user interface as recognized by those skilled in the relevant art(s). By way of example and not limitation, tasks my comprise washing something, painting something, building something, repairing something, depositing or collecting something, crop dusting, or any other activity that will be appreciated by those skilled in the relevant art(s) after reading the description herein, particularly repetitive/dull/labor-intensive activities. Instructions may further include what materials to use, what type of movements to make, how much time to take, and similar specifications as will be appreciated by those skilled in the relevant art(s) after reading the description herein. Instructions may comprise one or more photographs, schematics, architectural drawings, or images captured by or imported to computing device 126 or mobile base station 101A, 101B or 101C. Portions of objects within the photographs or images and/or any generated thermal patterns, surface condition analyses, and/or any similar visual representations of an object may be selected by user 124 to be painted, washed, repaired, or otherwise modified by robotic device 114. The photographs and/or images may be captured in real time by a camera within computing device 126, mobile base station 101A, 101B or 101C or they may be generated beforehand by being pulled from third-party databases (e.g., a database associated with the Google Streetview® service (available from Google, Inc. of Mountain View, Calif.) or the like).

In some aspects, mobile computing device 126 may analyze the images and/or photographs and present user 124 with candidate areas to be worked on that user 124 may accept or decline. In instances where user 124 declines the candidate areas, user 124 may select custom areas. Once the instructions have been entered into computing device 126 or mobile base station 101A, 101B or 101C, they are sent to computational hardware 108 within mobile base station 101A, 101B, or 101C via wired or wireless connectivity. In some alternative aspects, user 124 enters the instructions directly into computational hardware 108 via a user interface. Once the instructions are received by computational hardware 108, they are sent to robotic device 114, UCAT apparatus 116A, 116B or 116C, mobile base station 101A, 101B or 101C, mini robotic device(s) 134, and/or any other component(s) of system 100A, 100B or 100C as may be necessary either via wireless connectivity or wired via cord(s) 118b. Robotic device 114, in conjunction with mobile base station 101A, 101B or 101C, UCAT apparatus 116A, 116B or 116C, mini robotic device(s) 134, and/or any other necessary component(s) of system, 100A, 100B or 100C begins performing the assigned task(s) once the instructions are received and/or when user 124 gives a start command.

At step 1108 the depletable material(s) and/or power supply levels within robotic device 114 are monitored by one or more sensors wherein the sensors communicate the sensing result to the computing device 126 and/or the mobile base station 101A, 101B or 101C. The monitoring may be accomplished by viewing one or more indicators 130 displayed on computing device 126 or by computing device 126 alerting user 124 about information regarding the status of the depletable material(s), power supplies, environmental variables, or other similar information that would prompt a desire for user 124 to take action as will be apparent to those skilled in the relevant art(s) after reading the description herein. Indicators 130 may comprise digital gauges, meters, percentages, and/or other similar means for identifying how much of a substance is remaining relative to how much of the substance can be stored total as will be recognized by those skilled in the relative art(s).

The displays 130 may be duplicated on at least one display device 1254 (FIG. 12A or 12B). User 124 may check the material(s) and/or power supply levels within robotic device 114 at any time, including before a task is started, while a task is being performed, and after a task has been completed. Similar indicators may be displayed to show how much material(s) is/are left in reservoir 110, supplemental device(s) 112, and/or power supply source 106 as determined by sensors located therein that are communicatively coupled to one or more computational components associated with system 100A, 100B or 100C, and also to display the overall functionality of system 100A, 100B or 100C, including identifying if components are working properly and similar functional statuses as will be appreciated by those skilled in the relevant art(s) after reading the description herein. In some aspects, user 124 is not required to visually monitor the various statuses of system 100A, 100B or 100C. Rather, audio alerts generated by speakers within computing device 126, robotic device 114, reservoir 110, supplemental device(s) 112, power supply source 106, computational hardware 108, or any other component of system 100A, 100B or 100C, in the form of buzzers, ringers, beepers, human speech, and the like as recognized by those skilled in the relevant art(s) may signal to a user when the levels of something are getting too low and/or a component of system 100A, 100B or 100C is not functioning properly. The mobile base station may include a speaker 1256 as shown in FIG. 12A or 12B.

At step 1110, a command is sent to computational hardware 108 within mobile base station 101A, 101B or 101C to perform a refill/replenishment function. The command may be sent as a response to an input from user 124 into computing device 126 or computational hardware 108, or the command may be sent from sensors within robotic device 114 that detect more materials and/or power supplies are needed. In such aspects when the command is sent as a response to user 124 input, the input may comprise user 124 selecting a button 128 on computing device 126 or computational hardware 108 that is specifically programmed to easily guide user 124 though the initiation process. By way of example and not limitation, such button may be labeled, "Fill." The command may be sent via wireless or wired connectivity and may include what type of and how much material(s) and/or power supply(ies) to send to robotic device 114. Upon receipt of the command, computational hardware 108 causes power supply source 106, depletable material(s) reservoir 110, and/or supplemental device(s) 112 to send power supplies and/or depletable materials, respectively, to robotic device 114 via UCAT apparatus 116A, 116B or 116C.

Power supplies may be sent via cord(s) 118a, which may comprise cables and/or wires when the power supplies are electrical in nature, or tubing when the power supplies are of a gaseous, liquid, or other non-electrical form as will be appreciated by those skilled in the relevant art(s) after reading the description herein. Depletable materials may be sent to robotic device 114 via tubing or similar structure(s) as recognized by those skilled in the relevant art(s) in the form of cord(s) 118c. By way of example and not limitation, depletable materials may include water, soap, paint, liquid polymers, flammable gases, and any other materials that may be used by robotic device 114 to complete any type of task as will be appreciated by those skilled in the relevant art(s) after reading the description herein.

In some aspects, once a refill/replenishment process has been started, it continues indefinitely to supply a constant feed of materials and/or power supplies to robotic device 114. In such aspects, user 124 may input commands into computing device 126 and/or computational hardware 108 in order to adjust the rate at which the materials and/or power supplies are transferred to robotic device 114. The feed may continue until user 124 inputs a stop command, or the feed may end automatically once system 100A, 100B or 100C has determined that robotic device 114 has completed its designated task(s). Alternatively, robotic device 114 may autonomously send commands to computational hardware 108 in order to control and/or adjust the rate at which materials and/or power supplies are transferred to robotic device 114, along with commands to start and/or stop the transfers. Input from the robotic device 114 may also automatically "regulate" the flow of material by starting or stopping or adjusting the variable flow of the material or by augmenting/mixing or other methods to modify the viscosity of the material.

The monitoring and/or refill/replenishment functions may be repeated periodically during the course of task performance by robotic device 114.

At step 1112, robotic device 114 completes and ends its task(s) and/or user 124 ends the task(s) and powers off components of the system 100A, 100B or 100C, computing device 126 and/or powers off and stores robotic device 114.

Process 1100 is terminated by step 114 and process 1100 ends.

Figure 11B:
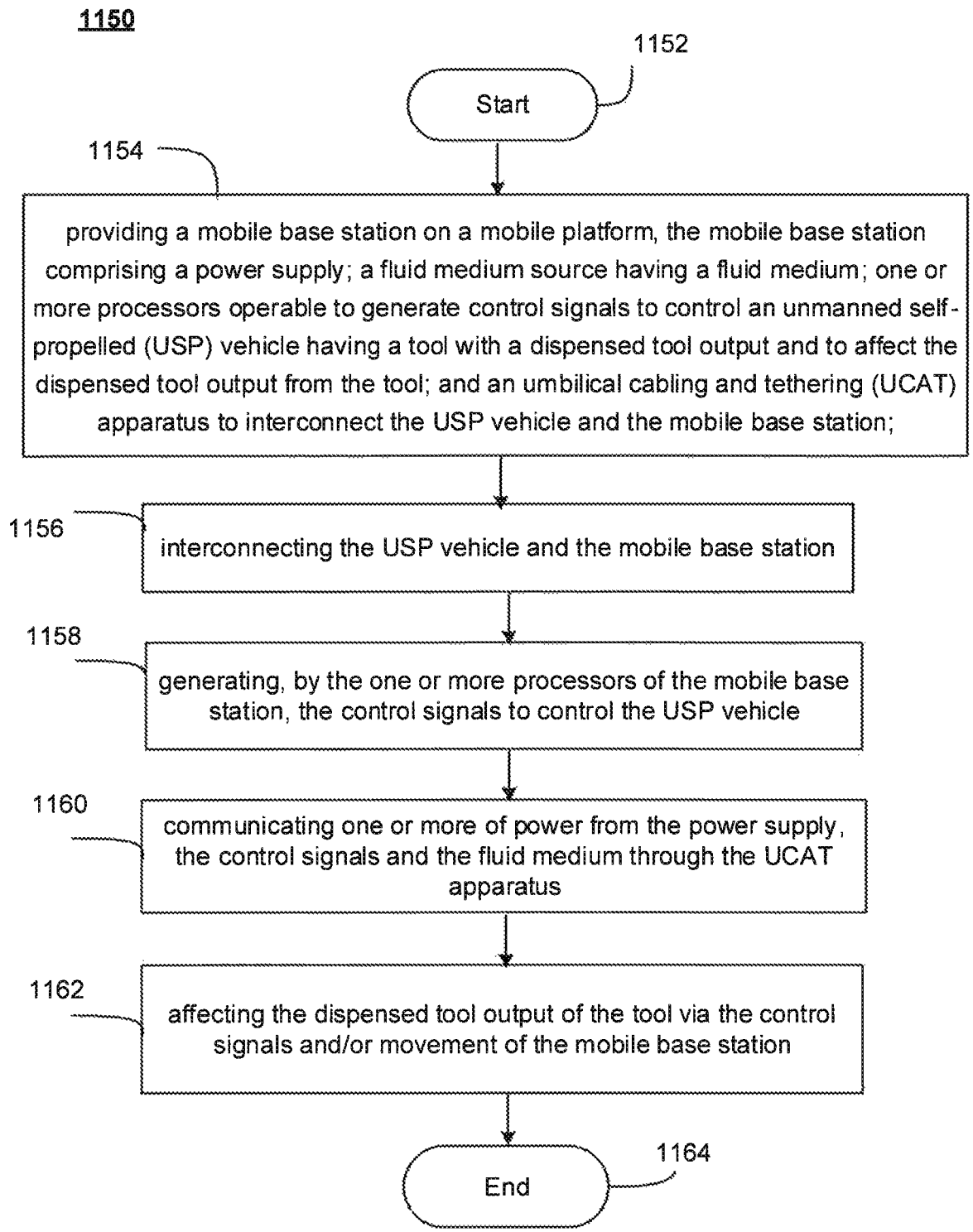
FIG. 11B is a flowchart of a process for a mobile base station to control an unmanned self-propelled (USP) vehicle, according to an aspect of the present disclosure.

FIG. 11B is a flowchart of a process 1150 for a mobile base station (i.e., mobile base station 101A, 101B or 101C) to control an unmanned self-propelled (USP) vehicle (i.e., robotic device 114), according to an aspect of the present disclosure. Process 1150 begins at step 1152 with control passing immediately to step 1154. At step 1154, the process 1150 may include providing a mobile base station on a mobile platform, the mobile base station comprising a power supply; a fluid medium source having a fluid medium; one or more processors operable to generate control signals to control an unmanned self-propelled (USP) vehicle (i.e., robotic device 114) having a tool with a dispensed tool output and to affect the dispensed tool output from the tool; and an umbilical cabling and tethering (UCAT) apparatus (i.e., UCAT apparatus 116A, 116B or 116C) to interconnect the USP vehicle and the mobile base station.

At step 1156, the process 1150 may include interconnecting the USP vehicle and the mobile base station. At step 1158, the process 1150 may include generating, by the one or more processors of the mobile base station, the control signals to control the USP vehicle.

At step 1160, the system communicates one or more of power from the power supply, the control signals and the fluid medium through the UCAT apparatus. For example, in certain instances the mobile base station may communicate control signal to the USP vehicle wirelessly. In other instances, the mobile base station may communicate control signals though a wired connection via the UCAT apparatus. In some instances, the USP vehicle may be have an on-board processor to control one or more tasks directly. In some instances, the USP vehicle may use a combination of control signal generated by one or more of on-board processors of the USP vehicle, control signals from the mobile base station and control signals from the computing device 126.

At step 1162, the dispensed tool output of the tool if affected via the control signals and/or movement of the mobile platform. The output of any tool may be affected by movement of the mobile base station such that the dispensed tool output is moved to a different location as the result of the movement of the mobile base station. The dispensed tool output may also be affected by the movement of the USP vehicle. The USP vehicle can only cover a first area within the limitations of the length the UCAT apparatus. A larger area (second area) may be covered as the mobile base station moves. The dispensed tool output may be affected by changing the dispensed material. For example, the dispensed tool output may be varied to apply layers of material one at a time. The dispensed tool output may be varied as the result of sensing one or more parameters as will be described in more detail later.

The dispensed tool output may be a form of fluid medium wherein a fluid medium may include a solid, liquid, composition and a gas (wherein gas may include air). The fluid medium may include one or more of sand, microscopic granulates of metal, water, air, gases, chemicals, and organic and inorganic compounds including various solid and semi-solid compounds. By way of non-limiting example, the fluid medium may include a gas such as air which is blows at a rate to move particles (snow, sand, leaves, etc.) in an environment in a certain direction. The fluid medium may include a fuel which creates a flame (dispensed tool output) for welding or scorching wood. Scorching wood may be for controlled burning of foliage to prevent fires. Scorching may be used to create a particular finish on a structure. A tool may be used to perform welding for repairing structures or for building.

The dispensed tool output may be the effects movement of a tool such as without limitation movement of slapping rag brushes, brushes, and squeegees wherein the amount of pressure of the tool to a surface to brush, squeegee, or wipe may be controlled. By way of non-limiting example, the USP vehicle is controlled to use slapping rag brushes, brushes, and squeegees over a particular area of a surface.

The dispensed tool output may include the application of a fluid medium such as paint for painting a surface, cleaning solutions for cleaning a surface, or coating for coating a surface. By way of non-limiting example, the dispensed tool output may include sensing by a tool wherein a sensing signal is applied in a direction of the object to be sensed. The start and end of sensing includes "affect the dispensed tool output". The tool (add-on) to sense parameters and communicate such sensed parameter to a mobile base station 101A, 101B or 101C or mobile computing device 126.

By way of non-limiting example, the dispensed tool output may include the generation of a signal as the result of the operation of the tool where such signal is sent back to the mobile base station 101A, 101B or 101C or mobile computing device 126.

Thus, the dispensed tool output may include an operation by a tool to cause a hole to be formed in a surface or object and an operation using the tool to cause material (particles) from the hole creation (such as drilling) to be communicated back to the mobile base station 101A, 101B or 101C or into the environment. Hence, the material when extracted such as by suctioning or vacuuming effectively creates a second path for a fluid medium to flow. However, the second path may include a fluid medium generated from the environment. The fluid medium may include water for water extraction, gas including air, material, etc. The fluid medium may include positive air pressure or negative air pressure. As can be appreciated, there are numerous ways in which the dispensed tool output is affected.

Process 1100 is terminated by step 1164 and process 1150 ends.

FIG. 12A is a block diagram of the interrelationship of the main components of the UCAT operations system 1200A, according to an aspect of the present disclosure.

At the core of the UCAT system 1200A is robotic device 114. Robotic device 114 may be integrated with a material applicator or tool 204. Tool 204 may comprise a means for performing an action 1274 (dispensed tool output), a nozzle 206, and a barrel or arm 231. Without limitation, examples of action 1274 include painting, coating, blasting/stripping (for prepping a surface) washing, and similar actions as will become apparent to those skilled in the relevant art(s) after reading the description herein. Nozzle 206 may be configured on the distal end of barrel or arm 231 relative to robotic device 114. One or more materials may be transported from robotic device 114 to nozzle 206 via barrel or arm 231. Barrel or arm 231 is a hollow rigid or semi-rigid tube-like structure securely fixed to robotic device 114. Nozzle 206 may function to disperse one or more materials from robotic device 114 onto a targeted structure or area.

As described previously, robotic device 114 may also be integrated with UCAT apparatus 1216A. The UCAT apparatus 1216A may further comprise one or more cords 118*a*-118*d*. Cord(s) 118*a*-118*d* may comprise two general types: hoses and power/data delivery. Hoses may include cables, tubes, wires, or similar structures as will be apparent to those skilled in the relevant art(s) after reading the description herein. Hoses may function to carry material(s) to and/or away from robotic device 114. In a similar fashion, power and or data delivery may comprise cables, tubes, wires, or similar means as will be recognized by those skilled in the relevant art(s) for transporting power supplies to robotic device 114, the power supplies being in the form electricity, liquid and/or gaseous fuels, or any other form as may become apparent to those skilled in the relevant art(s) after reading the description herein.

UCAT apparatus 1216A further serves as a means to connect robotic device 114 to mobile base station 1201A. The UCAT apparatus 1216A may include computational hardware (CH) 1233 to control one or more functions of the UCAT apparatus 1216A. The UCAT apparatus 1216A may include at least one sensor 1247 to sense a position or functional status of the UCAT apparatus. Functional status may include flow of a fluid medium through the cords or a break in a power deliver cord. The at least one sensor 1247 may determine a position of the casing or cords.

Mobile base station 1201A may house power supply source 106, material(s) reservoir 110, and, in some aspects, supplemental device(s) 112. Power delivery via cord 118*a* may connect power supply source 106 to robotic device 114 for the purpose of transferring power from the former to the latter. Likewise, cords 118*b*-118*d* mat be hoses which may connect material(s) reservoir 110 and/or supplemental device(s) 112 to robotic device 114 for the purpose of transporting various materials back and forth amongst them. The mobile base station 1201A may include computational hardware 108 which may include processors/controllers 1268. The mobile base station 1201A may include one or more sensors 1225 to detect a condition of house power supply source 106, material(s) reservoir 110, and, in some aspects, supplemental device(s) 112.

In some aspects, especially when robotic device 114 is aerial vehicle 214 or a similar device, mobile base station 1201A may be further integrated with landing pad 400 (i.e., landing pad 400A or 400B). Landing pad 400 may serve as a connectivity point for providing and/or receiving power supplies, materials, and/or data to/from robotic device 114 as well as being a landing pad/storage interface for device 114.

Mobile base station 1201A and/or landing pad 400 may be integrated with controllers 1268. Controllers 1268 may function to control the functionality of system 1200A in response to manual inputs 1222 made by user 124 within a software environment 1220. Software environment 1220 may be presented to user 124 at computing device 126 and/or at a user interface integrated with computational hardware 108 within mobile base station 1201A.

In some aspects, robotic device 114 includes a lift system 1217. Lift system 1217 comprises at least one motor 1219 and at least one prop 1228 and functions to give robotic device 114 the ability to lift itself off the ground. Such a configuration exists in such aspects when, by way of example and not limitation, robotic device 114 is aerial vehicle 214. In some alternative aspects, other means are used to lift robotic device 114 off the ground without motor 1219 and/or prop 1228. By way of example and not limitation, jet propulsion may be used to provide lift to robotic device 114. Other means of achieving lift for device 114 may become apparent to those skilled in the relevant art(s) after reading the description herein.

The mobile base station 1201A include a mobile platform 1262 which may include a motor to propel the mobile base station 1201A via wheels or a propeller. The mobile base station 1201A may include a location to store interchangeable tools 1204. The mobile base station 1201A may include one or more outputs which includes at least a display device 1254 and speaker 1256. The display device 1254 may include a LCD display, LED display or projector device. The display device 1254 may also include control panel with lights or may include a graphical user interface to display status conditions at the mobile base station 1201A. The mobile base station 1201A may include a voice recognition module 1264 and motion control sensors 1260.

FIG. 12B is a block diagram of the interrelationship of the main components of the UCAT operations system 1200B with a UCAT assist system 1230, according to an aspect of the present disclosure. Since system 1200B is similar to system 1200A, only the differences will be described. In system 1200B, the mobile base station 1201B includes UCAT apparatus 1216B configured to be assisted by a UCAT assist system 1230. The UCAT apparatus 1216B may include fasteners 1237. The fasteners are described in more detail in relation to FIGS. 15A and 15B. The UCAT assist system 1230 includes a plurality of UCAT assist devices 1234 configured to be attached to the UCAT apparatus 1216B via fasteners 1237. The UCAT assist devices 1234 may be charged/recharged by landing pad 400 or refilled with a fluid source. The mobile base station 1201B may serve to transport the UCAT assist system 1230. In system 1200B, a plurality of landing pads 400 are provided such as for one or more of the UCAT assist devices 1234. A landing pad may be used for the robotic device 114. The UCAT assist system is described in more detail in relation to FIGS. 15A and 15B.

Referring now to FIG. 13, a block diagram of a computer system useful for implementing various aspects the processes disclosed herein, in accordance with one or more aspects of the present disclosure, is shown.

That is, FIG. 13 sets forth illustrative computing functionality 1300 that represents one or more physical and tangible processing mechanisms.

Computing functionality 1300 may comprise volatile and non-volatile memory, such as RAM 1302 and ROM 1304, as well as one or more processing devices 1306 (e.g., one or more central processing units (CPUs), one or more graphical processing units (GPUs), and the like). Computing functionality 1300 also optionally comprises various media devices 1308, such as a hard disk module, an optical disk module, and so forth. Computing functionality 1300 may perform various operations identified above when the processing device(s) 1306 execute(s) instructions that are maintained by memory (e.g., RAM 1302, ROM 1304, and the like).

More generally, instructions and other information may be stored on any computer readable medium 1310, including, but not limited to, static memory storage devices, magnetic storage devices, and optical storage devices. The term "computer readable medium" also encompasses plural storage devices. In all cases, computer readable medium 1310 represents some form of physical and tangible entity.

By way of example, and not limitation, computer readable medium 1310 may comprise "computer storage media" and "communications media."

"Computer storage media" comprises volatile and non-volatile, removable and non-removable media implemented in any method or technology for storage of information, such as computer readable instructions, data structures, program modules, or other data. Computer storage media may be, for example, and not limitation, RAM 1302, ROM 1304, EEPROM, Flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared, and other wireless media. Combinations of any of the above are also included within the scope of computer readable medium.

Computing functionality 1300 may also comprise an input/output module 1312 for receiving various inputs (via input modules 1314), and for providing various outputs (via one or more output modules). One particular output module mechanism may be a presentation module 1316 and an associated GUI 1318. Computing functionality 1300 may also include one or more network interfaces 1320 for exchanging data with other devices via one or more communication conduits 1322. In some embodiments, one or more communication buses 1324 communicatively couple the above-described components together.

Communication conduit(s) 1322 may be implemented in any manner (e.g., by a local area network, a wide area network (e.g., the Internet), and the like, or any combination thereof). Communication conduit(s) 1322 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices. The features of the present disclosure described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, and the like).

Figure 14:
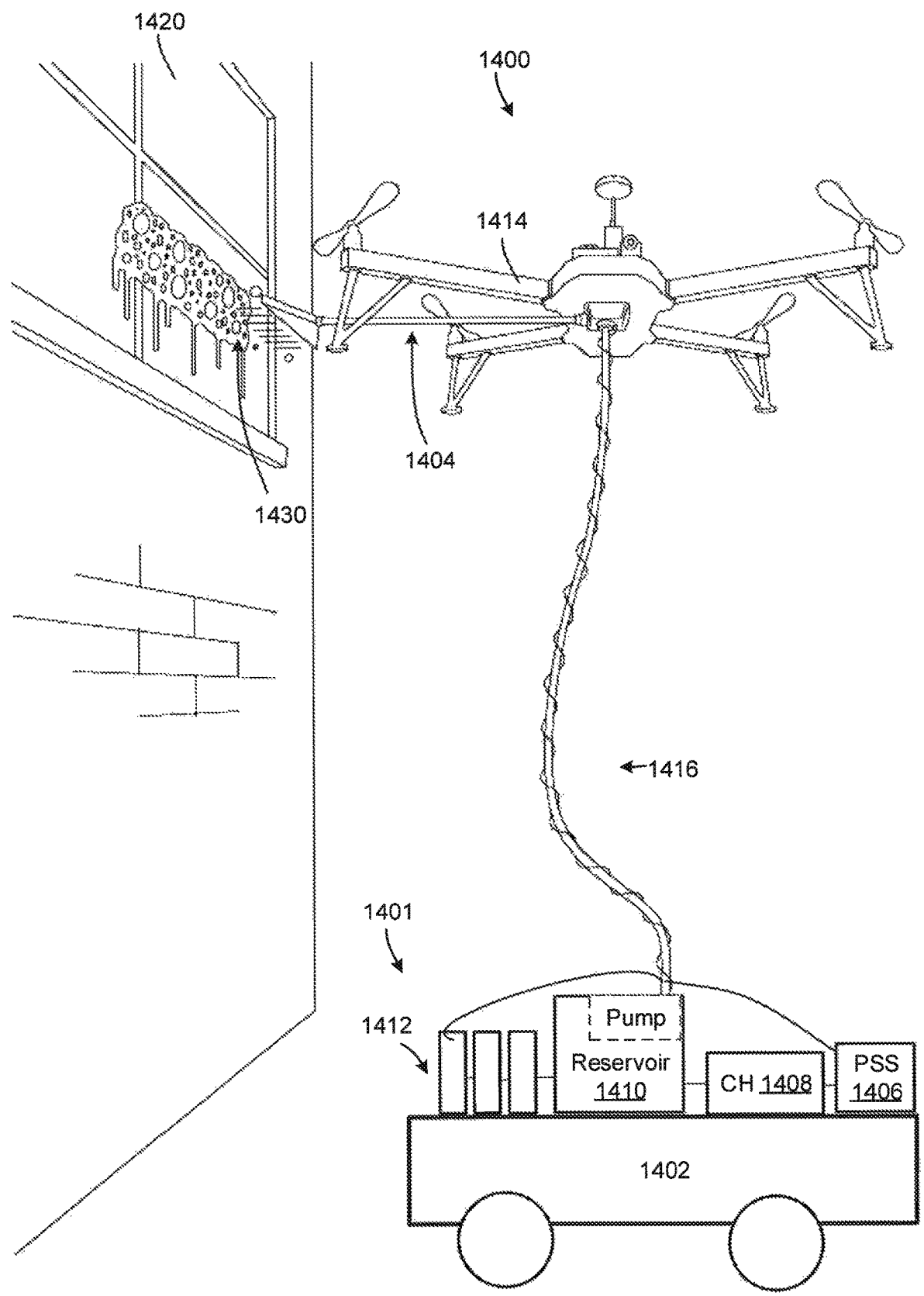
FIG. 14 is a view of the UCAT operations system dispensing a fluid medium in the direction of a structure, according to an aspect of the present disclosure.

FIG. 14 is a view of the UCAT operations system 1400 dispensing a fluid medium in the direction of a building 1420, according to an aspect of the present disclosure. The system 1400 includes an unmanned self-propelled (USP) vehicle 1414 (such as a drone, UAV, or robotic device) comprising a tool 1404 having a dispensed tool output (represented as fluid medium 1430 applied to a window of building 1420).

The system 1400 includes a mobile base station 1401 having a mobile platform 1402. The mobile base station comprises a power supply source (PSS) 1406 and computational hardware (CH) 1408 having one or more processors. The mobile base station 1401 may include a fluid medium source such as reservoir 1410 having a pump to pump an amount of a fluid medium from within the reservoir 1410. The one or more processors may be operable to generate control signals to control the USP vehicle 1414 and to affect the dispensed tool output from the tool. Additionally, the one or more processors may generate control signals to control the tool as well such as, without limitation, to control an articulating arm, telescopic action by a tool.

The mobile base station 1401 may include an umbilical cabling and tethering (UCAT) apparatus 1416 to interconnect the USP vehicle 1414 and the mobile base station 1401. The UCAT apparatus 1414 may provide the USP vehicle 1414 with one or more of power from the power supply source (PSS) 1406, a fluid medium from the fluid medium source (i.e., reservoir 1410) and the control signals. In one embodiment, the computation hardware (CH) 1408 may communicate one or more control signals to the USP vehicle 1414 via a wireless communication protocol or a wireless communication medium. In an embodiment, the pump is configured to pump the fluid medium up the UCAT apparatus 1416. In another embodiment, the USP vehicle 1414 may include a pump connected to the UCAT apparatus 1416 to pump the fluid medium from the fluid medium source (i.e., reservoir 1410) up to the USP vehicle 1414.

The mobile computing device 126 (FIG. 1A, 1B or 1C) may also be part of system 1400. The mobile base station 1401 may include one or more supplemental devices 1412.

FIG. 15A is a view of the UCAT assist system 1530A, according to an aspect of the present disclosure. The system (i.e., system 100B or 100C) may comprises a mobile base station (i.e., mobile base station 101B and 101C) and a robotic device 114. For a frame of reference, the robotic device 114 may be a first unmanned self-propelled (FUSP) 1514. The mobile base station may be operable to generate control signals to control the first unmanned self-propelled (FUSP) vehicle 1514, having a tool 1504 with a dispended tool output. The one or more control signals may affect the dispensed tool output from the tool. The umbilical cabling and tethering (UCAT) apparatus 1516A may be configured to interconnect the FUSP vehicle 1514 and the mobile base station (i.e., mobile base station 101B or 101C) via at least one cord, the at least one cord communicating to the FUSP vehicle 1514 one or more of power from the power supply, the control signals and fluid medium from the fluid medium source. The UCAT apparatus 1516A may comprise at least on first assist fastener member 1537A coupled to the casing of the UCAT apparatus 1516A. However, the UCAT apparatus 1516A may include a plurality of first assist fastener members 1537A distributed along a length of the UCAT apparatus 1516A. The UCAT apparatus 1516A or mobile base station may include computational hardware 1548 configured to receive signals from sensors 1547.

The UCAT assist system 1530A may include at least one UCAT assist device 1534A which may connect and reconnect to any one of the plurality of first assist fastener members 1537A. As a frame of reference the UCAT assist device 1534A includes a mini robotic device (i.e., mini robotic device 134a, 134b or 134c) which may be a second unmanned self-propelled (SUSP) vehicle having a second assist fastener member 1549A. The second assist fastener 1549A may be removably coupled to the at least one first assist fastener member 1537A of the UCAT apparatus 1516A, wherein each UCAT assist device 1534A when attached to the UCAT apparatus 1516A assists a portion of the at least one cord or casing of the UCAT apparatus 1516A. Multiple UCAT assist devices can assist multiple portions of the UCAT apparatus 1516A.

The FUSP vehicle 1514 and the SUSP vehicle comprise one of a multi-rotor rotorcraft, an aerial vehicle and a waterproof aerial vehicle.

The at least one first assist fastener member 1537A and/or the second assist fastener member 1549A may comprise a magnet wherein the at least one first assist fastener member 1537A and the second assist fastener member 1549A may be fastened together via a magnetic force.

The UCAT assist system 1530A may comprise a plurality of UCAT assist devices 1534A, wherein each UCAT assist device 1534A comprises a second unmanned self-propelled (SUSP) vehicle having a second assist fastener member 1549A, the second assist fastener 1549A removably coupled to a respective different one of the first assist fastener members 1537A of the UCAT apparatus 1516A, wherein each UCAT assist device 1534A when attached to the UCAT apparatus 1516A to assist a portion of the UCAT apparatus 1516A. In general, the first assist fastener member 1537A may not be dedicated to any one UCAT assist device 1534A.

The mobile base station may comprise a landing pad (i.e., 400A or 400B of FIGS. 4A and 4B) for the SUSP vehicle 1534A to land thereon, wherein the landing pad includes a charging mechanism to charge the SUSP vehicle when landed. The landing pad may comprise machine readable markings 404a and 404b or beacons 407 (i.e., LEDs) detectable by the SUSP vehicle during landing. The UCAT apparatus 1516A may comprise one or more sensors 1547 to sense at least one parameter associated with a functionality status and/or position of the UCAT apparatus. The system may include computational hardware to: determine a position and/or the current functionality status of the UCAT apparatus; cause a display on a display device or control panel to a user of the functionality status or position based on the sensed at least one parameter, and control the UCAT assist device(s) based on the sensed at least one parameter. By way of non-limiting example, each UCAT assist device may be configured to support a portion of a weight of the one or more cords or casing of the UCAT apparatus 1516A; and move and maneuver the one or more cords or casing. The UCAT assist device may be configured to interchange the tool or a tool tip on the FUSP vehicle.

The UCAT assist device may land on the UCAT apparatus 1516A or mobile base station (i.e., 101B or 101C) or elsewhere but are still part of the communications chain of the UCAT operations system. The UCAT apparatus 1516A may "call them to action" (meaning the UCAT assist devices) to help move or reposition the casing or cords of the UCAT apparatus 1516A. FIG. 15B is a view of the UCAT apparatus with hook fasteners, according to an aspect of the present disclosure. FIG. 15B is similar to FIG. 15A however, the fasteners and the UCAT assist devices are different. Thus, only the differences will be described. The umbilical cabling and tethering (UCAT) apparatus 1516B may be configured to interconnect the FUSP vehicle 1514 and the mobile base station (i.e., mobile base station 101B or 101C) via at least one cord, the at least one cord communicating to the FUSP vehicle 1514 one or more of power from the power supply, the control signals and fluid medium from the fluid medium source. The UCAT apparatus 1516B may comprise at least on first assist fastener member 1537B coupled to the casing of the UCAT apparatus 1516B. Fastener member 1537B may be a hook or hook and loop fastener. The UCAT assist system fastener(s) 1537A and 1537B and fasteners 1549A and 1549B may comprise a plurality of connection and attachment methods.

The UCAT assist system 1530B may comprise a plurality of UCAT assist devices 1534B, wherein each UCAT assist device 1534B comprises a second unmanned self-propelled (SUSP) vehicle having a second assist fastener member 1549B, the second assist fastener 1549B removably coupled to a respective different one of the first assist fastener members 1537B of the UCAT apparatus 1516B, wherein each UCAT assist device 1534B when attached to the UCAT apparatus 1516B to assist a portion of the UCAT apparatus 1516B. In general, the first assist fastener member 1537B may not be dedicated to any one UCAT assist device 1534B. Furthermore, each UCAT assist device 1534B may be include a mini UCAT apparatus 1538 for receipt of one or more of power, control signals or a fluid medium such as described above in relation to a robotic device 114. The mini UCAT apparatus 1538 may limit the flight or movement of each UCAT assist device. In some instance, each UCAT assist device 1534B would have a dedicated fastener in which to attach to lift the casing of the UCAT apparatus 1516B.

Figure 15C:
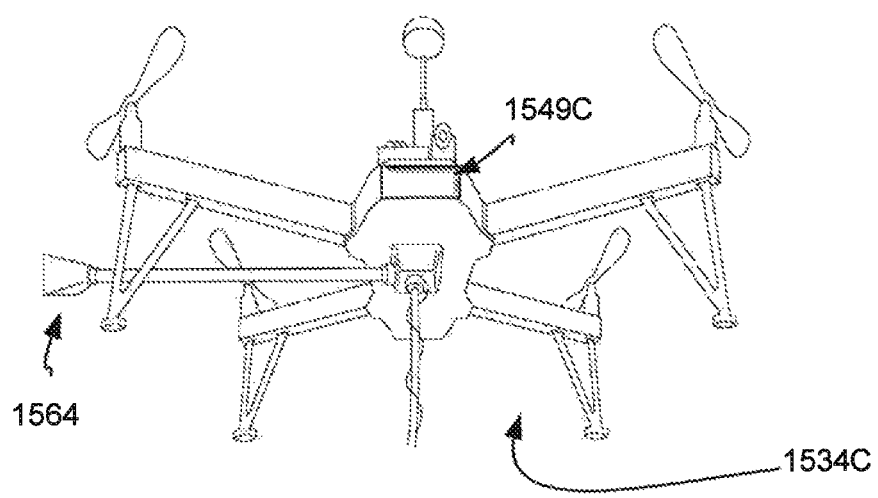
FIG. 15C is a view of a UCAT assist device with a tool, according to an aspect of the present disclosure.

FIG. 15C is a view of a UCAT assist device 1534C with a tool 1564, according to an aspect of the present disclosure. The UCAT assist device 1534C may comprise a tool 1564 having a dispensed tool output which may be in addition to the dispensed tool output of the FUSP vehicle 1514. The UCAT assist device 1534C includes a fastener 1549C located on the chassis of the device 1534C. The fastener 1549C should be located at a point on UCAT assist device 1534C which does not interfere with attachment to the UCAT apparatus and the operations thereof.

FIG. 16 is a view of a UCAT operations system 1600 building a structure 1620, according to an aspect of the present disclosure. The UCAT system 1600 may comprises a mobile base station 1601 similar to mobile base station 101A, 101B and 101C and a robotic device 1614. For a frame of reference, the robotic device 1614 may be a first unmanned self-propelled (FUSP). The mobile base station 1601 may be operable to generate control signals to control the first unmanned self-propelled (FUSP) vehicle, having a tool 1604 with a dispended tool output. In one aspect, the dispensed tool output is a foam or fluid medium which may be cured.

The robotic device 1614 may include a container 1632 and legs 1625. The legs 1625 may include wheels. The container 1632 may include a source of fluid medium. The material in container 1632 may be mixed with a material or fluid medium from the mobile base station 1601.

The system 1600 may also include a mobile computing device 1626 operated by user 1624 to control the task of building a structure 1620, to replenish any of the fluid sources, or to move the mobile base station 1601, for example. The mobile computing device 1626 would function in a manner as described above in relation to computing device 126 or 726. The UCAT apparatus 1616 may include a UCAT assist system 1530A or 1530B as previously described in FIG. 15A or 15B.

FIG. 16, FIGS. 18A-18D and 19A-19B are 3D printing/additive manufacturing process of structures or buildings whereby the mobile base station may transfer material (fluid medium) through the UCAT apparatus such as, but not limited to, expanding spray foam, liquid or semi solid uncured concrete, fiberglass, resins, etc. to the aerial vehicle. In an aspect, the aerial vehicle deposits the material into a form such as an expandable accordion type mold (i.e., collapsible building structure element 1870) wherein it cures or hardens and the result is an architectural structure, shown as a beam or pole as an example in FIG. 18A.

One or more accessories or tools (i.e., tool 1604) may be a 3D print head or additive manufacturing print arm or component. The 3D printing/additive manufacturing may include but is not limited to 3D printing of architectural structures such as hospitals, houses, bridges and other infrastructure. In some aspects, the mobile base station 1601 or reservoir 110 may contain sprayable expanding construction foam. In this instance, the foam would be transferred from the mobile base station 1601 through the UCAT apparatus 1616 to the aerial vehicle 1614 whereby it would be deposited or secreted into a form or mold 1620. The form or mold 1620 can optionally be anchored via clips, hooks, tie downs, etc. (i.e., fasteners 1875) that hold the base of the form or mold in place.

The form or mold 1620 may be paper, plastic, tin foil, metals, or other materials or combination of materials. The form or mold 1620 may be supported with wire, plastic or other supports similar to a clothes dryer accordion style exhaust vent. Materials such as the sprayable expanding construction foam would be deposited into the form or mold 1620 where it would cures or harden and in many cases expand. The aerial vehicle 1614 would then detach from or drop the form or mold and be free to resume further or different operations.

Upon hardening of the material in the form or mold the form or mold may be removed or left in place as part of the architectural support structure (in this example a beam or pole) or as decoration. The form or mold may have various hooks, connectors, cavities, holes, brackets, etc. to facilitate attaching items, components or structures together; attaching supplemental items; or to hang or rest things.

In another example the aerial vehicle 1614 could take off (fly) with the form or mold "collapsed" (meaning not extended) and deploy or drop the bottom of the form or mold at any predetermined location wherein it could expand and unfold downward; hover over the form or mold, and add material(s) from the mobile base station 1601. Optionally when the deposited material has hardened or cured the aerial vehicle 1614 would then detach or drop the form or mold. In some instances the form or mold may have a base pre-installed. The base would prevent added material from escaping or exiting the bottom of the form or mold. The base could also anchor or assist in anchoring the form or mold into position. The form or mold may include collapsible building structure element 1870.

Figure 18A:
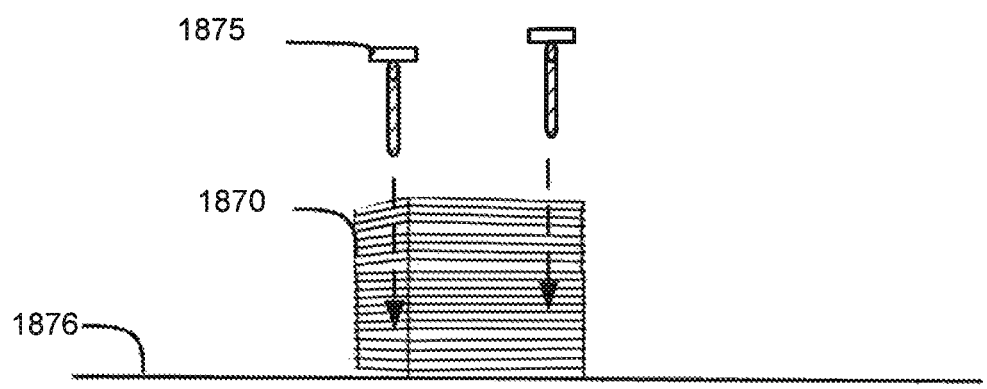
FIG. 18A is a view of a collapsible building structure element, according to an aspect of the present disclosure.

FIG. 18A is a view of a collapsible building structure element 1870, according to an aspect of the present disclosure. The collapsible building structure element 1870 is shown in a collapsed position. The collapsible building structure element 1870 may be fastened to the ground or other support surface 1876 via fasteners 1875.

Figure 18B:
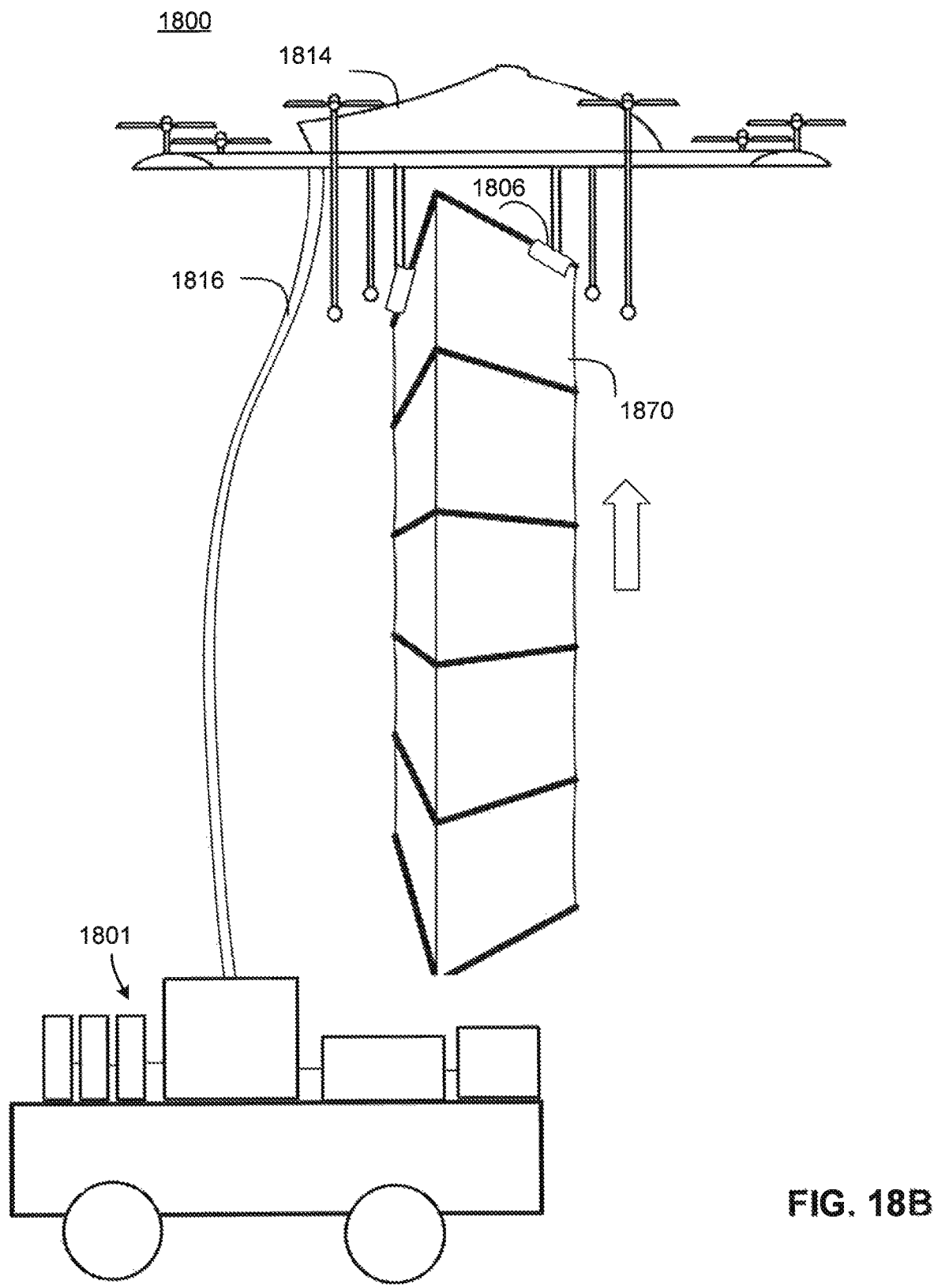
FIG. 18B is a view of a UCAT operations system lifting the building structure element of FIG. 18A, according to an aspect of the present disclosure.

FIG. 18B is a view of a UCAT operations system 1800 lifting the collapsible building structure element 1870 of FIG. 18A, according to an aspect of the present disclosure.

The tool may include a claw, grippers, or other fasteners 1806 which clamps or grips to a top end of the collapsible building structure element 1870 or a support element such as a cable that holds or connects the building structure element 1870 so that as the robotic device 1814 lifts upward, the collapsible building structure element 1870 expands or raises. The bottom of the collapsible building structure element 1870 remains fastened to the ground or other support surface 1876. The robotic device 1814 is shown attached to the mobile base station 1801 via the UCAT apparatus 1816. While not shown, the system 1800 may include a mobile computing device. The UCAT apparatus 1816 may include a UCAT assist system 1530A or 1530B as previously described in FIG. 15A or 15B.

Figure 18C:
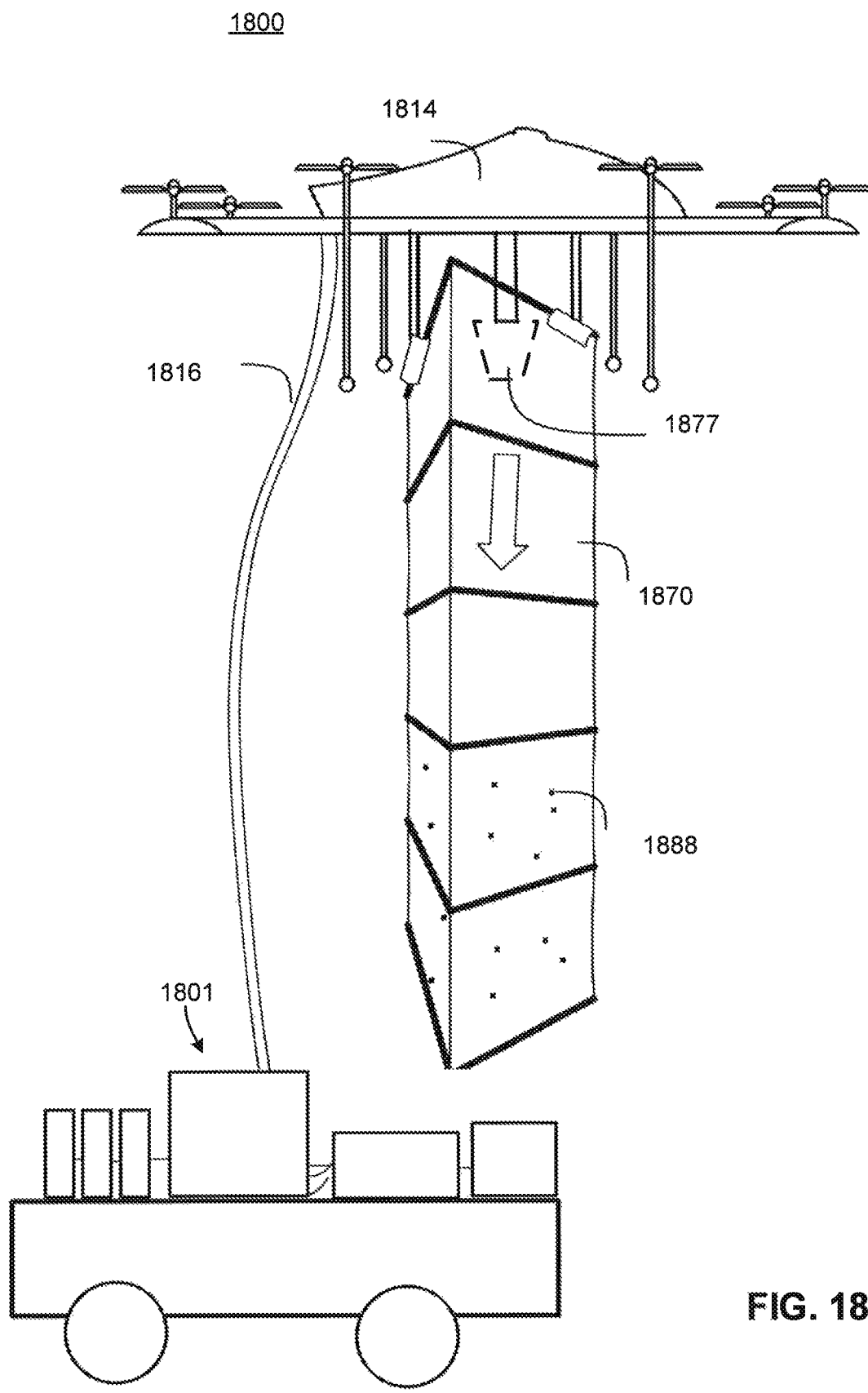
FIG. 18C is a view of a UCAT operations system filling the lifted the building structure element of FIG. 18B, according to an aspect of the present disclosure.

FIG. 18C is a view of a UCAT operations system 1800 filling the lifted the collapsible building structure element 1870 of FIG. 18B, according to an aspect of the present disclosure. A tool with a nozzle 1877 is shown filling the interior of the lifted collapsible building structure element 1870. Nozzle or material extruder 1877 may be extendable and detractable and include attachments such as a material disperser to facilitate material placement within the collapsible building structure form 1870. The filling is represented as the dots 1888. The filing may be a foam, cement or other building material. The building may be intended to be temporary. The building may be built in a disaster zone where temporary housing needs to be rapidly built. The process described herein allows for three-dimensional (3D) additive manufacturing of temporary housing by the UCAT operations system described herein.

Figure 18D:
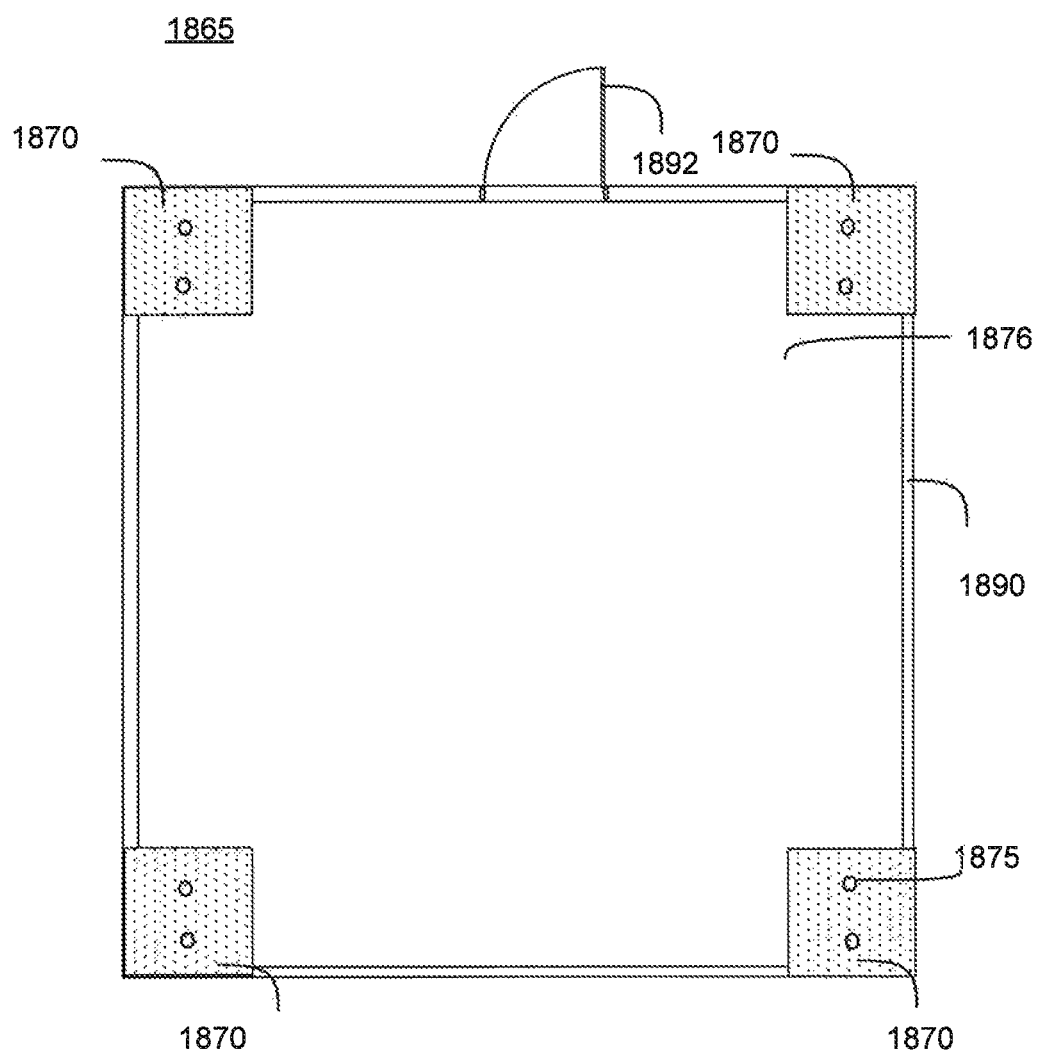
FIG. 18D is a top view of a buildable structure using the UCAT operations system of FIGS. 1A-1B, according to an aspect of the present disclosure.

FIG. 18D is a top view of a buildable structure 1865 using the UCAT operations system of FIGS. 18B-18C, according to an aspect of the present disclosure. The building structure 1865 may include a plurality of collapsible building structure element 1870 which may be fastened via fasteners 1875. The plurality of collapsible building structure element 1870 are filled with material for stability. The buildable structure 1865 is shown with side walls 1890 and door 1892. The side walls 1890 may be built by system 1800 using robotic device 1814 to follow an outline for the walls. The door may be built onsite or purchased from a store. The ground or other support surface 1876 may be formed by the system 1800 using robotic device 1814 prior to placement of the plurality of collapsible building structure element 1870. Once the buildable structure 1865 is finished, the interior ground or support surface 1976 may be cured with other COTS flooring. While only four collapsible building structure element 1870 are shown, the buildable structure 1865 may have more or less.

The walls may be made of fiberglass or other durable material suitable for temporary housing. The material may be weather resistant and/or environmentally resistant. In an aspect, the fiberglass or composite walls are collapsible and configured to be raised but maintain a generally continuous wall surface. One or more systems or robotic devices 1814 may be used to fill two or more collapsible building structure elements 1870 at a time.

Figure 19A:
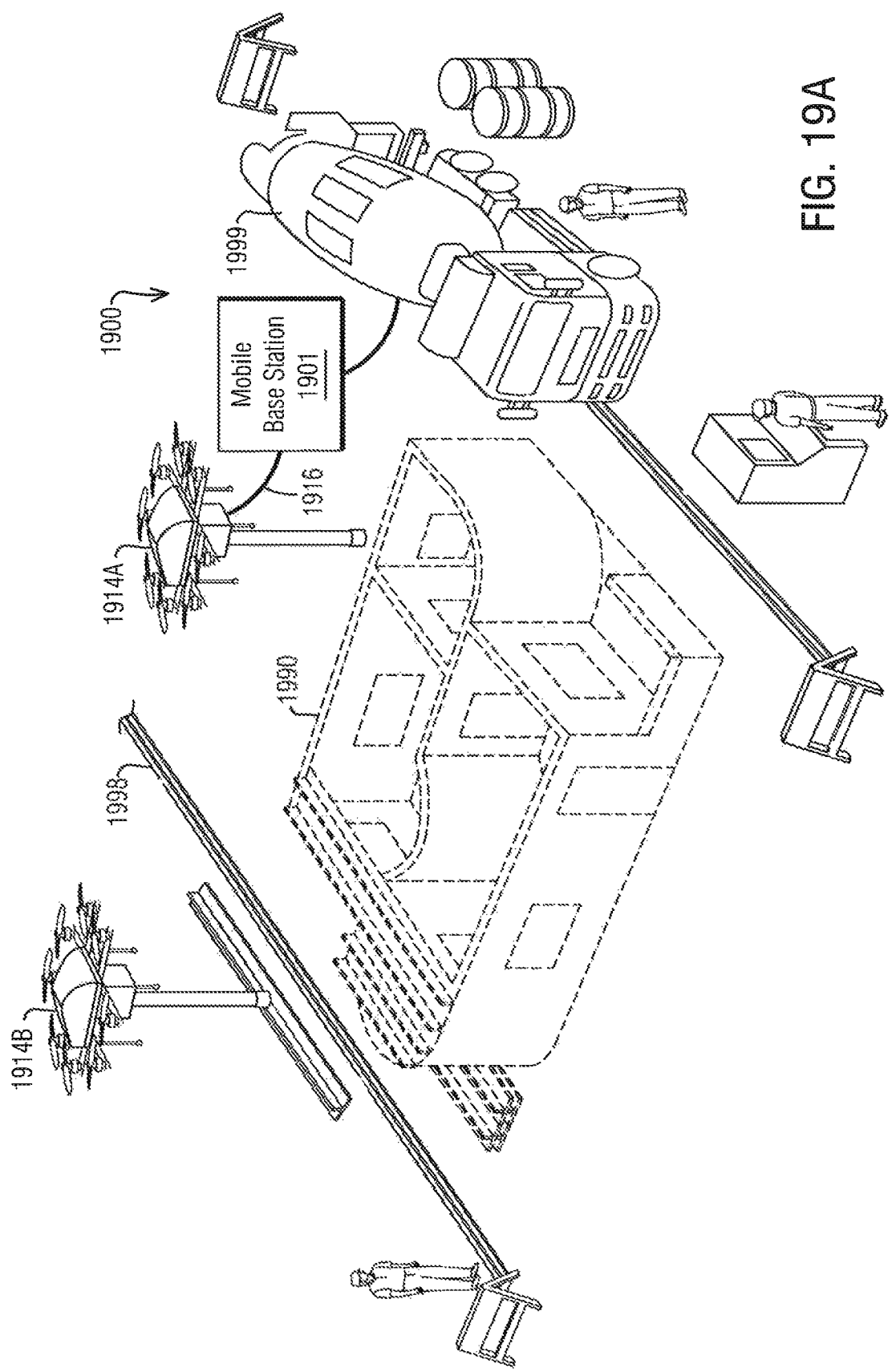
FIG. 19A is a plan view of a buildable structure using at least one UCAT operations system, according to an aspect of the present disclosure.

FIG. 19A is a plan view of a buildable structure 1990 using at least one UCAT operations system 1900, according to an aspect of the present disclosure. The UCAT operation system 1900 includes at least one robotic vehicle 1914A coupled to mobile base station 1901 via UCAT apparatus 1916. The mobile base station 1901 has coupled thereto a source of fluid medium from a cement truck 1999. Other sources of a fluid medium may be used. In lieu of cement, a foam or other curable material may be used to build structure 1990 shown in dashed lines. A second robotic vehicle 1914B is shown picking up a support structure 1998. The support structure 1998 may be made on site such as by 3D printing including by UCAT operations system 1800, picked up by robotic vehicle 1914B and moved to a predetermined location on the buildable structure 1990. In an aspect, the mobile base station 1901 may be omitted provided, the cement truck 1999 or a truck with a fluid medium can communicate with the robotic vehicle 1914A.

The system 1900 may include two mobile base stations, one for each robotic vehicle. However, if robotic vehicle 1914B performs only lifting, then the mobile base station for that robotic device may be optional. However, the power of the robotic vehicle would need to be replenished. Each robotic vehicle may have an assigned task(s) to build the structure 1990.

The robotic vehicles may be used to build the structure 1990 from the ground up.

Figure 19B:
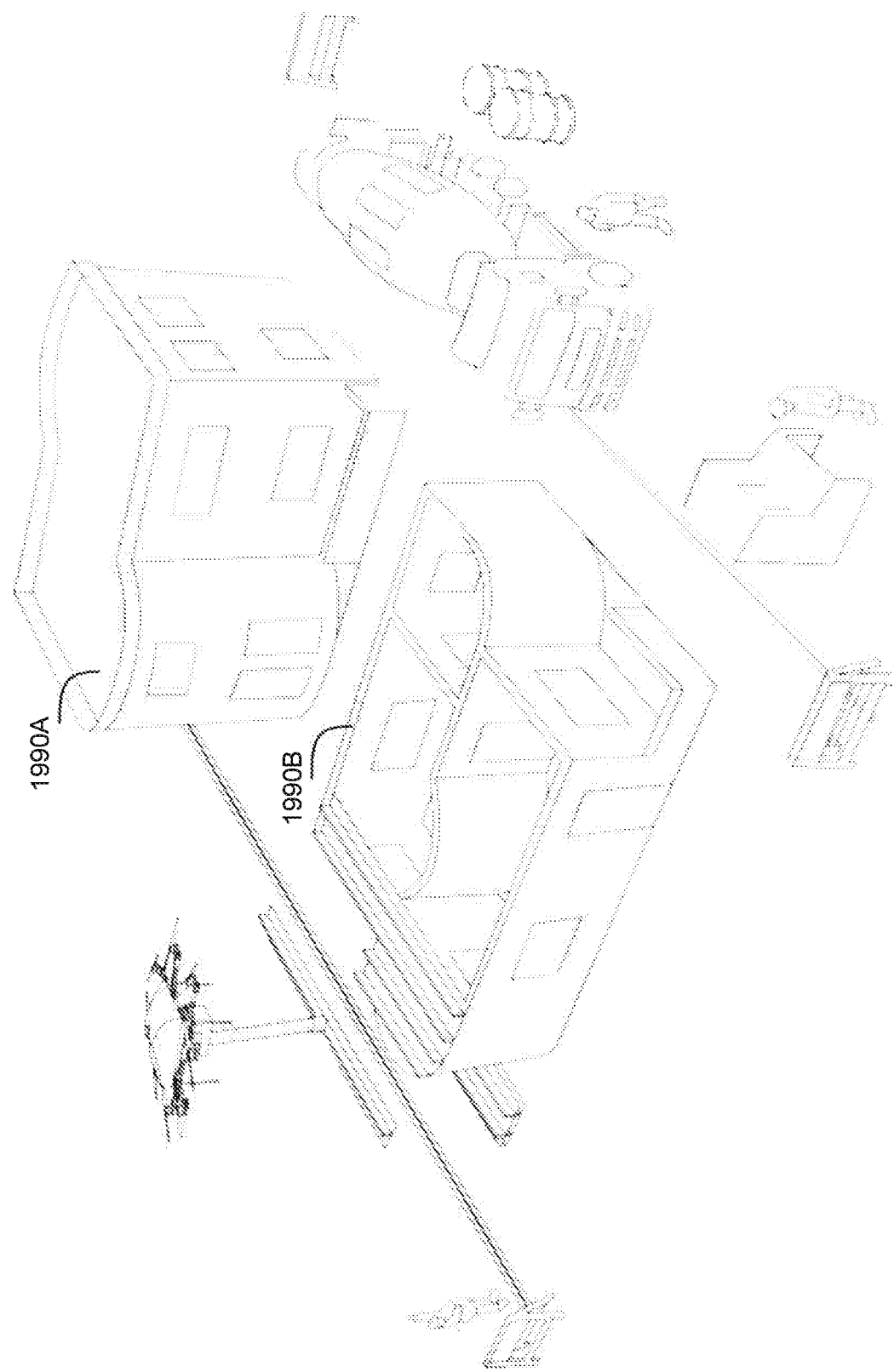
FIG. 19B is a view of a built structure and a partially built structure using at least one UCAT operations system, according to an aspect of the present disclosure.

FIG. 19B is a view of a built structure 1990A and partially built structure 1990B using at least one UCAT operations system, according to an aspect of the present disclosure. The structure 1990A and 1990B may be temporary building or permanent buildings. The plumbing of the structures 1990A and 1990B may be installed using the UCAT operation system with the aid of a plumber. The electrical wiring may be installed with the assistance of an electrician. Window AC units may be employed for air conditioning and heating for temporary housing configurations. For permanent buildings, air-conditioning units and ducts may be installed after the structure is built or the 3D printing operations of the UCAT operations system 1800 may form or mold around openings such that the openings could be utilized as ducts for an air conditioning system. Similarly, the 3D printing operations of the UCAT operations system 1800 could print different materials for the wall and for the electrical cable portion of the wall, for example depositing liquid metal at the same location within the wall with each subsequently slightly higher pass thereby over the course of multiple passes and deposits forming a vertical or multidirectional electrical cable.

Figure 20A:
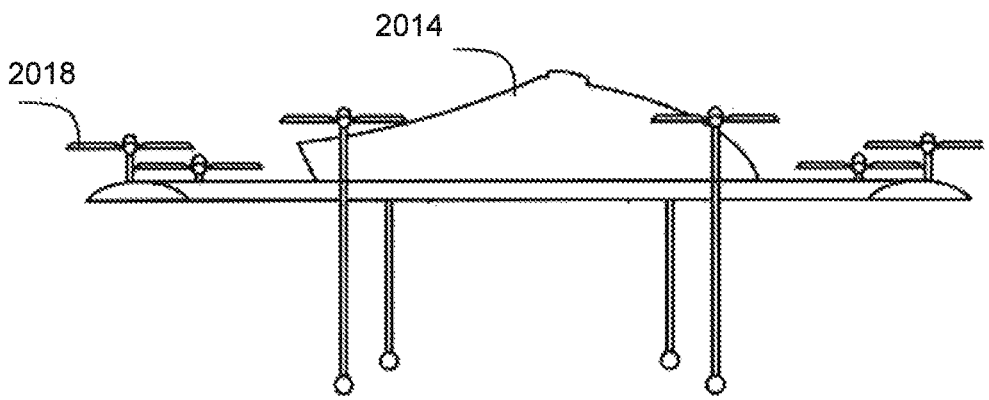
FIGS. 20A-20C are views of an aerial vehicle above water, hovering in water and submerged in water, according to an aspect of the present disclosure.
Figure 20B:
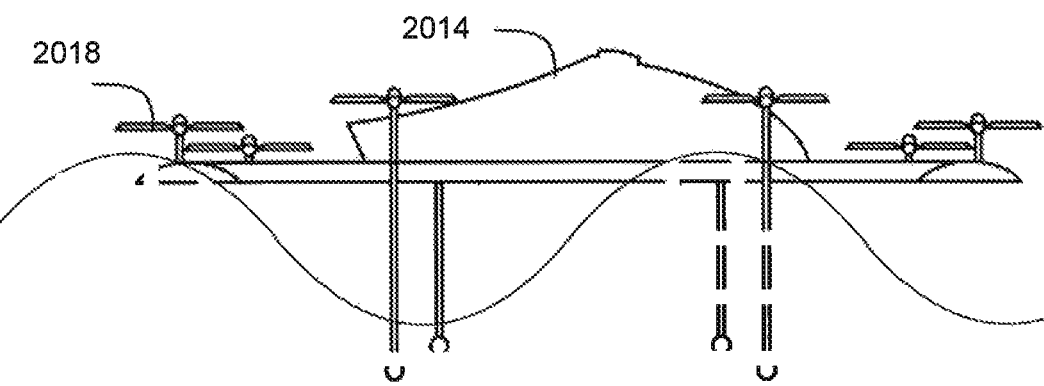
Figure 20C:
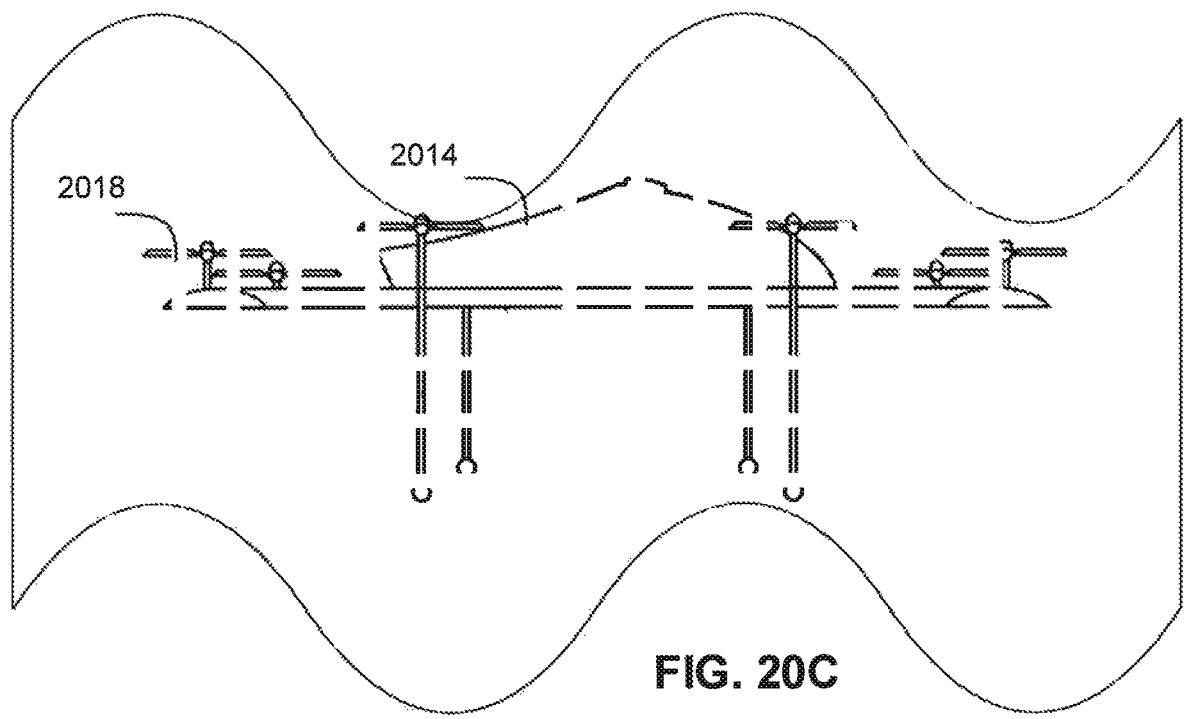

FIGS. 20A-20C are views of an aerial vehicle 2014 above water, hovering in water and submerged in water, according to an aspect of the present disclosure. In an aspect, the aerial vehicle 2014 may be a waterproof UAV or unmanned self-propelled vehicle. The aerial vehicle 2014 may be configured for both on land, above land including low or no gravity environments and underwater operations. The aerial vehicle 2014 when submerges is represented in dashed lines, as shown in FIG. 20C. In FIG. 20B only that portion of the aerial vehicle 2014 being submerged is represented as dashed lines. The rotors 2018 on the aerial vehicle 2014 serve as propellers underwater for movement in water and for movement through air.

One or more of the systems 100A, 100B or 100C described herein may be used for de-icing airplanes. Using a robotic device 114 or one or more mini robotic devices 134a, 134b or 134c, an airplanes may be sprayed with a de-icing solution. Then, a tool for sensing the thickness of the coating of the de-icing solution may be used to determine if enough de-icing chemicals was applied such as without over spraying.

The de-icing process may rely on information about the environment (current and expected weather/temperature/humidity/etc.) and the application rather than the expert opinion of a human operator. The robotic device 114 or one or more mini robotic devices 134a, 134b or 134c could also spray close to the fuselage and other areas without having to stay a distance from them as current human de-icers do.

Further, the robotic device 114 or one or more mini robotic devices 134a, 134b or 134c may collect and log compliance and other data as historical information. The historical information may include how much de-icer solution was applied to each portion of the plane, conditions at the time of the application, etc.

The UCAT operations systems described herein may be used for agricultural harvesting such as fruit picking, nut picking or other unharvested produce. The robotic device 114 could maneuver around trees, collect the fruit and transport it via the UCAT apparatus to the mobile base station. The mobile base station could autonomously drive down rows of trees or crops while the intelligent UCAT apparatus (supported and moved by the mini robotic devices) places the robotic device 114 near the fruit to be harvested and an "attachment" to the robotic device 114 can "pick" or gather the fruits/berries/nuts etc. and transfer them to the mobile base station via the UCAT apparatus. In this aspect, the UCAT apparatus would have cords of sufficient circumference to feed the picked produce.

The UCAT operations systems described herein may be used inside of structures to perform cleaning, painting, welding, testing, sensing or other tasks described herein. The UCAT operations system may be used in environments which are hazardous to humans or not easily accessible by humans. The UCAT operations system may be used to provide a helping hand.

The tethering of the aerial vehicle by the UCAT apparatus may minimize or nullify the need for Federal Aviation Administration (FAA) compliance wherein tethering limits the flight range of the aerial vehicle and/or the system is defined as a robotic system and does not enter the United States airspace. The flight range of the tethered aerial vehicle is short range and limited as a function of the length of the cords of the UCAT apparatus. Generally, UAVs have longer range flights such that they are free to fly any distance limited only by its on-board power. The aerial vehicles described herein may have a longer operational time because power may be derived from a larger power source of the mobile base station through the UCAT apparatus during operation wherein the flight path being limited by the length of the UCAT apparatus providing such power and/or fluid medium.

In view of the foregoing, apparatus, systems, and methods are described which facilitate the ability of novice users to monitor levels of task-related materials and power supplies for robotic devices performing certain tasks and operations; as well as to initiate a process or processes by which the task-related materials and power supplies may be supplied/replenished either continuously or on-demand; and/or by which collected materials may be removed or transferred, all without the need to interrupt the robotic device's task performance by recalling it to a material and/or power supply replenishment/deposit station or have a human user travel to the device to remove collected material from it, or otherwise interact with the device. Furthermore, apparatus, systems, and methods are disclosed which enable users of all ability levels to monitor a variety of aspects, including the functionality of all components of a system that uses robotic devices to perform tasks, environmental variables that may affect the system, as well as additional similar actionable items.

In an aspect, a hardware interface for drones/robots/UAV's is disclosed which incorporates computational hardware that may monitor, manage, and supply the levels of task-related materials and power supplies to a drone/robot/UAV system. Additionally, a wireless or attached touchscreen, computer, verbal or other user interface is utilized to allow a user to view the material and power supply levels as well as input commands that initiate processes by which the materials and power supplies may be supplied, replenished, or transferred either continuously or on-demand without interrupting the current functionality of the drone/robot/UAV. The interface may be contained within one or more mobile computing devices. The computing device(s) may comprise a standalone unit and/or may be integrated as part of a mobile base structure.

The mobile base structure may comprise a platform or stage-like structure that includes wheels or some other means of mobility. The movement of the base structure may be user-driven or the base structure may move on its own accord based on received instructions or autonomously based on information it has gathered through various sensors and feedback. The base structure may be used to house modular interchangeable electrical, mechanical, and other equipment; an intelligent command and control system, such as, by way of example and not limitation, a computer tablet, embedded systems, and the like; and task-related materials that may be used by drones/robots/UAV's.

A UCAT apparatus or system is also disclosed that serves to physically connect the mobile base structure to the drone/robot/UAV. The UCAT apparatus may comprise cords, cables, tubes, and similar structures that facilitate the movement of materials, power supplies, and/or communication between the base structure and the drone/robot/UAV. Computational modules may also be contained within the UCAT apparatus to enable it to communicate with other devices as well as to determine and broadcast its current position and other information and data. The UCAT apparatus in conjunction with the mobile base structure offer the drone/robot/UAV unencumbered mobility.

The term "UAV" shall be taken to mean and refer to herein an unmanned aerial vehicle, UAV or aerial robotic system capable of hovering in fixed location without forward motion. The UAV may be tethered or untethered, and may be guided and controlled autonomously, by direct human input, or by a combination of human input and autonomous systems. The term "sensor" shall be taken to mean and refer to herein any sensing, testing or measuring device, system or tool that operates in contact with, in close proximity to, or adjacent a surface. Sensors may include, as non-limiting examples, electro-magnetic sensors, video cameras, temperature sensors, infra-red cameras, liquid-penetrant, ultrasonic, etc. Liquid-penetrant may include dyes, fluid, color fluid, water, etc. The term "elevated surface" shall be taken herein to mean and refer to any substantially vertical or otherwise elevated or tall surface, wall or the like, or a location on such a surface, or the surface of an elevated object, not easily reachable or accessible from ground level, upon which sensing, measuring or testing is to be performed by a sensor. An elevated surface may be coated or uncoated.

FIG. 22 is a representative illustration of a top view of a UAV 2214 having a sensor 2211 mounted onto sensor arm 2212, the sensor 2211 positioned near an elevated surface 2220. The sensor arm 2212 has one end coupled to the UAV 2214. The sensor arm 2212 has a free end having coupled thereto a sensor 2211. The term sensor and probe may be used interchangeably herein. The sensor 2211 may sometimes be referred to as a task sensor or testing sensor.

The sensor 2211 senses the surface 2220 such as to perform a measurement. In some embodiments, the sensor 2211 may be replaced with another tool to perform a task on the surface. The UAV 2214 may include position sensors 2255A and 2255B. The position sensor 2255A is represented as dashed line with an arrow directed toward surface 2220. The position sensor 2255A may be an ultrasonic sensor. The UAV 2214 may have an ultrasonic sensor on at least two sides of the testing sensor 2211 wherein position sensors 2255A provide for capturing at least one of sensed surface information and sensed sensor position information which may be used to position or adjust the testing sensor 2211 relative to the surface and/or for measurement registration and alignment. As will be discussed later, a tilt of the testing sensor may cause an error in measurement readings. Thus, in some embodiments, the position of testing sensor directly relative to the surface may be determined to align the data. Additionally, the UAV 2214 may include light detection and ranging (LIDAR) sensors 2255B represented as "V". The LIDAR sensors may also be on at least two sides of the testing sensor 2211. The LIDAR sensors may be used for LIDAR odometry. Nonetheless, the LIDAR odometry sensors may be substituted with other odometry systems such as cameras for visual odometry. The odometry may be used to sense the sensor's position which may be used to position or adjust the testing sensor 2211 relative to the surface and/or for measurement registration and alignment.

By way of non-limiting example, if a portion of the sensor is detected as not flush with or flat on the surface 2220, based on the sensors 2255A or sensors 2255B, the UAV 2214 causes the sensor arm 2212 to be adjusted so that the sensor 2211 is aligned to be flush or nearly flush with the surface.

In operation, the UAV or system creates an electronic data record of all tests performed, and environmental conditions reported by sensors, as well as visual (video) and UAV flight records. The environmental conditions may include one or more of temperature, humidity, wind speed, air particles, air quality, and chemical composition. In some embodiments, digital images such as two-dimensional or three-dimensional images of a surface may be detected and recorded with both the environmental condition and measurement data.

Thus, the unmanned aerial vehicle (UAV) may comprise a sensor capable of sensing, measuring or testing locations on an elevated surface, such as a wall, hull or object, at a height not reachable by a worker without elevating the worker by physical means such as a ladder, lift, scaffold, etc., wherein the sensor is a contact or close proximity sensor. The UAV may be tethered or untethered. The UAV may be human controlled, computer controlled, or controlled by a combination of the two. The UAV may be provided with proximity detecting systems to properly distance the UAV from the elevated surface. The sensor is mounted on a sensor arm with shock-absorbing capability to prevent damage to the sensor, as will be described in more detail below. The sensor arm may be extendible and retractable, and may articulate and/or bend. Orientation systems may be provided to properly align the sensor to the elevated surface.

FIG. 23 is a representative illustration, partially in cross-section, showing an embodiment of a spring-biased, shock absorbing, telescoping sensor arm 2312. The spring-biased, shock absorbing, telescoping sensor arm 2312 may include a first arm portion 2312A coupled to the UAV. The sensor arm 2312 may include a second arm portion 2312B. One end of the second arm portion 2312B is telescopically or slideably mounted within the first arm portion 2312A. A spring 2313 has a spring force to position a sensor end of the second arm portion 2312B relative to the first arm portion 2312A or UAV. The second arm portion 2312B may move within the first arm portion 2312A to shorten a length of the sensor arm 2312 such as when the sensor 2311, at the sensor end, engages the wall or other surface with a force is greater than the spring force. The spring-biased, shock absorbing, telescoping sensor arm 2312 allows a length of the arm 2312 to dynamically and automatically adjust during flight and operation to protect the sensor from damage within the telescoping range of arm 2312. Any of the sensor arms described herein may include spring-biased, shock absorbing, telescoping sensor arm 2312. The telescoping range being the range from the shortest length of arm 2312 to the longest length of arm 2312. By way of non-limiting example, the longest length of the arm 2312 may be achieved such as when no compression force is applied to the spring or the tip of the sensor. The shortest length of arm 2312 may be achieved by application of a maximum compression force to the spring. The shortest and longest lengths may be constrained by baffles to limit sliding motion of the second arm portion 2312B in the first arm portion 2312A. The sensor 2311 may be attached directly or indirectly to the sensor arm. In some embodiment, the sensor may be attached to a cone as described in relation to FIGS. 24A-24D.

Figure 24B:
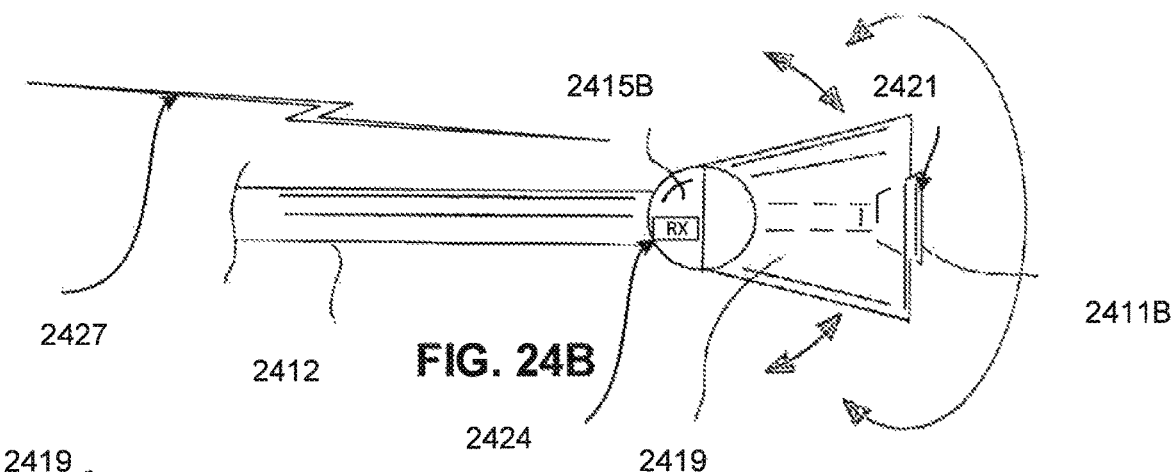
FIG. 24B is a representative illustration showing a sensor arm having the scraper disposed within a cone attached to the sensor arm, according to an aspect of the present disclosure.

FIG. 24A is a representative illustration showing an embodiment of a sensor arm 2412 having the sensor 2411A disposed within a self-orienting collar or cone 2419 attached to the sensor arm 2412 by a swivel mechanism 2415. The swivel mechanism 2415 may include a swivel cradle 2416. The swivel mechanism 2415 may include a swivel or ball 2417 swivelly mounted in the swivel cradle 2416. The swivel or ball 2417 has coupled thereto a sensor collar or cone 2419. The sensor collar or cone 2419 may have mounted therein sensor 2411A. In some embodiments, the sensor collar or cone 2419 surrounds the sensor 2411A. By way of non-limiting example, the collar or cone 2419 may serve to minimize a wind force from compromising the integrity of the measurements during sensing by sensor 2411A. The collar or cone 2419 may serve to minimize debris from affecting measurements by the sensor 2411A during operation. The collar or cone 2419 may serve to form a sensing chamber for improved measurements. The swivel mechanism 2415 may be remotely controlled, as will be described in relation to FIG. 24B.

The swivel mechanism 2415 allows both the collar or cone 2419 and the senor 2411A to swivel or pivot when the sensor and cone engage channels, ridges, or other variations on the elevated surface 2220. The arm 2412 may include a spring-biased, shock absorbing, telescoping sensor arm 2312 to provide further degrees of adaptability of the sensor and/or cone relative to variations in the elevated surface 2220.

For example, the edge of the collar or cone 2419 via the spring force may adjust (via the spring biasing force) to directly abut up to the elevated surface 2220. The sensor 2411A may be essentially positioned in a center of the volume of the collar or cone 2419. An axis of the sensor 2411A may be aligned with an axis of the cone 2419.

The edge of the cone 2419 may be provided with a rubber, elastomeric or resilient rim element 2427 for a soft-landing of the cone relative to the surface 2220. In some embodiments, the resilient rim element 2427 may include micro-spine grippers which may grip onto the surface. Thus, as the sensor 2411 is moved across the elevated surface 2220, the cone 2419 may, via the spring biasing force or the rubber, elastomeric or resilient rim element, remain essentially in direct contact with the elevated surface 2220 while providing a degree of adjustability and flexibility in relation to the surface of the wall.

FIG. 24C is a representative illustration showing a micro-stripper rim for the cone for at least one of a soft landing to make direct contact with a surface and/or to affix the cone to the surface. When the cone is affixed to the surface, the cone may be detached from the arm and left in the position or location at which the cone was attached for the sensor to perform sensing at the location.

In the measurement mode, the cone location, at which the cone is attached, is recorded. The cone location data may be determined using global positioning system (GPS) spatial acquisition data.

As the cone 2419 moves tilts or swivels, one or more of sensors 2255A and sensors 2255B may detect the tilt of the cone to adjust position of the arm or to align the sensor readings. The cone houses the sensor contact. Thus, the sensors 2255A and 2255B may also determine a location of the housing or cone housing the testing sensor.

By way of non-limiting example, if a portion of the sensor or cone 2419 is detected as not flush with or flat on the surface 2220, based on the sensors 2255A or sensors 2255B, the UAV 2214 causes the sensor arm 2212 to be adjusted so that the sensor 2211A is aligned to be flush or nearly flush with the surface.

FIG. 24B is a representative illustration showing a sensor arm 2412 having the scraper 2411B disposed within cone 2419 attached to the sensor arm 2412. The cone 2419 may be attached to the senor arm 2412 via swivel mechanism 2415B. The scraper 2411B may protrude passed the forward edge of cone 2419. The scraper 2411B may include a sharp edge 2421 configured to scrape a surface. As the sharp edge 2421 scrapes along a surface, paint, coating or other material may be scraped from or lifted from the surface to form scrapings. The scrapings may be collected in the cone for retrieval, analysis or inspection. In other embodiments, the scrapings are created by prepping a surface before application of paint, a coating or other material. The forward edge of the cone 2419 may include a resilient rim element or micro-spine grippers which extends from the edge of the cone 2419 to or beyond the shape edge 2421 of the scraper 2411B. The resilient rim element or micro-spine grippers may effectuate a micro-resiliency of the scraper relative to the surface.

The swivel mechanism 2415B allows the scraper to be dragged along the elevated surface 2220. The dragging may cause removal of or lifting of material from the elevated surface 2220.

The swivel mechanism 2415B may be a remotely controlled swivel mechanism 2415B and includes a receiver (RX) 2424 in wireless communication with a remote controller such as used by the pilot or software controls. In some embodiments, the receiver 2424 may receive control signals via wired communications through the UAV.

Arms may extend/retract, and may contain "elbows" and extending elbows. The arms may contain mirrors that allow a camera to "see around the corner" or may contain a remotely movable camera within or attached to any location on the arm. The arm may contain the spring "travel mechanism" that allows an aerial vehicle or robotic system to continue with its movement while the sensor or another component is stationary against a surface. The arms may contain a "collar" or swivel mechanism so that contact is maintained not only as the robotic system continues to move forward but also if the robotic system moves forward "at an angle". The swivel mechanism may include a rotatable ball mechanism.

Figure 24D:
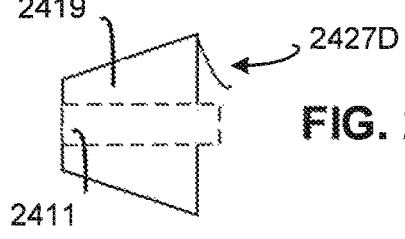
FIG. 24D is a representative illustration showing a cone spring-cushion, according to an aspect of the present disclosure.

FIG. 24D is a representative illustration showing a cone 2419 having a spring-cushion 2427D. The spring-cushion provides a soft-landing of the sensor 2411 relative to the surface it is to be in contact with or in very close proximity. For example, in some tests, the sensor 2411 does not need to touch the surface but should be in close proximity or nearly touching. The spring-cushion 2427D may be a smart touch sensor such that on approach to the surface, the spring-cushion 2427D may make contact first with the surface. As the spring-cushion 2427D flexes or bends as a result of an impact or bending force from engagement with the surface, may cause a trigger to modify the UAV flight to a sensor landing mode. The sensor landing mode may allow the UAV to land a contact surface or probe element of the sensor directly on the surface. The UAV flight may be dynamically bumpy as the result of weather conditions such in the presence of varying wind speeds. The care is taken to land the sensor in a manner which does not damage the sensor and with precision controlled alignment. The smart spring-cushion may communicate with a controller of the UAV or ground controller either wirelessly or wired. The smart spring-cushion may be battery powered or powered by the UAV.

Thus, the cone may be configured as a sensor housing having smart spring-cushion 2427D on the housing to detect imminent contact of a sensor contact or probe of the sensor with the surface 2220 during flight of the UAV 2214.

Figure 25A:
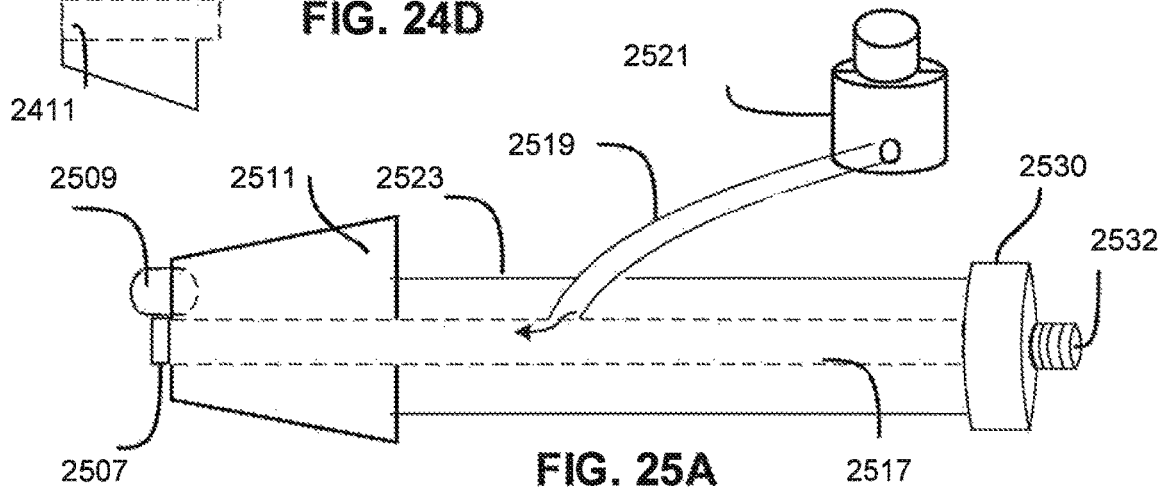
FIG. 25A-25B are representative illustrations of a resilient sensor arm body and sensor, according to an aspect of the present disclosure.
Figure 25B:
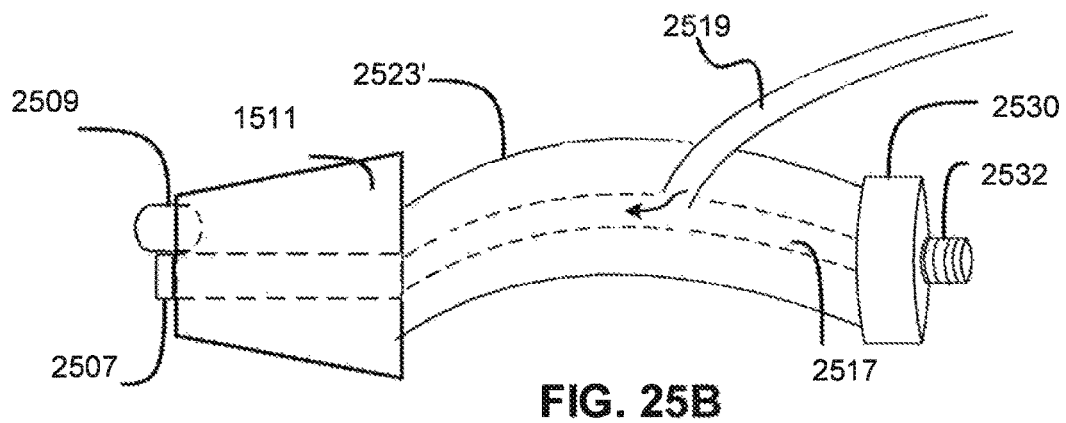

FIG. 25A-25B are representative illustrations of a resilient sensor arm body 2523 with a sensor 2511. The resilient sensor arm body 2523 may have attached an end cap 2530 with connector 2532 for attachment to a UAV. The connector 2532 may be a threaded shaft. The resilient sensor arm body 2523 may be made of rubber, elastomeric material or resilient material which allows the arm body 2523' to bend such as to form an arch, as best seen in FIG. 25B. The arch reduces the length of the arm 2523 when a force is applied to the contact or probe 2509 as the motion of the UAV is in the direction of the elevated surface 2220.

By way of non-limiting example, the sensor arm 2523 may include an internal fluid path 2517 coupled to nozzle 2507 to dispense an amount of fluid. The fluid may be viscous, a gel or other fluid medium. The sensor 2511 may integrate a nozzle to dispense the fluid from reservoir 2521. Fluid tube 2519 may be in fluid communication with the reservoir 2521 and the internal fluid path 2517. By way of non-limiting example, the sensor contact 2509 may require an amount of fluid to be applied to the surface of the elevated surface 2220 before sensing. For example, in ultrasound or sonogram measurements by sensor contact 2509, the fluid is first applied, and the sensor contact 2509 senses a measured parameter through the fluid.

The UAV may be adapted to include a mechanism for excreting a gel onto the elevated surface, or is adapted to apply a gel-containing packet to the elevated surface, the sensor then taking a reading, such as an ultrasonic reading, by touching the elevated surface through the gel or packet. The UAV may be adapted to apply a patch or packet of a soluble liquid onto the elevated surface, the patch or packet being removed at a later time. The UAV in another embodiment may be adapted to attach an adhesive member for a pull-off adhesion test, the member being removed immediately or at a later time, the sensor measuring the strength needed to remove the member from the elevated surface.

The sensor arm 2523 as described herein may also comprises at least one of a spring biased arm portion which telescopes the arm, an elastomeric arm body, a swivelly mounting to attach the sensor to the adjustable sensor arm and a motorized sensor arm mount (FIG. 28) configured to extend or retract the sensor arm relative to the UAV.

In some embodiments, the reservoir may store paint, a fluid or powder configured to mark a spot. For example, when performing a sensing action by the sensor, a point of failure may need to be marked. By way of non-limiting example, the paint may be dispensed immediately upon detection of failed feature at a sensed location. A marker may be applied or sprayed, for example, if a paint or coating thickness measurement fails.

Figure 26:
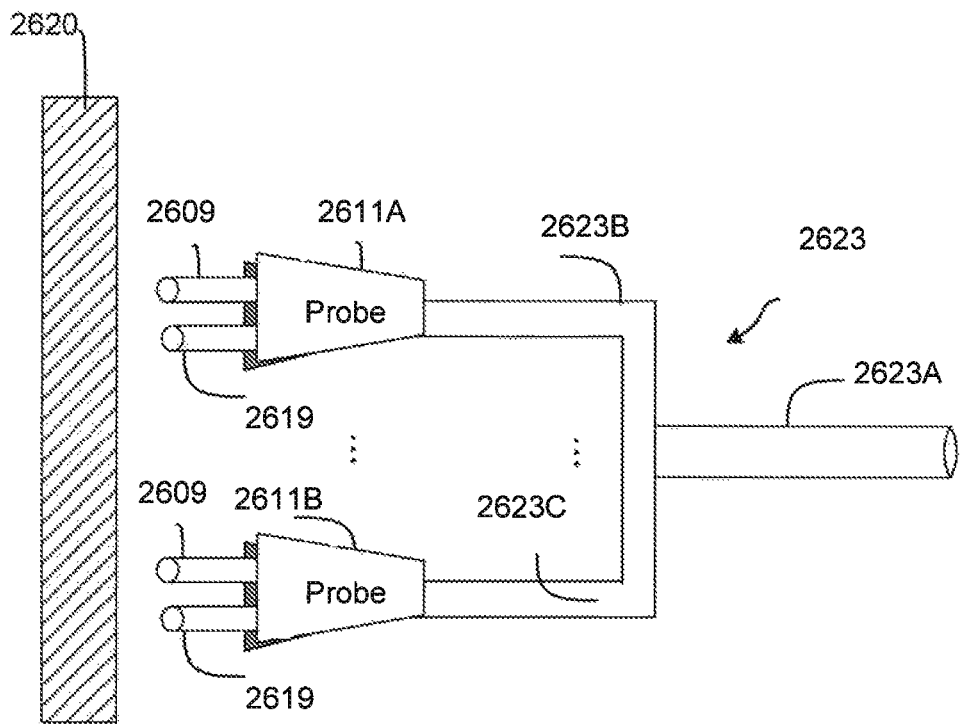
FIG. 26 is a representative illustration of a sensor arm having multiple sensors, each sensor having multiple contacts, according to an aspect of the present disclosure.

A further non-limiting example may include spraying or applying paint, die, or a puff of chalk, marking powder, marking medium, etc., to mark a spot on the elevated surface 2220, if for example, that area fails a measurement, such as a coating/paint thickness measurement. Other measurements may include detecting dirt or residue after cleaning for re-attempt at cleaning the elevated surface. Measurements may include wall thickness. If the wall thickness of a building or vessel is not to specification, the surface may be marked at the point of measurement non-compliance or failure. Other measurement may include gaps in paint or coatings, abnormal cracks or breaks in surfaces, or other non-compliant surface features. FIG. 26 is a representative illustration of a sensor arm 2623 having multiple sensors 2611A and 2611B, each sensor 2611A and 2611B may have one or more contacts 2609 and 2619. The sensor arm 2623 may include a Y shape. The sensor arm 2623 includes a primary member 2623A which forks or divides into first arm member 2623B and second arm member 2623C. The multiple sensor configuration allows parallel areas to have measurement captured by the sensors 2611A and 2611B simultaneously or nearly simultaneously. The sensors 2611A and 2611B have a define spatial relationship for capturing and registering measurements relative to the surface area tested. Furthermore, one or more contacts 2609 and 2619 have a spatial relationship with each other. Hence, the contacts 2609 and 2619 of sensors 2611A has a spatial relationship with contacts 2609 and 2619 of sensors 2611B for registering spatial measurement data.

Sensors may include shore durometer and durometers as well as other measurement gauges, probes, etc. Double and multiple pronged probes may be included. Multiple arms may be utilized. For example, one arm may make surface contact and pass a current to the surface while another arm at a different position reads the current in order to, among other things, gather data on the conditions of the substrates and coating(s).

Figure 27:
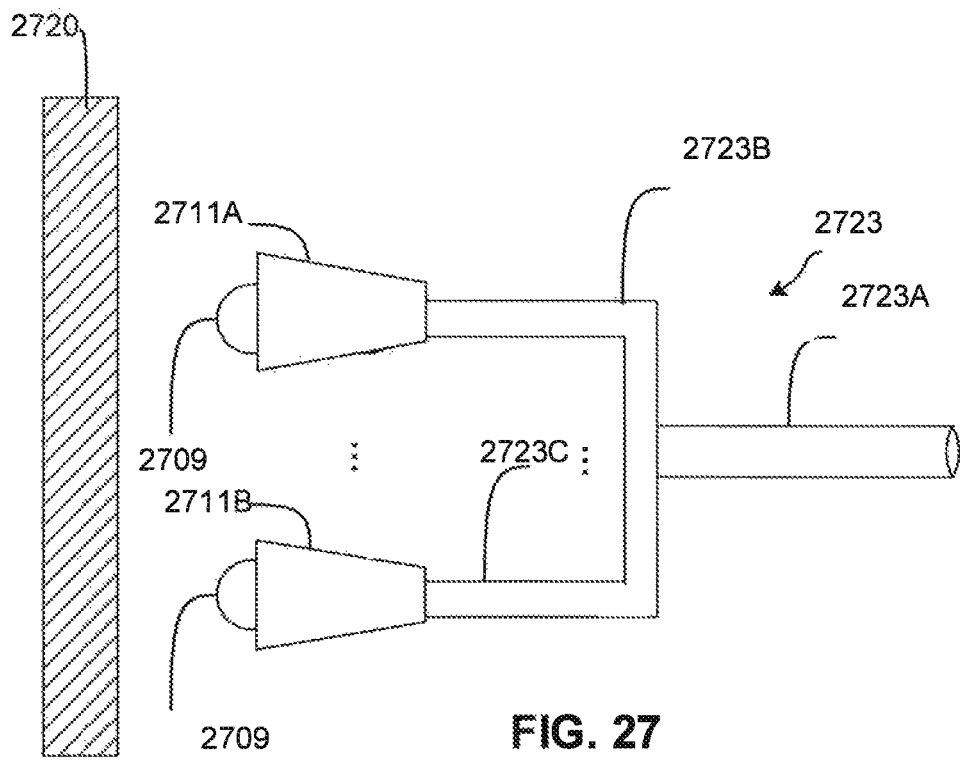
FIG. 27 is a representative illustration of a sensor arm having multiple sensors, each sensor having a contact or probe, according to an aspect of the present disclosure.

FIG. 27 is a representative illustration of a sensor arm 2723 having multiple sensors 2711A and 2711B. Each sensor 2711A and 2711B having a contact or probe 2709. The sensor arm 2723 may include a Y shape. The sensor arm 2723 includes a primary member 2723A which forks or divides into first arm member 2723B and second arm member 2723C.

Figure 28:
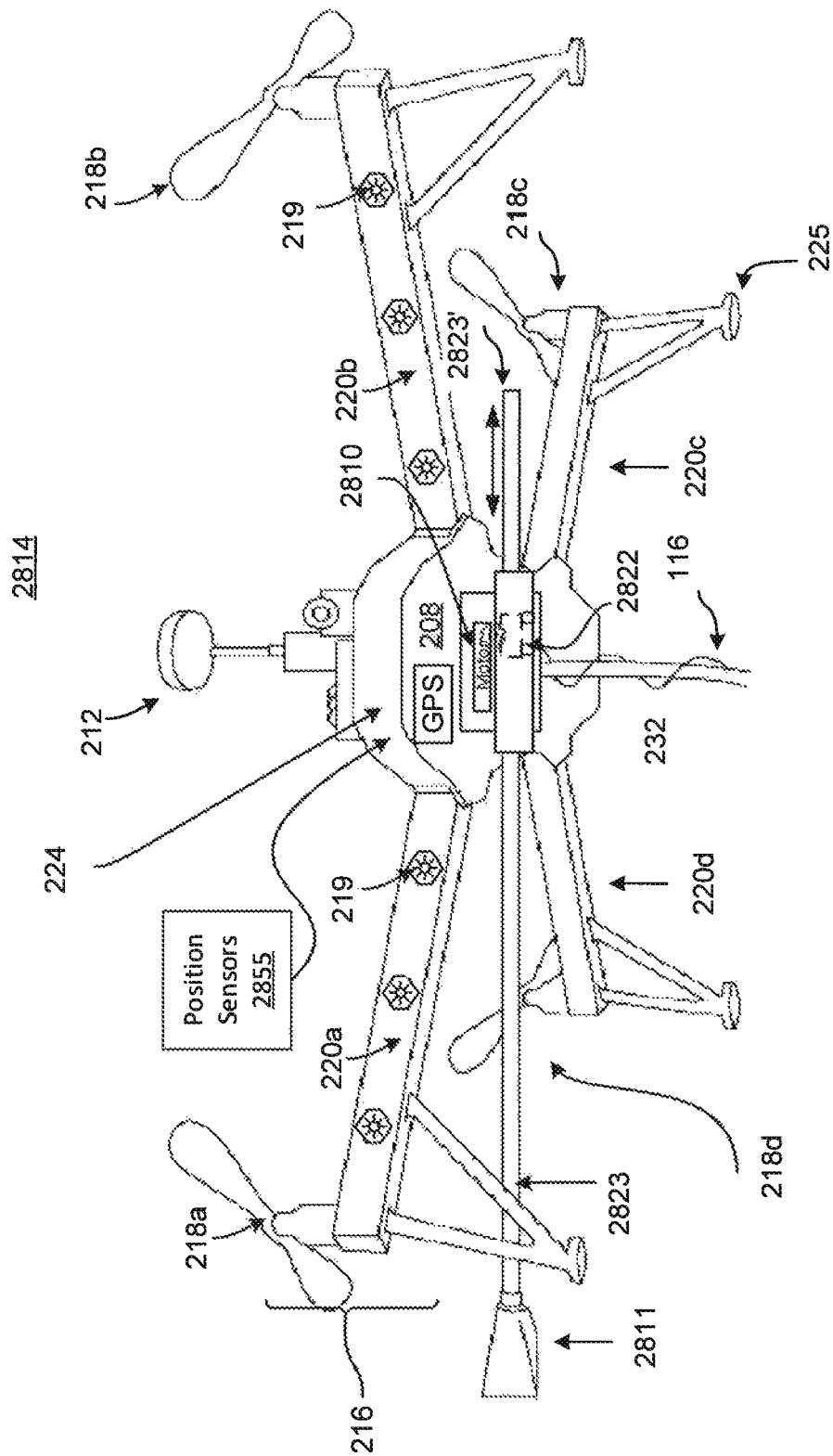
FIG. 28 is a representative illustration of a UAV having a motorized sensor arm which moves relative to extend from or retract to the UAV body, according to an aspect of the present disclosure.

FIG. 28 is a representative illustration of a UAV 2814 having a motorized sensor arm 2823 which moves relative to extend from or retract to the UAV body. The UAV 2814 is similar to aerial vehicle (UAV) 214. Therefore, only the differences will be described in detail. The motorized sensor arm 2823 supports a probe or sensor 2811. The arm 2823 has a length which is supported by movable arm support 2822 having a coupled thereto motor 2810. The arm 2823 may have and extension which extends out from the arm support 2822. The arm support 2822 is configured to move, slide or roll based on the movement of the motor 2810 to extend the sensor 2811 away from the UAV body or retract the sensor 2811 toward the UAV body. The motor and the movable arm support may be in a housing.

As the motor 2810 moves in a first motor direction, movable arm support 2822 moves in a first direction of the arm support 2822 to extend the sensor 2811 away from the UAV body. As the motor 2810 moves in a second motor direction, movable arm support 2822 moves in a second direction of the arm support 2882 which retracts the sensor 2811 toward the UAV body.

The UAV 2814 may include at least one position sensor 2855 (i.e., sensors 2255A and 2255B) to sense the closeness of the sensor 2811 relative to the surface 2220. The position sensor 2855 may communicate with the control mechanism to cause motor 2810 to extend or retract the arm 2823 to reposition the sensor 2811. For example, depending on the sensed data by the position sensor 2855, both the UAV and the arm 2823 may be controlled for proper positioning and registration of the sensor 2811 relative to the surface 2220. The registration of the sensor 2811 relative to the surface 2220 allows the measurement data, testing data or other sensed data to be mapped and tracked with other simultaneously sensed parameters or features. The UAV 2814 may be equipped with a global positioning system (GPS).

Figure 29A:
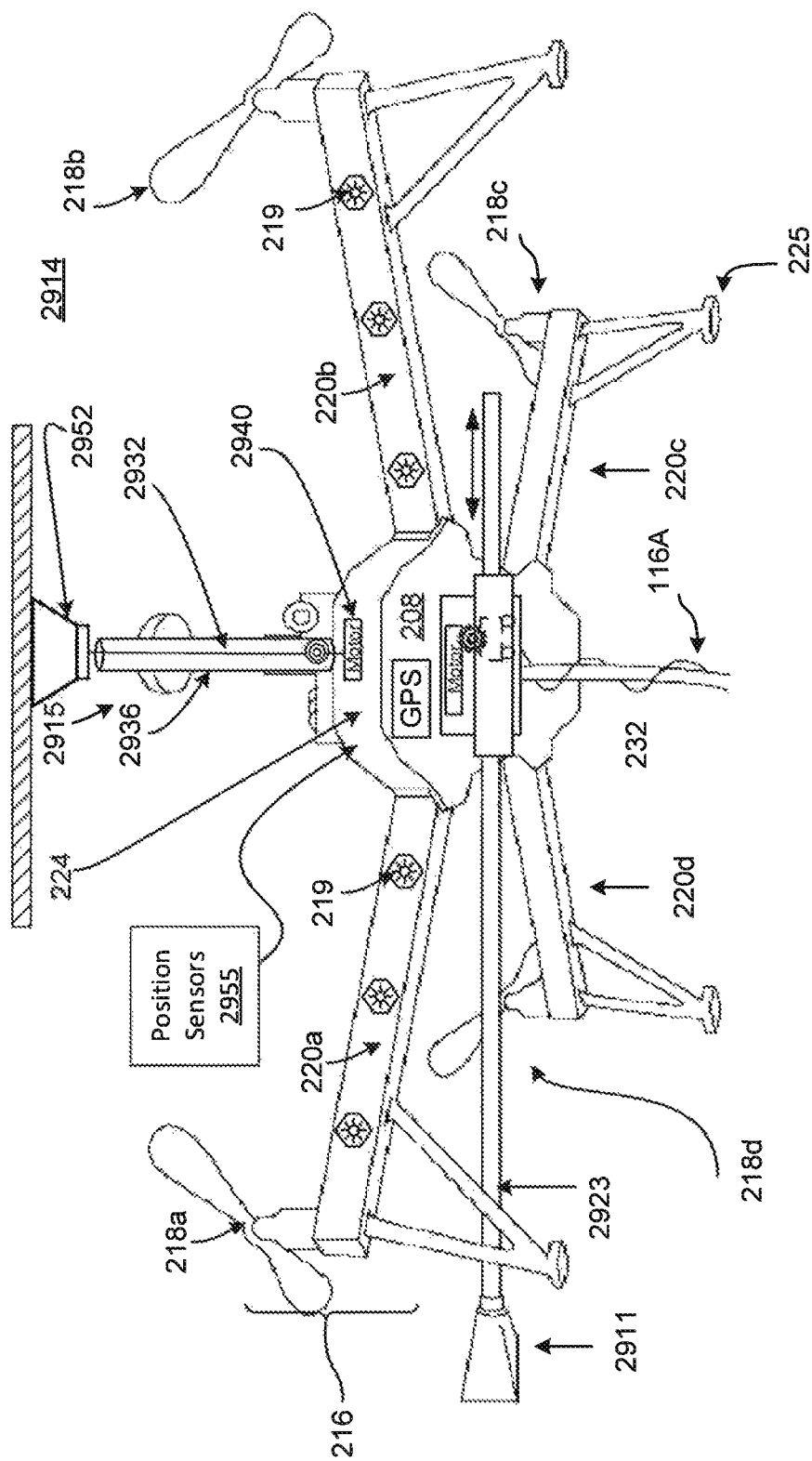
FIG. 29A is a representative illustration of a UAV having a ceiling tethering system in a retracted position, according to an aspect of the present disclosure.
Figure 29B:
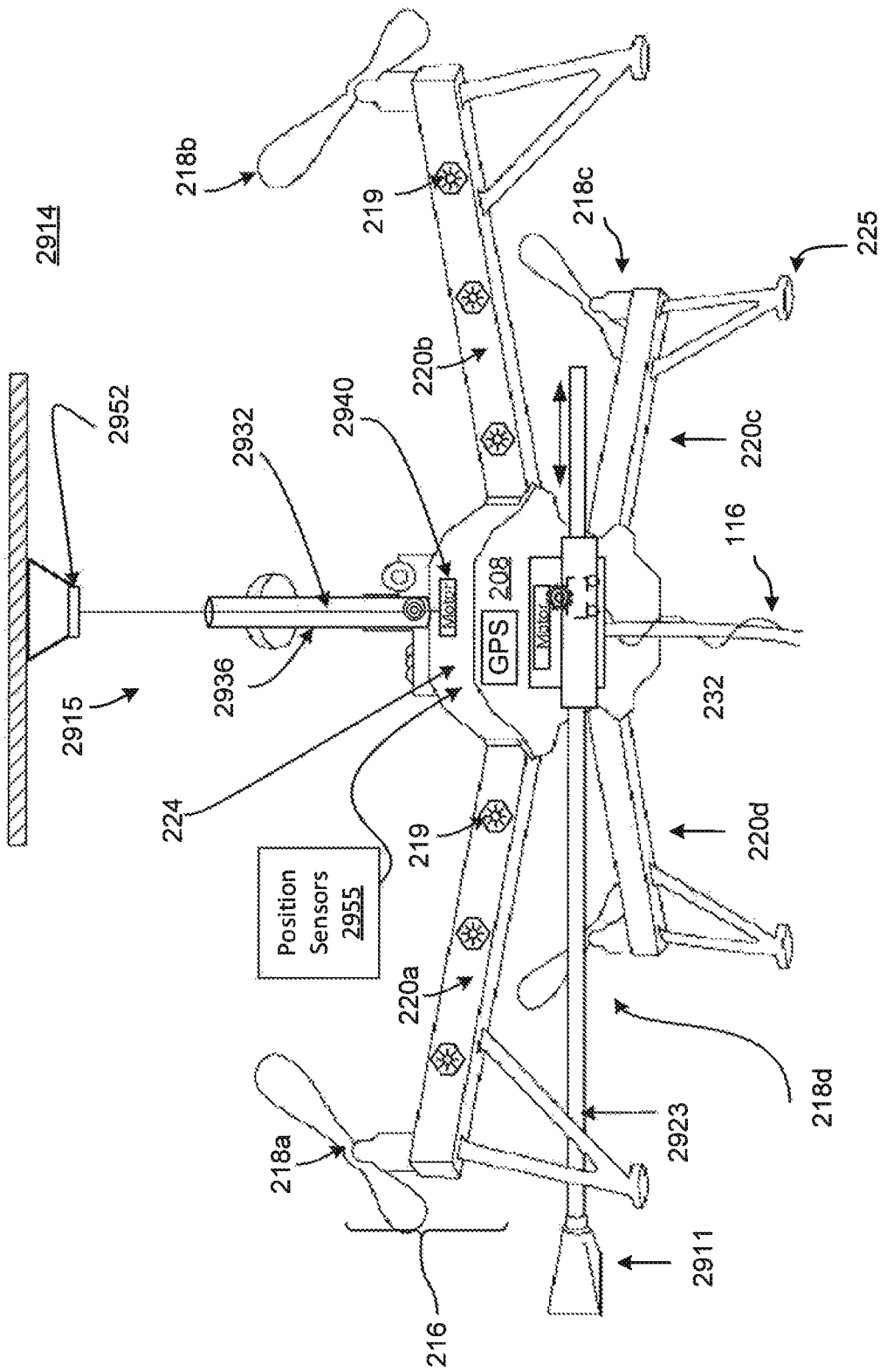
FIG. 29B is a representative illustration of a UAV having a ceiling tethering system in a lowered position, according to an aspect of the present disclosure.

FIG. 29A is a representative illustration of a UAV 2914 having a ceiling tethering system 2915 in a retracted position. FIG. 29B is a representative illustration of a UAV 2914 having a ceiling tethering system 2915 in a lowered position. The UAV 2914 is similar to UAV 214. Therefore, only the differences will be described in detail. The ceiling tethering system 2915 includes a length of tethering cord 2932 coupled to motor 2940. Motor 2940 may wind-up or unwind the tethering cord 2932 via wired or wireless control communication signals. Winding-up the tethering cord 2932 cause the cord to shorten. Unwinding the tethering cord 2932 may cause the cord to lengthen to lower the UAV 2914 relative to the ceiling. The ceiling tethering system 2915 may include a motorized winch which can be remotely controlled.

The tethering cord 2932 may have a free end attached to coupler 2952. The coupler 2952 may be adhesively attached to a ceiling surface. In other embodiments, coupler 2952 may include a hook to attach to an eyelet on the ceiling surface. Nonetheless, other fastening systems may be used to couple the cord 2932 to a ceiling. By way of non-limiting example, the tethering cord 2932 may be housed in a cord tubing or sleeve 2936 with a portion of the tethering cord wound on a winch in the cord tubing or sleeve 2936.

The UAV 2914 may include at least one position sensor 2955 to sense the closeness of the sensor 2911 relative to the surface 2220, as described in relation to FIG. 28. The UAV 2914 may be equipped with a global positioning system (GPS).

Figure 30:
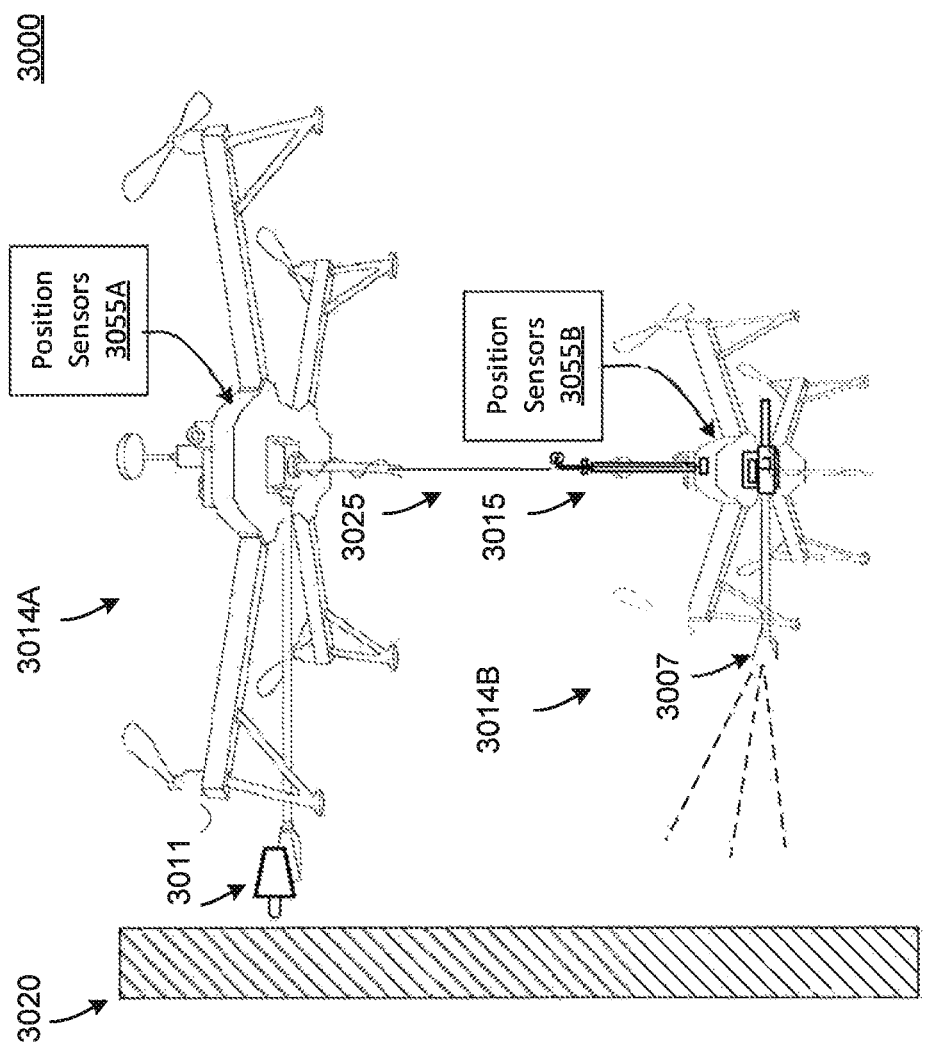
FIG. 30 is a representative illustration of a UAV having a UAV-to-UAV tethering system, according to an aspect of the present disclosure.

FIG. 30 is a representative illustration of a set of UAVs 3014A and 3014B having a UAV-to-UAV tethering system 3015. The tethering system 3015 is similar to ceiling tethering system 2915. Thus, only the differences will be described in detail. The tethering system 3015 extends and retracts tethering cord 3032 having UAV 3014B attached to an end. As the tethering cord 3032 lengths (unwound), UAV 3014B is lowered relative to the location of the UAV 3014A. As the tethering cord 3032 shortens (wound up), UAV 3014B is raised relative to the location of the UAV 3014A.

By way of non-limiting example, UAV 3014A may conduct sensing via sensor 3011. On the other hand, UAV 3014B may dispense liquid therefrom from nozzle 3007. The UAV 3014A connects to UAV 3014B such that UAV 3014B may be piloted independently from UAV 3014A.

When prepping a surface or testing a surface, the UAV 3014B below UAV 3014A may first dispense a prepping fluid or solution for application to the surface 3020. The surface area previously treated by UAV 3014B can now be sensed, measured, tested or have some other task performed on the pre-treated area by UAV 3014A.

Alternately, the sensor 3011 may be attached to UAV 3014B. The nozzle 3007 may be placed on UAV 3014A. When prepping a surface or testing a surface, the UAV 3014A above UAV 3014B may first dispense a prepping fluid or solution for application to the surface 3020. The surface area previously treated by UAV 3014A can now be sensed, measured, tested or have some other task performed on the pre-treated area by UAV 3014B.

In some embodiments, only the fluid dispensing UAV 3014A or UAV 3014B may require a reservoir for a source of fluid. The reservoir may be on-board the body of the UAV, on a sensor arm or on a ground base station. When performing a task, one of the UAVs 3014A may be the master/primary UAV and the other UAV 3014B may be a slave/secondary UAV.

By way of non-limiting example, umbilical cabling and tethering (UCAT) apparatus 116A may be removable. Thus, the umbilical cabling and tethering (UCAT) apparatus 116A may be replaced with tethering cord system 3025 to attached to the tethering system 3015. In some embodiments, the umbilical cabling and tethering (UCAT) apparatus 116A of the master/primary UAV may be replaced with the tethering system 3015 for attachment to the slave/secondary UAV. In some embodiments, the tethering system 3015 may provide wired control signals between UAVs. In other embodiments, the control signals may be wireless between UAVs.

In some embodiments, one or both UAV 3014A or UAV 3014B may be connected to both the UCAT and a secondary tethering system 3015.

The UAV 3014A may include at least one position sensor 3055B to sense the closeness of the sensor 3011 relative to the surface 3020. The UAV 3014B may include at least one position sensor 3055B to sense the closeness of the nozzle 3007 relative to the surface 3020. The UAVs 3014A and 3014B may be equipped with a global positioning system (GPS).

The at least one position sensor 2855, 2955, 3055A or 3055B may employ monocular optical photometry, visual odometry, or stereo photometry to control the position of the sensor 2811, 2911 or 3011 relative to the UAV during flight so that the sensor is not damage and can make the necessary contact with the measured or tested surface, for example. In some embodiments, the sensor 2811, 2911 or 3011 should maintain a certain clearance from the measured or tested surface. The monocular optical photometry, visual odometry, or stereo photometry to control the position of the sensor 2811, 2911 or 3011 at a location corresponding to such clearance from the surface. The monocular optical photometry, visual odometry, or stereo photometry may control the position of the nozzle apply an amount of fluid to the surface. The UAV may employ machine vision and artificial intelligence for flight control, positioning of sensors and nozzle positioning.

The sensors 2811, 2911 or 3011 may employ eddy current, ultrasonic waves, magnetic particles, radiographic sensing, liquid-penetrant testing, visual testing, infrared technology for non-destructive testing. The sensors 2811, 2911 or 3011 may perform destructive testing. The sensor may perform Ultrasonic Thickness Testing (UTT) Inspections. The sensors may perform thermal or infrared imaging. The sensors may perform visual optical testing. The sensors may conduct acoustic emissions sensing. The liquid-penetrant testing may include first applying a fluid to a surface and then testing the fluid on the surface for a chemical composition, such as without limitation salt (sodium chloride).

Figure 31B:
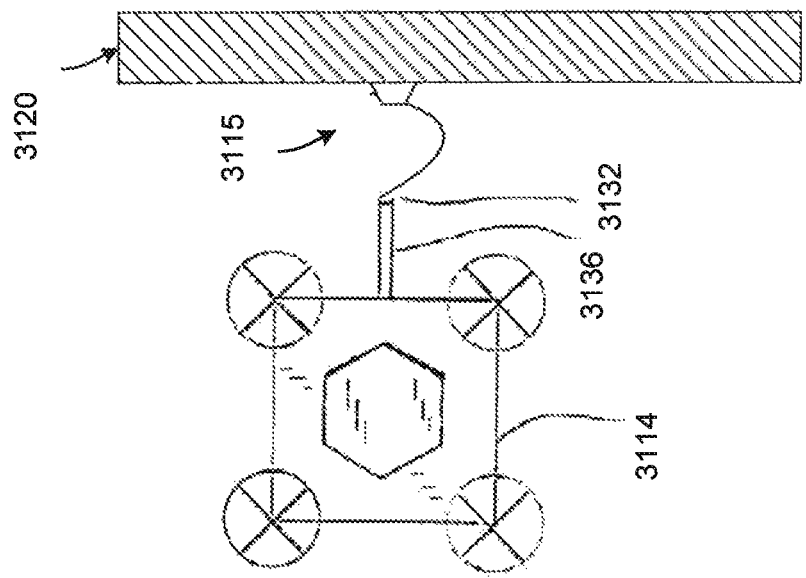
FIG. 31B is a representative illustration of a UAV with the wall tethering system in a deployed position, according to an aspect of the present disclosure.
Figure 31A:
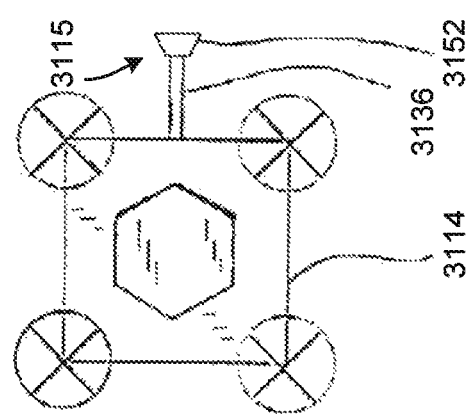
FIG. 31A is a representative illustration of a UAV having a wall tethering system in a stowed position, according to an aspect of the present disclosure.
Figure 31D:
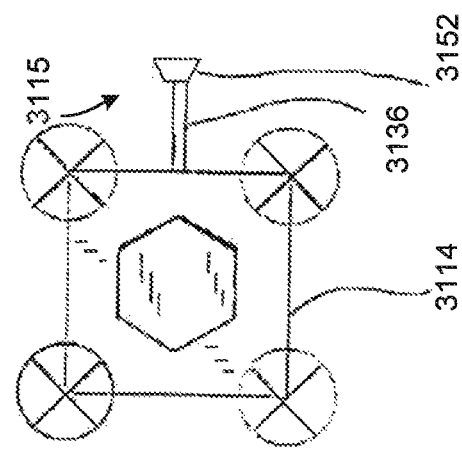
FIG. 31D is a representative illustration of a UAV with the wall tethering system returned to the stowed position, according to an aspect of the present disclosure.
Figure 31C:
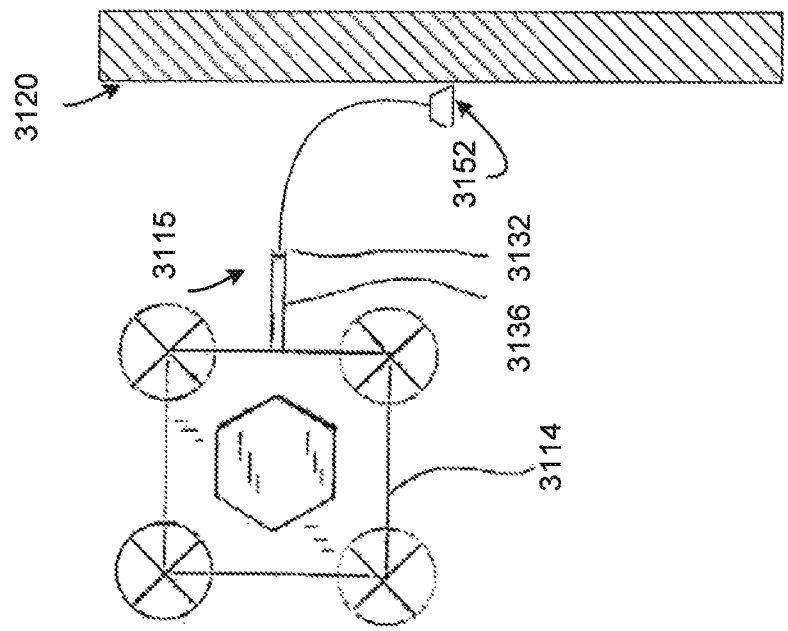
FIG. 31C is a representative illustration of a UAV with the wall tethering system in a released position, according to an aspect of the present disclosure.

FIG. 31A is a representative illustration of a UAV 3114 having a wall tethering system 3115 in a stowed position. FIG. 31B is a representative illustration of a UAV 3114 with the wall tethering system 3115 in a deployed position. FIG. 31C is a representative illustration of a UAV 3114 with the wall tethering system 3115 in a released position. FIG. 31D is a representative illustration of a UAV 3114 with the wall tethering system 3115 returned to the stowed position.

The wall tethering system 3115 is similar to the ceiling tethering system 2915. The UAV 3114 is configured to attached coupler 3152 to a wall or surface 3120. The tethering cord 3132 may have a free end attached to coupler 3152. The coupler 3152 may be adhesively attached to the surface 3120. The coupler 3152 may be suctioned to the surface in some embodiments. The coupler 3152 may hooked to the surface 3120. By way of non-limiting example, the coupler 3152 may be attached using micro-spine grippers which can be released from the surface to which the grippers affix or grip with a pulling force to pull the micro-spine grippers from the surface. Thereby, in FIG. 31C, the coupler may be released or detached from the surface to release the UAV 3114.

For example, the UAV may be piloted (via remote control software or automated software executed by an on-board processor) in the direction of surface 3120 such that coupler 3152 is in surface to surface contact with surface 3120 for the adhesive of coupler 3152 to attach to the surface. Thereafter, the tethering cord 3132 may be unwound and/or wound as the UAV performs the task (test, measuring, paint, etc.) on the surface 3120 and the position of the UAV changes. After the UAV completes the task, the coupler 3152 is detached from the surface 3120 and the cord 3132 may be wound up, thereafter.

The UAV may then move to a different location on surface 3120, attach coupler 3152 and perform the task on the surface 3120 covering the new area based on the point of attachment of coupler 3152. In an embodiment, one or more of the UAVs are configured to be tether with a limiting range of operation constrained by the length of the tethering cord 3132.

In some embodiments, assume that the coupler 3152 is a cone with a sensor. The cone with the sensor and/or only the sensor may be attached to the surface 3120. Thereafter the tethering cord 3132 may be removed while the sensor or cone remains attached to the surface 3120. By way of non-limiting example, the sensor and/or cone/sensor combination may be attached to the wall via micro-spine grippers. Thus, the cone/sensor combination or sensor may be configured to be installed on a wall or surface, as will be described in relation to FIG. 33.

Figure 32:
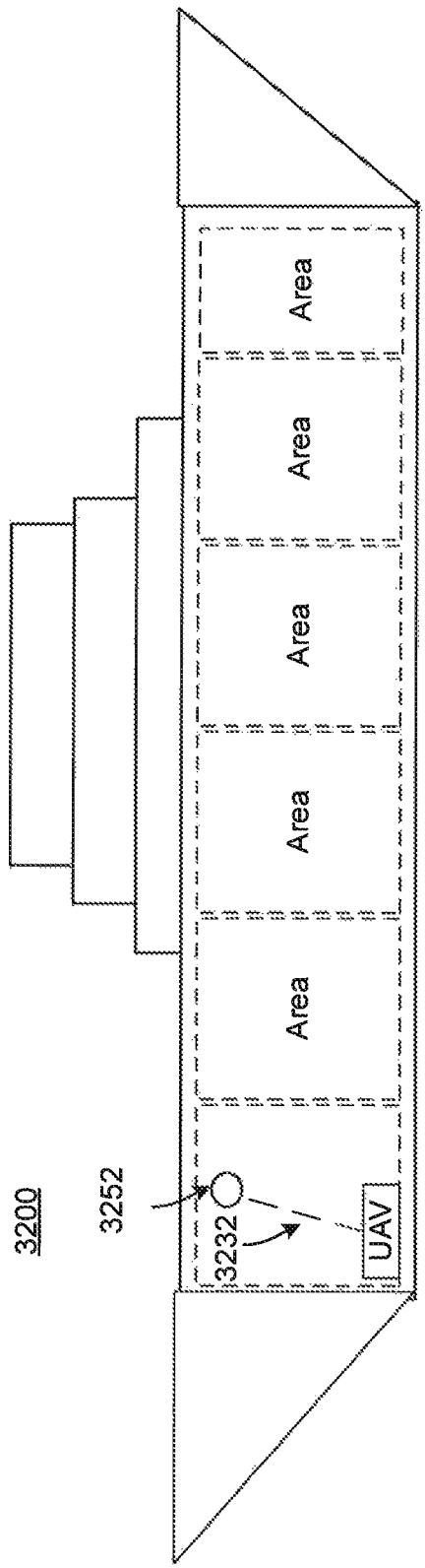
FIG. 32 illustrates a tethered UAV being tethered to a surface for which the UAV will perform a task or measurement, according to an aspect of the present disclosure.

FIG. 32 illustrates ship 3200 having a tethered UAV tethered to a surface for which the UAV will perform a task. In the illustration, the surface is on the side of a ship 3200. The ship's surface is divided into areas. The UAV may attach to the surface and perform the programmed task in a first area. The UAV would detach from the surface and reattach in another area of the surface to continue performing the task. In some embodiments, more than one UAV would be deployed. Thus, each area or perimeter of the area may be defined by the length of the tethering cord 3232. The coupler 3252 may be attached to the surface via micro-spine grippers. In some embodiments, the coupler 3252 may be a cone/sensor combination which is attached to the surface via micro-gripper. The cone/sensor combination may be left on the surface to detection at least one parameter at the location. The UAV may also be untethered when performing a task on a surface including sensing.

Figure 33:
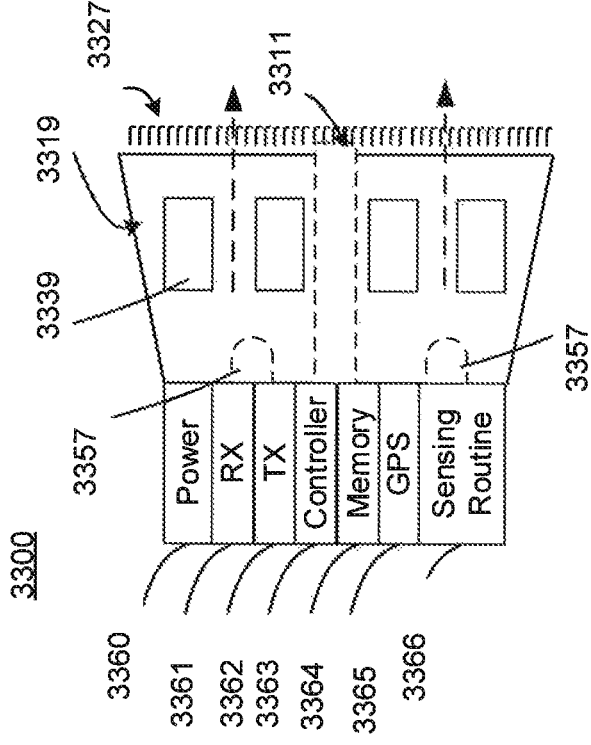
FIG. 33 illustrates a smart sensor system, according to an aspect of the present disclosure.

FIG. 33 illustrates a smart sensor system 3300. The system 3300 may include a cone 3319 having a sensor 3311 to form a stand-alone smart cone/sensor combination which may be battery powered denoted by power 3360. The smart cone/sensor combination may include memory 3364, controller 3363 or computing device. The smart cone/sensor combination may include a receiver (RX) 3361 to receive updates or control data to control the operation of the system 3300. The smart cone/sensor combination may include a transmitter (TX) 3362 to transmit status information and/or stored measurements of the system 3300 in memory 3364 to a remote computing device, UAV or controller. The smart cone/sensor combination may include GPS 3365. The system 3300 may include sensing routine 3366 or software or carrying out the sensing program to sense one or more surface features or parameter associated with the location at which the sensor or cone/sensor combination is attached.

The cone 3319 may include a body with openings 3339. The cone 3319 may include sensors 3357 configured to sense the position of the cone rim or sensor contact relative to a surface or other parameter including 2D or 3D imaging. The sensors 3357 may include LIDAR sensor and/or ultrasonic sensors. The rim of the cone 3319 is shown with micro-spine grippers 3327. However, other cushioning elements may be used.

The micro-spine grippers 3327 may serve as a cushion in some embodiments. In other embodiments, the micro-spine grippers 3327 may be used to affix the cone/sensor combination to the surface 2220.

When using the arm/probe/sensor to touch a structure and stabilize the UAV—sensor or cone/sensor combination may stay in a stationary location for a longer sample period of time thus allowing highly accurate GPS and other spatial data acquisition by either an onboard global positioning system (GPS) of the UAV, other UAV position locating device or a cone/sensor GPS or other cone/sensor position locating device in the cone when contacting the cone/sensor directly to the structure. For example, the sensor may be in position up to 10 minutes wherein the sampling period may be up to 10 minutes in removable sensors. The inventors have determined current sample periods of time have been deficient to obtain accurate GPS coordinates. Additionally, it has been difficult or impossible to get an accurate GPS coordinate in an area without a good line of site from the ground. For example, GPS has been used in a manner similar a land surveyor utilizing a tripod with a highly accurate GPS to locate a position marker from the ground. The embodiments described herein allows spatial data acquisition relative to the sensor or cone to be obtained at a location on a structure without the challenges of a ground based locating system. If the sensor is affixed to a surface, the sampling period may be days, weeks, months or years.

The unmanned aerial vehicle (UAV) and/or other types of robotics systems is controlled in some aspects by a pilot, with software-assisted flight to perform complex or fine flight events near structures. In some instances, the UAV may be fully autonomous and completes the assigned tasks with no user input other than the initial instructions/directions.

The UAV sensors evaluate and test coatings on masonry, metal and other substrates, for example, using infra-red cameras, dry-film thickness sensors, surface temperature sensors, and high definition (HD) video cameras, for example. Such testing may be destructive or non-destructive. The operator may maintain communication with the UAV and the UAV-based sensors using blue-tooth, Wi-Fi, and tethered or other communication means.

The system may record all flight telemetry, actions, test results and environmental inputs from sensors. Data may be stored on a base station, self-contained on the UAV, a combination of the two, or with other methods.

The sensor mounted to the UAV may be configured to make contact with the tested surface using a robotic arm or arms extending from the UAV or robotic system. The arm(s) may use a spring cushion to allow contact with a fixed object, or may extend from the UAV to the fixed object and then retract.

In some instances, one arm may place or remove an object, or perform a task while the other arm makes contact with the surface to test or comes within close proximity wherein it can gather the information/data (like Radio Frequency Identification (RFID) or similar technologies). The arm may extend in multiple directions, including reaching around obstructions (see articulating functionality, below). One arm may anchor the UAV temporarily to allow an additional arm to navigate an obstruction.

Tilting of the sensor/probes by the swivel mechanism may lead to an erroneous reading. The system may include sensors or mechanical systems either on the probe or on the UAV or both to ensure proper alignment and extrapolation of reading measurements. For example, correction of the misalignment may include adding additional pressure to the cone/sensor combination, correcting the UAV or correcting the arm position (extension or retraction) to achieve proper alignment. Correction may also include repositioning the arm so that the cone/sensor is also repositioned.

The UAV flight and operations are preferably computer-assisted by software which may integrate flight movement and positioning using LIDAR, Radar, ultrasonic, optics and other positioning sensors, and may control operation of various sensors used for inspection, testing and evaluation. The software may also manage the sensor and flight data, including the storage and manipulation of flight and sensor data. The software may reside on the airship, a base station, a second airship, or any combination thereof. The software may also provide a series of failsafe flight and sensor actions to reduce the risk of damage to the UAV, the structure being evaluated, or people and property in the general area.

Paint coating thickness measurements a/k/a DFT (Dry Film Thickness) measurements are a non-destructive coating application thickness testing measure. Measurements for corrosion testing, IR (including short-wave infrared (SWIR), x-ray, etc.) and visual inspection, destructive coating testing, surface temperature monitoring, wet film thickness and other measurements.

The UAV may be equipped with a sensor, wherein the apparatus is designed and structured such that the sensor may be positioned as required relative to an elevated surface to perform sensing, testing or measuring operations. The sensor results may be stored on board the UAV, transmitted to a local human operator or transmitted remotely. The UAV may be provided with physical proximity members, for example horizontal rod, guard or bumper members, to properly position the UAV the correct distance from the elevated surface, or proximity sensors of known type to relay positional information to the operator or to automatically position the UAV relative to the elevated surface.

The sensor may be coupled to the UAV in suitable manner so as to positioned beyond the outer perimeter of the UAV body, propellers and other structural members, such as by mounting the sensor on a laterally extending arm. The arm may be a substantially rigid member or a member with a degree of flexibility that allows it to bend or bow upon contact with the elevated surface. The sensor arm may be mounted to the UAV main body in a manner that allows it to pass into or even through the UAV main body when contact is made with the elevated surface. Alternatively, the sensor may be mounted on a retractable/extendible arm or wand such that the arm may be extended when the sensor is to be used and retracted when the sensor is not in use, or so that the position of the sensor relative to the elevated surface may be adjusted without requiring movement of the UAV relative to the elevated surface. For example, the sensor arm may comprise telescoping members, or threaded members rotationally combined, or an articulating assembly of scissor-like hinged members, which are extended and retracted by mechanical systems. The sensor arm may be structured for articulation in other directions as well, such as by providing a hinged portion that may be angularly adjustable relative to the main body of the sensor arm, or by providing a "snake-like" articulating structure whereby the sensor arm may be curved.

In a preferred embodiment, the sensor arm or sensor is provided with a shock-absorbing or cushioning structure, which in a most basic design comprises a flexible sensor arm, but more preferably is a mechanical construction, such as a spring-biasing member, such that if movement by the UAV causes the sensor to contact the elevated surface at too high a force, the force will be lessened by the shock-absorbing or spring-biased structure, thereby precluding damage to the sensor. The shock-absorbing or spring-biased structure may also provide the mechanism to more easily perform the sensing operation when the sensor is to be in direct contact with the elevated surface, as the range of movement allowed by the shock-absorbing or spring-biased structure allows the UAV to be positioned within certain distance parameters rather than requiring a more precise distancing. For example, if a spring-biased structure allowing for up to 5 inches of retraction upon contact is provided in a telescoping sensor arm, the UAV has a five-inch window for proper distancing from the elevated surface. Additionally, the shock-absorbing or spring-biased structure may allow the sensor to be slid along the elevated surface to provide continuous rather than point-to-point data.

The sensor may be mounted to the sensor arm in a manner that allows the sensor to be angularly repositioned relative to the neutral position on the sensor arm. This structure is desirable for sensors that require flush contact with the elevated surface or which must be aligned within a relatively small angular field relative to the elevated surface in order for the sensor to secure accurate results. The realignment may be accomplished by mounting the sensor in a pivoting or swiveling manner, with the realignment controlled mechanically by the operator or automatically by computer. Alternatively, the sensor may be provided with an open-based, cone-shaped collar or similar self-orienting mechanism such that the swivel-mounted sensor self-aligns as the base of the collar is advanced against the elevated surface.

The UAV may be provided with multiple arms, probes or extensions, not all of which retain sensors. For example, the UAV may further comprise manipulating arms, grasping arms, location arms, multi-tasking arms, anchoring arms, etc. The UAV may be provided with a video camera, mounted on the UAV body or on an extension, that transmits real-time images to the human or computer control system, thereby providing visual confirmation or positioning information to the control systems.

The UAV is provided with computer-assisted flight control to cover some, most or all of the flight operations for proper positioning of the UAV relative to the elevated surface and for rapid re-positioning of the UAV at successive locations on the elevated surface. For example, LIDAR, radar, ultrasonic or other positioning and distance control systems may be utilized to properly position the UAV relative to the elevated surface, and in conjunction with computer control to automatically reposition the UAV to successive locations on the elevated surface. The computer-assisted flight control may comprise direct feedback to the operator regarding status of the UAV position, sensor position, contact force, contact angle, etc., relative to the elevated surface, such as in the form of audible signals, visible signals or haptic feedback (e.g., vibration of the controller). Computer-Assisted Flight Control may be provided to assist or replace the pilot/operator by through software-guided flight.

The sensor arm may project from the UAV to extend a sensor from the UAV and allow physical contact of the sensor with a fixed structure or equipment being evaluated. The sensor arm may allow video and other sensors to access areas not otherwise visible or reachable by UAV body-mounted sensors. The sensor arm is adjustable and attachable to the UAV. The sensor arm supports the sensor to facilitate the task performed to the surface of the object by the UAV during flight of the UAV. The sensor arm being resilient to impact forces caused by direct contact of the sensor or sensor arm with the surface to bend, spring or swivel relative to a contour of the surface. The bending of the sensor arm, the spring-biasing of the arm and the swivel coupling of the cone/sensor combination may effectuate macro-resiliency of the sensor to as a result of impacting forces resulting of movement of the sensor relative to varying surface contours of the sensed or probed surface and flight of the UAV.

The resilient rim (i.e., rim element 2427) whether micro-spine grippers or an elastomeric material may effectuate micro-resiliency or a soft landing of the sensor as a result of the impacting forces as a result of movement of the sensor relative to the sensed or probed surface and flight of the UAV.

The UAV may include safety failsafe features to maintain safe command of the UAV in the event of communications, software, hardware, or operator failure.

In view of the foregoing, the UAV includes at least one sensor capable of sensing, measuring or testing locations on an elevated surface, such as a wall, hull or object, at a height not reachable by a worker without elevating the worker by physical means such as a ladder, lift, scaffold, etc., wherein the sensor is a contact or close proximity sensor.

Figure 34:
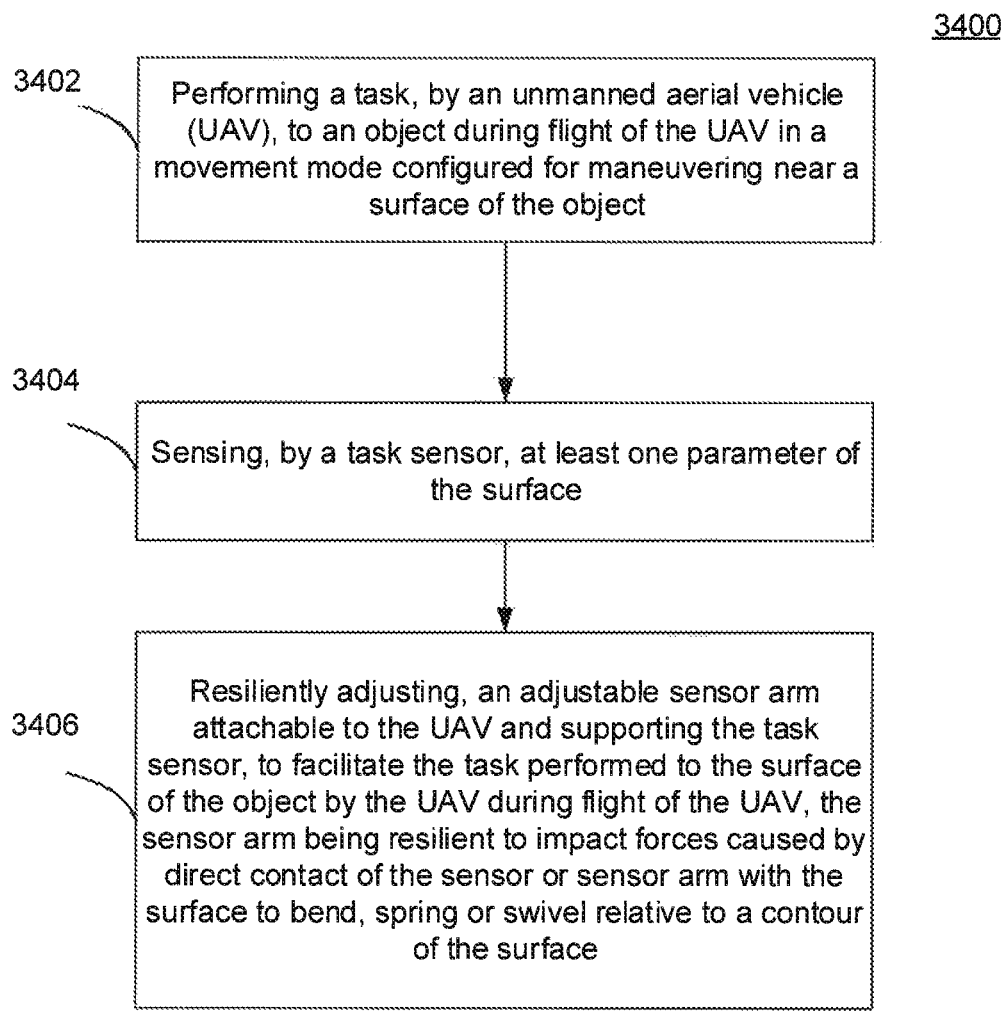
FIG. 34 illustrates a flowchart for performing a task on a surface, according to an aspect of the present disclosure.

FIG. 34 illustrates a flowchart of a method for performing a task on a surface with a UAV in flight. The blocks described herein, or method functions may be performed in the order shown or described or a different order. Some of the blocks or functions may be performed contemporaneously. Blocks or functions may be added or deleted.

The method 3400 may comprise, at block 3402, performing a task, by an unmanned aerial vehicle (UAV), to an object during flight of the UAV in a movement mode configured for maneuvering near a surface of the object. The method 3400, at block 3404, includes sensing, by a task sensor, at least one parameter of the surface; and, at block 3406, resiliently adjusting, an adjustable sensor arm attachable to the UAV and supporting the task sensor, to facilitate the task performed to the surface of the object by the UAV during flight of the UAV. The sensor arm is resilient to impact forces caused by direct contact of the sensor or sensor arm with the surface to bend, spring or swivel relative to a contour of the surface.

The task sensor comprises one of a video camera, a paint depth gauge, and a dry film thickness digital gauge or other surface feature sensors for chemicals (salt), cracks, breaks, thickness, etc.

The method 3400 may further comprise sensing, by an odometry, LIDAR, machine learning or other sensing system, the contour of the surface to adjust the sensor arm relative to the UAV. The odometry sensing system may comprise at least one camera or at least one light detecting and ranging (LIDAR) sensor sensing relative to the task sensor and the surface; and at least one ultrasonic sensor sensing relative to the task sensor and the surface, wherein the tethering system attaches the UAV to a ceiling, vertical wall or another UAV. Another UAV may perform a second task on the surface. The UAV is a master UAV and another UAV may be a slave UAV. The tethering system may be coupled to one of the master UAV and the slave UAV.

The method 3400 may further comprise, by the slave UAV, dispensing material from a nozzle. The material may comprise at least one of a liquid material, a viscous material, powder or a gel to the surface prior to sensing by the task sensor.

The method may include determining whether the sensed at least one parameter of the surface is non-conforming at a sensed location; and if the at least one parameter of the surface is non-conforming at the sensed location, dispensing a marking medium, paint or powder, by way of example, at the sensed location to mark a spot on the surface by the UAV.

The adjustable sensor arm of the UAV may comprise at least one of a spring biased arm portion, an elastomeric arm body, a swivelly mounting to attach the task sensor to the adjustable sensor arm and a motorized sensor arm mount configured to extend or retract the sensor arm relative to the UAV. The sensor, sensor arm and/or sensor housing (i.e., cone) may be configured with macro-resiliency adaptability properties such as bending of the arm, spring-biasing a length of the arm or swivel of the cone or housing. The adjustable length may be accomplished with a track to move the arm to extend or retract relative to the UAV using a motor.

The sensor and/or sensor housing (i.e., cone) may be provided with micro-resiliency adaptability properties using a spring-cushion on the cone to bend during impact with a surface, a rubber rim element or micro-spine grippers.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described aspects.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., implementation within computing devices and environments other than those mentioned herein). As will be appreciated by those skilled in the relevant art(s) after reading the description herein, certain features from different aspects of the systems, methods and computer program products of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. A system comprising:
   an unmanned aerial vehicle (UAV) to perform at least one task to an object during flight of the UAV in a movement mode configured for maneuvering near a surface of the object;
   a task sensor configured to sense at least one parameter of the surface; and
   an adjustable sensor arm attachable to the UAV and supporting the task sensor to facilitate the at least one task performed to the surface of the object by the UAV during flight of the UAV, the sensor arm being resilient to impact forces caused by direct contact of the task sensor or the adjustable sensor arm with the surface to bend, spring or swivel relative to a contour of the surface wherein the UAV is a master UAV; and further comprising:
   a slave UAV; and
   a tethering system coupled to one of the master UAV and the slave UAV, comprising:
      a tethering cord with an extendible and retractable length;
      a coupler coupled to a free end of the cord; and
      a motor to cause the cord to extend or retract wherein the tethering system attaches the master UAV to the slave UAV.

2. The system according to claim 1, wherein the task sensor comprises one of a video camera, a paint depth gauge, and a dry film or ultrasonic thickness digital gauge.

3. The system according to claim 1, further comprising:
   an odometry sensing system configured to sense the contour of the surface to adjust the sensor arm relative to the UAV.

4. The system according to claim 3, wherein the odometry sensing system comprises:
   at least one light detecting and ranging (LIDAR) sensor sensing relative to the task sensor and the surface; and
   at least one ultrasonic sensor sensing relative to the task sensor and the surface.

5. The system according to claim 1, wherein the tethering system is also configured to attach the UAV to a ceiling or vertical wall.

6. The system according to claim 1, wherein the slave UAV comprises:
   an arm; and
   a nozzle coupled to the arm of the slave UAV to dispense material, the material comprises at least one of a liquid material, a viscous material or a gel to the surface prior to sensing by the task sensor.

7. The system according to claim 1, wherein the adjustable sensor arm comprises at least one of a spring biased arm portion, an elastomeric arm body, a swivelly mounting to attach the task sensor to the adjustable sensor arm and a motorized sensor arm mount configured to extend or retract the sensor arm relative to the UAV.

8. The system according to claim 1, wherein the sensor is configured to be removably affixed to the surface using micro-spine grippers.

9. The system according to claim 1, further comprising a sensor housing having smart spring-cushion on the sensor housing to detect imminent contact of a sensor contact with the surface during flight of the UAV.

10. A system comprising:
    an unmanned aerial vehicle (UAV) to perform at least one task to an object during flight of the UAV in a movement mode configured for maneuvering near a surface of the object;
    a task sensor configured to sense at least one parameter of the surface;
    an adjustable sensor arm attachable to the UAV and supporting the task sensor at an end of the sensor arm to facilitate the at least one task performed to the surface of the object by the UAV during flight of the UAV, the sensor arm being resilient to impact forces caused by direct contact of the task sensor or the adjustable sensor arm with the surface to bend, spring or swivel relative to a contour of the surface;
    micro-spine grippers wherein the task sensor is configured to be removably affixed to the surface using the micro-spine grippers; and
    a sensor housing having a smart spring-cushion on the sensor housing to detect imminent contact of a sensor contact with the surface during flight of the UAV.

11. The system according to claim 10, wherein the adjustable sensor arm comprises at least one of a spring biased arm portion, an elastomeric arm body, a swivelly mounting to attach the task sensor to the adjustable sensor arm and a motorized sensor arm mount configured to extend or retract the sensor arm relative to the UAV.

12. The system according to claim 10, wherein the UAV is a master UAV; and further comprising:
    a slave UAV; and
    a tethering system coupled to one of the master UAV and the slave UAV, comprising:
       a tethering cord with an extendible and retractable length;
       a coupler coupled to a free end of the cord; and
       a motor to cause the cord to extend or retract wherein the tethering system attaches the master UAV to the slave UAV.

13. The system according to claim 12, wherein the slave UAV comprises:
    an arm; and
    a nozzle coupled to the arm of the slave UAV to dispense material, the material comprises at least one of a liquid material, a viscous material or a gel to the surface prior to sensing by the task sensor.

14. A system comprising:
    an unmanned aerial vehicle (UAV) to perform at least one task to an object during flight of the UAV in a movement mode configured for maneuvering near a surface of the object;
    a task sensor configured to sense at least one parameter of the surface;
    an adjustable sensor arm attachable to the UAV and supporting the task sensor at an end of the sensor arm to facilitate the at least one task performed to the surface of the object by the UAV during flight of the UAV, the sensor arm being resilient to impact forces caused by direct contact of the task sensor or the adjustable sensor arm with the surface to bend, spring or swivel relative to a contour of the surface;

micro-spine grippers wherein the task sensor is configured to be removably affixed to the surface using the micro-spine grippers; and a sensor housing having a rim with a rim edge wherein the micro-spine grippers are coupled to the rim edge.

15. The system according to claim 14, wherein the adjustable sensor arm comprises at least one of a spring biased arm portion, an elastomeric arm body, a swivelly mounting to attach the task sensor to the adjustable sensor arm and a motorized sensor arm mount configured to extend or retract the sensor arm relative to the UAV.

16. The system according to claim 14, wherein the UAV is a master UAV; and further comprising:

a slave UAV; and a tethering system coupled to one of the master UAV and the slave UAV, comprising:
  a tethering cord with an extendible and retractable length;
  a coupler coupled to a free end of the cord; and
  a motor to cause the cord to extend or retract wherein the tethering system attaches the master UAV to the slave UAV.

17. The system according to claim 16, wherein the slave UAV comprises:

an arm; and a nozzle coupled to the arm of the slave UAV to dispense material, the material comprises at least one of a liquid material, a viscous material or a gel to the surface prior to sensing by the task sensor.

* * * * *